(12) United States Patent
Gong et al.

(10) Patent No.: US 11,606,238 B2
(45) Date of Patent: *Mar. 14, 2023

(54) SEQUENCE-BASED SIGNAL PROCESSING METHOD AND SIGNAL PROCESSING APPARATUS

(71) Applicant: HUAWEI TECHNOLOGIES CO., LTD., Guangdong (CN)

(72) Inventors: Mingxin Gong, Tianjin (CN); Bingyu Qu, Beijing (CN); Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/484,833

(22) Filed: Sep. 24, 2021

(65) Prior Publication Data

US 2022/0014405 A1 Jan. 13, 2022

Related U.S. Application Data

(63) Continuation of application No. 16/874,039, filed on May 14, 2020, now Pat. No. 11,177,992, which is a (Continued)

(30) Foreign Application Priority Data

Nov. 16, 2017 (CN) .......................... 201711140831.9
Nov. 2, 2018 (CN) .......................... 201811303070.9

(51) Int. Cl.
  *H04L 27/26* (2006.01)
(52) U.S. Cl.
  CPC ...... *H04L 27/2614* (2013.01); *H04L 27/2613* (2013.01); *H04L 27/2627* (2013.01); *H04L 27/2636* (2013.01)

(58) Field of Classification Search
  CPC ................. H04L 5/0007; H04L 27/265; H04L 27/2627; H04L 27/2602; H04L 27/2636;
  (Continued)

(56) References Cited

U.S. PATENT DOCUMENTS

2007/0004465 A1  1/2007  Papasakellariou et al.
2010/0002800 A1  1/2010  Kim et al.
(Continued)

FOREIGN PATENT DOCUMENTS

CN  101174857  5/2008
CN  103209485  7/2013
(Continued)

OTHER PUBLICATIONS

3GPP TS 38.21 1 v1 .0.0, 3rd Generation Partnership Project; Technical Specification Group Radio Access Network; NR; Physicalchannels and modulation (Release 1 5), Sep. 2017 (Year: 2017).

(Continued)

*Primary Examiner* — Aristocratis Fotakis
(74) *Attorney, Agent, or Firm* — Fish & Richardson P.C.

(57) ABSTRACT

This application provides a sequence-based signal processing method and apparatus. A sequence used for sending a signal on a PUSCH is determined. The sequence is a sequence $\{x_n\}$ including N elements, $x_n$ is an element in the sequence $\{x_n\}$, and the determined sequence $\{x_n\}$ is a sequence satisfying a preset condition. Then, a first signal is generated and sent. By using the determined sequence, when a signal is sent on the PUSCH, relatively good sequence frequency domain flatness can be maintained, and a relatively low PAPR value and a relatively low cross-correlation between sequences can be maintained, thereby satisfying a (Continued)

communications application environment in which a signal is sent on the PUSCH, especially an NR system scenario or an NR similar scenario.

35 Claims, 10 Drawing Sheets

Related U.S. Application Data continuation of application No. PCT/CN2018/116011, filed on Nov. 16, 2018.

(58) Field of Classification Search
CPC ........... H04L 27/2613; H04L 27/2614; H04W 72/0413
See application file for complete search history.

(56) References Cited

U.S. PATENT DOCUMENTS

| | | | |
|---|---|---|---|
| 2010/0246463 | A1 | 9/2010 | Papasakellariou et al. |
| 2013/0114756 | A1 | 5/2013 | Jia et al. |
| 2016/0373222 | A1 | 12/2016 | Pralea |
| 2017/0237592 | A1 | 8/2017 | Yang et al. |
| 2018/0219709 | A1 | 8/2018 | Pawar et al. |
| 2019/0020458 | A1 | 1/2019 | Ko et al. |
| 2019/0132859 | A1 | 5/2019 | Han et al. |
| 2019/0222451 | A1* | 7/2019 | Yang ..................... H04L 1/0003 |
| 2019/0379567 | A1 | 12/2019 | Kuchi |
| 2019/0386795 | A1* | 12/2019 | Matsumura ............. H04L 27/26 |
| 2020/0014483 | A1 | 1/2020 | Lee et al. |
| 2020/0076558 | A1 | 3/2020 | Kuchi |
| 2020/0092149 | A1 | 3/2020 | Qu et al. |
| 2020/0145271 | A1 | 5/2020 | Bala et al. |
| 2020/0153669 | A1 | 5/2020 | Qu et al. |
| 2020/0295880 | A1 | 9/2020 | Matsumura et al. |

FOREIGN PATENT DOCUMENTS

| | | |
|---|---|---|
| CN | 103281277 | 9/2013 |
| CN | 103729530 | 4/2014 |
| CN | 105141399 | 12/2015 |
| CN | 106781827 | 5/2017 |
| CN | 106789815 | 5/2017 |
| CN | 106789827 | 5/2017 |
| CN | 106849963 | 6/2017 |
| CN | 106961408 | 7/2017 |
| JP | 2012503946 | 2/2012 |
| WO | 2017078607 | 5/2017 |

OTHER PUBLICATIONS

3GPP TS 38.211 V1.0.0 (Sep. 2017), "3rd Generation Partnership Project; Technical Specification Group Radio Access Network; NR; Physical channels and modulation (Release 15)," Sep. 2017, 37 pages.
Adegbite et al., "Prolate-binary sequences for SLM based papr reduction in OFDM systems," The 21st IEEE International Workshop on Local and Metropolitan Area Net, (2015).
Ce et al., "Partial transmit sequences algorithm to reduce peak-to-average power ratio based on dynamic power threshold," Systems Engineering and Electronics, vol. 39, No. 7, Jul. 2017, 5 pages (English Abstract).
Extended European Search Report issued in European Application No. 18879785.6 dated Dec. 3, 2020, 10 pages.
Fwu et al., "Proposed Text for the Draft P802.16m Amendment on the PHY Structure for UL Control Merged Version (Non-harmonized)," IEEE 802.16 Broadband Wireless Access Working Group, IEEE C802.16m-09/0387, Mar. 2009, 18 pages.
Huawei et al., "Functionalities and design of reference signal for demodulation of UL Channels," 3GPP TSG RAN WG1 Meeting #87, R1-1611246,Reno, USA, Nov. 14-18, 2016, 5 pages.
Iith et al., "RS design options for pi/2 BPSK with spectrum shaping," 3GPP TSG RAN WG1 Meeting NR#3, R1-1716612, Nagoya, Japan, Sep. 18-21, 2017, 1 pages.
Iith, "On spectrum shaping requirements for Pi/2 BPSK," 3GPP TSG RAN WG4 Meeting #84bis, R4-1710231, Dubrovnik, Croatia, Oct. 9-13, 2017, 5 pages.
Iith, "Sequence design for long PUCCH up to 2 bits," 3GPP TSG RAN WG1 Meeting RAN1#90-Bis, R1-1717921, Prague, CZ, Oct. 9-13, 2017, 6 pages.
Iith, CEWiT, Reliance Jio, IITM, Tejas Networks, "Design of Long PUCCH for UCI up to 2 bits," 3GPP TSG RAN WG1 Meeting NR#3, R1-1716517, Nagoya, Japan, Sep. 18-21, 2017, 5 pages.
ITL, "Mathematical analysis based on theorems of M-sequence for NR-SSS," 3GPP TSG RAN WG1 Meeting #89, R1-1708320, Hangzhou, China, May 15-19, 2017, 7 pages.
Office Action issued in Chinese Application No. 201880074425.3 dated Mar. 31, 2021, 7 pages.
Office Action issued in Chinese Application No. 202011569373.2 dated Jul. 8, 2021, 4 pages.
Office Action issued in Indian Application No. 2020370224444 dated Jul. 8, 2021, 7 pages.
Office Action issued in Japanese Application No. 2020-526895 dated Sep. 6, 2021, 9 pages (with English translation).
PCT International Search Report and Written Opinion issued in International Application No. PCT/CN2018/116011 dated Feb. 11, 2019, 17 pages (with English translation).
Qualcomm Incorporated, "Low PAPR Modulation," 3GPP TSG RAN WG1 Meeting 90bis, R1-1718594, Prague, CZ, Oct. 9-13, 2017, 9 pages.
Qualcomm Incorporated, "Remaining issues on DMRS design," 3GPP TSG RAN WG1 Meeting 90bis, R1-1718547, Prague, CZ, Oct. 9-13, 2017, 14 pages.
Qualcomm Incorporated, "Views on UL DMRS design," 3GPP TSG-RAN WG1 #87, R1-1612050, Nov. 14-18, 2016, 4 pages.
Qualcomm, "Remaining issues on NR DM-RS," 3GPP TSG RAN WG1 Meeting 90bis, R1-1718969, Prague, CZ, 9-13 Oct. 2017, 11 pages.
"R1-1 716478, Sequence design for 1-symbol short-PUCCH of up to 2 bits, 3GPP TSG RAN WG1 Meeting N R#3, Nagoya, Japan,1 8th-21st, InterDigital Inc, Sep. 2017 (Year: 2017)".
ZTE et al., "Remaining details on DL DMRS and UL DMRS," 3GPP TSG RAN WG1 Meeting 90bis, R1-1717433, Prague, CZ, 9-13, Oct. 2017, 8 pages.

* cited by examiner

US 11,606,238 B2

SEQUENCE-BASED SIGNAL PROCESSING METHOD AND SIGNAL PROCESSING APPARATUS

CROSS-REFERENCE TO RELATED APPLICATIONS

This application is a continuation of U.S. patent application Ser. No. 16/874,039, filed on May 14, 2020, which is a continuation of International Application No. PCT/CN2018/116011, filed on Nov. 16, 2018, which claims priority to Chinese Patent Application No. 201711140831.9, filed on Nov. 16, 2017 and claims priority to Chinese Patent Application No. 201811303070.9, filed on Nov. 2, 2018. All of the afore-mentioned patent applications are hereby incorporated by reference in their entireties.

TECHNICAL FIELD

This application relates to the field of communications technologies, and in particular, to a sequence-based signal processing method and signal processing apparatus.

BACKGROUND

In a long term evolution (long term evolution, LTE) system, a physical uplink shared channel (physical uplink shared channel, the PUSCH) uses a demodulation reference signal (demodulation reference signal, DMRS) to perform channel estimation, so as to perform signal demodulation. In the LTE system, a basic sequence of an uplink DMRS is directly mapped to a resource element, and no encoding processing is required. In LTE, an uplink DMRS reference sequence is defined as a cyclic shift of a basic sequence, and a basic sequence of the uplink DMRS is obtained by performing cyclic extension on a Zadoff-Chu sequence (ZC sequence). The ZC sequence is a sequence that satisfies a feature of a constant amplitude zero auto-correlation (constant amplitude zero auto-correlation, CAZAC) sequence.

In a new radio access technology (new radio access technology, NR), a $\pi/2$ BPSK modulation scheme can be used for an uplink discrete Fourier transform spread OFDM (Discrete Fourier Transform spread OFDM, DFT-s-OFDM) waveform, and filtering can be used for $\pi/2$ BPSK modulation. When the uplink DFT-s-OFDM DMRS waveform uses $\pi/2$ BPSK modulation, the uplink DMRS may use a Gold sequence-based sequence, or may use a computer generated sequence (Computer Generated Sequence, CGS). Currently, when a DFT-s-OFDM DMRS waveform is supported in NR, a ZC sequence is used. However, when the $\pi/2$ BPSK modulation scheme is used for an uplink DFT-s-OFDM DMRS waveform and the filter is used, if the Gold sequence-based sequence or the CGS is used for the uplink DFT-s-OFDM DMRS waveform, and filtering cannot be performed properly, frequency flatness of the sequence is relatively poor, which does not facilitate channel estimation. If the ZC sequence is used for the uplink DFT-s-OFDM DMRS waveform, a peak-to-average power ratio (peak-to-average power ratio, PAPR) of the DMRS is higher than a PAPR of transmitted data. Consequently, out-of-band emission and in-band signal loss of a pilot signal are caused, and channel estimation performance is affected, or uplink coverage is limited.

The existing sequence used by the PDSCH DMRS cannot meet a requirement in a communications application environment in which the PUSCH is used to send a signal.

SUMMARY

In view of this, embodiments of this application provide a sequence-based signal processing method and a communications device, to provide a new sequence and satisfy a communications application environment in which a signal is sent on a PUSCH.

The embodiments of this application provide the following technical solutions:

A first aspect of the embodiments of this application provides a sequence-based signal processing method. The method includes: determining a sequence $\{x_n\}$ including N elements, where N is a positive integer greater than 1, $x_n$ is an element in the sequence $\{x_n\}$, the sequence $\{x_n\}$ is a sequence satisfying a preset condition, the preset condition is: $x_n = A \cdot b_n \cdot j^n$ a value of n ranges from 0 to N−1, A is a non-zero complex number, $j=\sqrt{-1}$, the element $b_b = u \cdot (1-2 \cdot s_n)$, u is a non-zero complex number, and a set of one or more sequences $\{s_n\}$ including the element $s_n$ includes at least one sequence in a first sequence set or at least one equivalent sequence of the sequence in the first sequence set; and generating and sending a first signal. Herein, for the sequences in the first sequence set, refer to the description in the specification.

It should be noted that the preset condition satisfied by the sequence $\{x_n\}$ may be represented in a plurality of equivalent manners. For example, the preset condition may alternatively be represented as: $x_n = A \cdot b_n' \cdot j^{n \bmod 2}$, where n is an integer, a value of n ranges from 0 to N−1, N is a positive integer greater than 1, A is a non-zero complex number, $j=\sqrt{-1}$, the element $b_n' = u \cdot (1-2 \cdot s_n')$, and u is a non-zero complex number. Although representation manners of the two preset conditions are different, when $s_n'$ and $s_n$ satisfy $s_n' = (s_n^* + s_n) \bmod 2$, and $s_n^* = (1-(-1)^{[n/2]})/2$, the two preset conditions describe the same sequence $\{x_n\}$.

In other words, for the sequence $\{x_n\}$, regardless of a manner used to represent the preset condition satisfied by the sequence $\{x_n\}$, the sequence $\{x_n\}$ satisfying the preset condition represented in any manner is equivalent to one sequence, provided that $s_n'$ and $s_n$ satisfy that, and $s_n^* = (1-(-1)^{[n/2]})/2$.

In a possible design, when N=18, a corresponding operation may be performed according to the foregoing method; or when N=18, a corresponding operation may be performed according to the following method. The following method is: when N=18, determining a sequence $\{x_n\}$ including N elements, where N is a positive integer greater than 1, $x_n$ is an element in the sequence $\{x_n\}$, the sequence $\{x_n\}$ is a sequence satisfying a preset condition, and the preset condition is: $x_n = y_{(n+M) \bmod N}$, where $M \in \{0, 1, 2, \ldots, N-1\}$, $y_n = A \cdot b_n \cdot j^n$, a value of n ranges from 0 to N−1, A is a non-zero complex number, $j=\sqrt{-1}$, the element $b_n = u \cdot (1-2 \cdot s_n)$, u is a non-zero complex number, and a set of one or more sequences $\{s_n\}$ including an element $s_n$ includes at least one sequence in a third sequence set. Herein, for sequences in the third sequence set, refer to the description in the specification.

According to the foregoing solution, by using the determined sequence, when a signal is sent on a PUSCH, relatively good sequence frequency domain flatness can be maintained, and a relatively low PAPR value and a relatively low cross-correlation between sequences can be maintained, thereby satisfying a communications application environment in which a signal is sent on the PUSCH, especially an NR system scenario or an NR similar scenario.

In a possible design, the generating and sending a first signal includes: performing discrete Fourier transform processing on the N elements in the sequence $\{x_n\}$, to obtain a sequence $\{f_n\}$; separately mapping N elements in the sequence $\{f_n\}$ to N continuous subcarriers, to obtain a frequency domain signal including the N elements; or separately mapping N elements in the sequence $\{f_n\}$ to N subcarriers having equal spacings, to obtain a frequency domain signal including the N elements; generating the first signal; and sending the first signal through radio frequency.

In a possible design, the generating the first signal includes: performing fast Fourier inverse transform on the frequency domain signal including the N elements, to obtain a corresponding time domain signal; and adding a cyclic prefix to the time domain signal, to generate the first signal.

In a possible design, the method further includes: before performing the discrete Fourier transform processing on the N elements in the sequence $\{x_n\}$ filtering the sequence $\{x_n\}$; or after performing the discrete Fourier transform processing on the N elements in the sequence $\{x_n\}$, filtering the sequence $\{x_n\}$; or before and after performing the discrete Fourier transform processing on the N elements in the sequence $\{x_n\}$, skipping filtering the sequence $\{x_n\}$.

In a possible design, the first signal is a reference signal, or the first signal is a signal used to carry communication information.

In a possible design, a set of one or more sequences $\{s_n\}$ including an element $s_n$ includes at least a first sequence in a second sequence set or an equivalent sequence of the first sequence, and a second sequence in the second sequence set or an equivalent sequence of the second sequence. Herein, for sequences in the second sequence set, refer to the description in the specification.

In a possible design, when N=18, a set of one or more sequences $\{s_n\}$ including an element $s_n$ includes at least a first sequence in a fourth sequence set and a second sequence in the fourth sequence set. Herein, for sequences in the fourth sequence set, refer to the description in the specification.

In a possible design, the equivalent sequence $\{q_n\}$, and an element $q_n$ in the equivalent sequence $\{q_n\}$ satisfies that $q_n = s_{(n+M) mod N}$, where $M \in \{0, 1, 2, \ldots, N-1\}$, and N is a sequence length.

A second aspect of the embodiments of this application provides a sequence-based signal processing method. The signal processing method includes:

receiving a first signal carried on N subcarriers; obtaining N elements in a sequence $\{x_n\}$ where N is a positive integer greater than N 1, $x_n$ is an element in the sequence $\{x_n\}$, the sequence $\{x_n\}$ is a sequence satisfying a preset condition, the preset condition is: $x_n = A \cdot b_n \cdot j^n$, a value of n ranges from 0 to N−1, A is a non-zero complex number, $j=\sqrt{-1}$, the element $b_n = u \cdot (-2 \cdot s_n)$, u is a non-zero complex number, and a set of one or more sequences $\{s_n\}$ including an element $s_n$ includes at least one sequence in a first sequence set or at least one equivalent sequence of the sequence in the first sequence set; and processing the first signal based on the N elements in the sequence $\{x_n\}$. For sequences in the first sequence set, refer to the description in the specification.

It should be noted that the preset condition satisfied by the sequence $\{x_n\}$ may be represented in a plurality of equivalent manners. For example, the preset condition may alternatively be represented as: $x_n = A \cdot b_n' \cdot j^{n \bmod 2}$, where n is an integer, a value of n ranges from 0 to N−1, N is a positive integer greater than 1, A is a non-zero complex number, j= $\sqrt{-1}$, the element $b_n' = u \cdot (1 - 2 \cdot s_n')$ and u is a non-zero complex number. Although representation manners of the two preset conditions are different, when $s_n'$ and $s_n$ satisfy $s_n' = (s_n^* + s_n) \bmod 2$, and $s_n^* = (1-(-1)^{\lceil n/2 \rceil})/2$, the two preset conditions describe the same sequence $\{x_n\}$.

In other words, for the sequence $\{x_n\}$, regardless of a manner used to represent the preset condition satisfied by the sequence $\{x_n\}$, the sequence $\{x_n\}$ satisfying the preset condition represented in any manner is equivalent to one sequence, provided that $s_n'$ and $s_n$ satisfy that $s_n' = (s_n^* + s_n) \bmod 2$, and $s_n^* = (1-(-1)^{\lceil n/2 \rceil})/2$.

In a possible design, when N=18, a corresponding operation may be performed according to the foregoing method; or when N=18, a corresponding operation may be performed according to the following method. The following method is: when N=18, receiving the first signal carried on the N subcarriers, and obtaining the N elements in the sequence $\{x_n\}$, where N is a positive integer greater than 1, $x_n$, is an element in the sequence $\{x_n\}$, the sequence $\{x_n\}$ is a sequence satisfying a preset condition, and the preset condition is: $x_n = y_{(n+M) mod N}$, where $M \in \{0, 1, 2, \ldots, N-1\}$, $y_n = A \cdot b_n \cdot j^n$, a value of n ranges from 0 to N−1, A is a non-zero complex number, $j=\sqrt{-1}$, the element $b_n = u \cdot (1-2 \cdot s_n)$, u is a non-zero complex number, and a set of one or more sequences $\{s_n\}$ including an element $s_n$ includes at least one sequence in a third sequence set. Herein, for sequences in the third sequence set, refer to the description in the specification.

According to the foregoing solution, by using the determined sequence, when a signal is sent on a PUSCH, relatively good sequence frequency domain flatness can be maintained, and a relatively low PAPR value and a relatively low cross-correlation between sequences can be maintained, thereby satisfying a communications application environment in which a signal is sent on the PUSCH, especially an NR system scenario or an NR similar scenario.

In a possible design, the receiving the first signal carried on the N subcarriers, and obtaining the N elements in the sequence $\{x_n\}$ includes: obtaining, on N continuous subcarriers, the first signal on the N subcarriers; or obtaining, on N subcarriers having equal spacings, the first signal on the N subcarriers; obtaining N elements in a sequence $\{f_n\}$, where N is a positive integer greater than 1, the first signal is generated by mapping the sequence $\{f_n\}$ to the N subcarriers, and $f_n$ is an element in the sequence $\{f_n\}$; and performing inverse discrete Fourier transform processing on the sequence $\{f_n\}$, to obtain the N elements in the sequence $\{x_n\}$.

In a possible design, the first signal is a reference signal, or the first signal is a signal used to carry communication information.

In a possible design, a set of one or more sequences $\{s_n\}$ including an element $s_n$ includes at least a first sequence in a second sequence set or an equivalent sequence of the first sequence, and a second sequence in the second sequence set or an equivalent sequence of the second sequence. Herein, for sequences in the second sequence set, refer to the description in the specification.

In a possible design, when N=18, a set of one or more sequences $\{s_n\}$ including an element $s_n$ includes at least a first sequence in a fourth sequence set and a second sequence in the fourth sequence set. Herein, for sequences in the fourth sequence set, refer to the description in the specification.

In a possible design, the equivalent sequence is $\{q_n\}$ and an element $q_n$ in the equivalent sequence $\{q_n\}$ satisfies that $q_n = s_{(n+M) \bmod N}$, where $M \in \{0, 1, 2, \ldots, N-1\}$, and N is a sequence length.

A third aspect of the embodiments of this application provides a signal processing apparatus. The signal processing apparatus may be a communications device, or may be a chip in a communications device, and the communications device or the chip has functions of implementing the sequence-based signal processing method according to any one of the first aspect or the possible designs of the first aspect. The functions may be implemented by hardware, or may be implemented by hardware executing corresponding software. The hardware or the software includes one or more units corresponding to the functions.

The communications device includes a processing unit and a transceiver unit. The processing unit may be a processor, the transceiver unit may be a transceiver, and the transceiver includes a radio frequency circuit. Optionally, the communications device further includes a storage unit, and the storage unit may be, for example, a memory. When the communications device includes the storage unit, the storage unit is configured to store a computer executable instruction. The processing unit is connected to the storage unit, and the processing unit executes the computer executable instruction stored in the storage unit, so that the communications device performs the sequence-based signal processing method according to any one of the first aspect or the possible designs of the first aspect.

The chip includes a processing unit and a transceiver unit. The processing unit may be a processor, and the transceiver unit may be an input/output interface, a pin, a circuit, or the like on the chip. The processing unit may execute a computer executable instruction stored in the storage unit, so that the chip performs the sequence-based signal processing method according to any one of the first aspect or the possible designs of the first aspect. Optionally, the storage unit may be a storage unit (for example, a register or a buffer) in the chip, or the storage unit may be a storage unit (for example, a read-only memory (read-only memory, ROM)) that is in the communications device and that is located outside the chip, another type of static storage device (for example, a random access memory (random access memory, RAM)) that can store static information and an instruction, or the like.

The processor in the third aspect may be a central processing unit (central processing unit, CPU), a microprocessor, or an application-specific integrated circuit (application specific integrated circuit, ASIC), or may be one or more integrated circuits configured to control program execution of the sequence-based signal processing method according to any one of the first aspect or the possible designs of the first aspect.

A fourth aspect of the embodiments of this application provides a signal processing apparatus. The signal processing apparatus may be a communications device, or may be a chip in a communications device, and the communications device or the chip has functions of implementing the sequence-based signal processing method according to any one of the second aspect or the possible designs of the second aspect. The functions may be implemented by hardware, or may be implemented by hardware executing corresponding software. The hardware or the software includes one or more units corresponding to the functions.

The communications device includes a processing unit and a transceiver unit. The processing unit may be a processor, the transceiver unit may be a transceiver, and the transceiver includes a radio frequency circuit. Optionally, the communications device further includes a storage unit, and the storage unit may be, for example, a memory. When the communications device includes the storage unit, the storage unit is configured to store a computer executable instruction. The processing unit is connected to the storage unit, and the processing unit executes the computer executable instruction stored in the storage unit, so that the communications device performs the sequence-based signal processing method according to any one of the second aspect or the possible designs of the second aspect.

The chip includes a processing unit and a transceiver unit. The processing unit may be a processor, and the transceiver unit may be an input/output interface, a pin, a circuit, or the like on the chip. The processing unit may execute a computer executable instruction stored in the storage unit, so that the chip performs the sequence-based signal processing method according to any one of the second aspect or the possible designs of the second aspect. Optionally, the storage unit may be a storage unit (for example, a register or a buffer) in the chip, or the storage unit may be a storage unit (for example, a read-only memory (read-only memory, ROM)) that is in the communications device and that is located outside the chip, another type of static storage device (for example, a random access memory (random access memory, RAM)) that can store static information and an instruction, or the like.

The processor in the fourth aspect may be a central processing unit (central processing unit, CPU), a microprocessor, or an application-specific integrated circuit (application specific integrated circuit, ASIC), or may be one or more integrated circuits configured to control program execution of the sequence-based signal processing method according to any one of the second aspect or the possible designs of the second aspect.

A fifth aspect of the embodiments of this application provides a communications system. The communications system includes the communications device provided in the third aspect of the embodiments of this application and the communications device provided in the fourth aspect of the embodiments of this application.

A sixth aspect of the embodiments of this application provides a computer-readable storage medium, configured to store a computer instruction, and when the computer instruction is run on a computer, the computer is enabled to perform the sequence-based signal processing method provided in the first aspect or the second aspect of the embodiments of this application.

A seventh aspect of the embodiments of this application provides a computer program product including an instruction. When the computer program product is run on a computer, the computer is enabled to perform the sequence-based signal processing method provided in the first aspect or the second aspect.

According to the sequence-based signal processing method disclosed in this embodiment of this application, the sequence-based signal processing apparatus, the communications system, the computer-readable storage medium, and the computer program product that are disclosed in the embodiments of this application, a sequence used for sending a signal on a PUSCH is determined. The sequence is a sequence $\{x_n\}$ including N elements, $x_n$ is an element in the sequence $\{x_n\}$, and the determined sequence $\{x_n\}$ is a sequence satisfying the preset condition. Then, the first signal is generated and sent. By using the determined sequence, when a signal is sent on the PUSCH, relatively good sequence frequency domain flatness can be maintained, and a relatively low PAPR value and a relatively low cross-correlation between sequences can be maintained, thereby satisfying a communications application environment in which a signal is sent on the PUSCH, especially an NR system scenario or an NR similar scenario.

DESCRIPTION OF EMBODIMENTS

Figure 1:
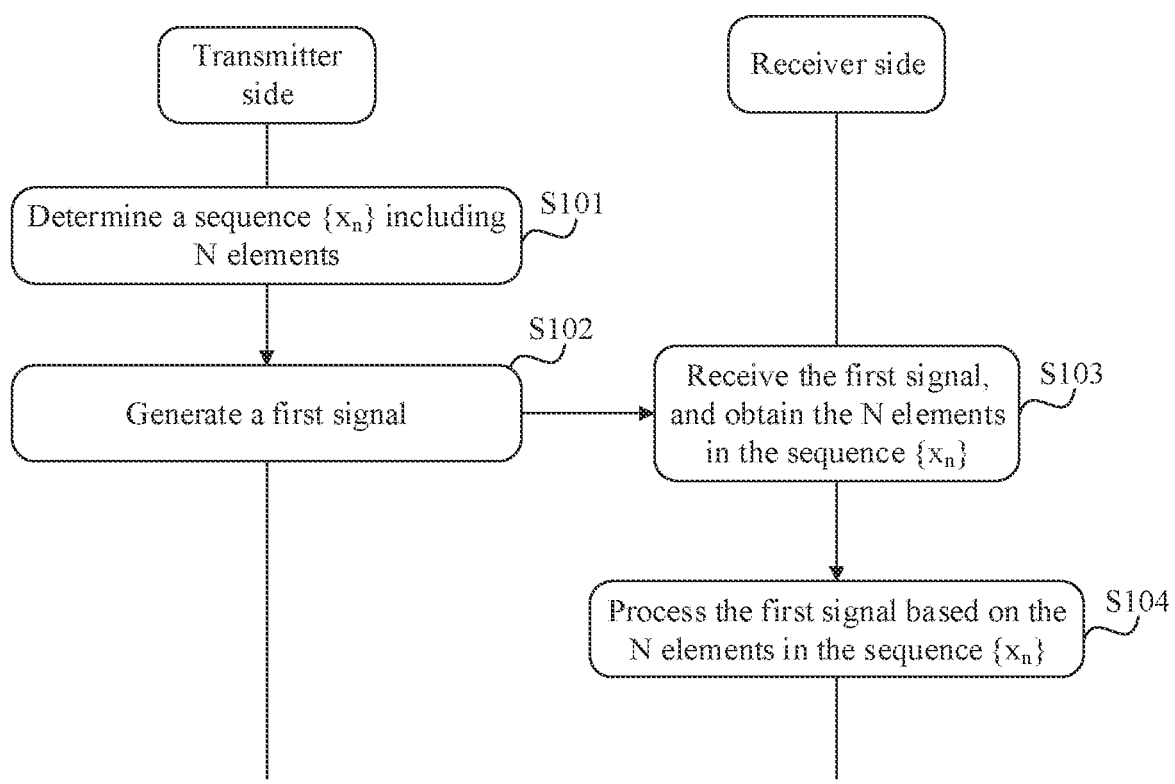
FIG. 1 is a schematic flowchart of sequence-based signal sending and processing according to an embodiment of this application.

Embodiments of this application provides a sequence-based signal processing method and a communications device. By determining a sequence used to send a signal on a PUSCH, when a signal is sent on the PUSCH, relatively good sequence frequency domain flatness can be maintained, and a relatively low PAPR value and a relatively low cross-correlation between sequences can be maintained, thereby satisfying a communications application environment in which a signal is sent on the PUSCH, especially an NR system scenario or an NR similar scenario.

In the descriptions of the embodiments, claims, and accompanying drawings of this application, unless otherwise specified, "plurality of" means two or more than two. In addition, to clearly describe the technical solutions in the embodiments of this application, terms such as "first" and "second" are used in the embodiments of this application to distinguish between same items or similar items that have basically the same functions or purposes. Persons skilled in the art may understand that the terms such as "first" and "second" do not limit a quantity or an execution sequence, and that the terms such as "first" and "second" do not indicate a definite difference. In addition, the terms "include" and "have" in the embodiments, claims, and accompanying drawings of this application are not exclusive. For example, a process, a method, a system, a product, or a device including a series of steps or modules is not limited to the listed steps or modules, and may further include steps or modules that are not listed.

In a communications system, a reference signal is generally used to calculate a channel estimation matrix, so as to demodulate data information. Currently, in an LTE system, a 4G system, a 4.5G system, a 5G system, and an NR system or an NR similar scenario, when π/2 BPSK modulation can be used for an uplink DFT-s-OFDM DMRS waveform, the uplink DMRS may use a Gold sequence-based sequence, or may use a CGS. However, when the π/2 BPSK modulation scheme is used for an uplink DFT-s-OFDM DMRS waveform and a filter is used, if the Gold sequence-based sequence or the CGS is used for the uplink DMRS, and filtering cannot be performed properly, frequency flatness of the sequence is relatively poor, which does not facilitate channel estimation. Currently, a ZC sequence can be used for a DFT-s-OFDM DMRS waveform in NR.

The ZC sequence is a sequence that satisfies a property of a CAZAC sequence, and is mathematically defined as follows: When a length N of the ZC sequence is an even number:

$$x_u(n) = e^{-j\frac{u\pi n^2}{N}},$$

0≤n≤N; or when a length N of the ZC sequence is an odd number, $$x_u(n) = e^{-j\frac{u\pi n(n+1)}{N}},$$

0≤n≤N. A period of the ZC sequence is a length of the ZC sequence, and the ZC sequence satisfies a centro-symmetry property. In addition, the ZC sequence has a good autocorrelation and a cross-correlation. An autocorrelation coefficient of the ZC sequence is N at a start point, other points are all zero, and a cross-correlation coefficient of different roots is approximate to $\sqrt{N}$. However, when the π/2 BPSK modulation scheme is used for the uplink DFT-s-OFDM DMRS waveform, using the ZC sequence may cause a PAPR of the DMRS to be higher than a PAPR of data transmission. Consequently, out-of-band emission and in-band signal loss of a pilot signal are caused, and channel estimation performance is affected, or uplink coverage is limited.

To ensure that in an LTE system, a 4G system, a 4.5G system, a 5G system, an NR system, or an NR similar scenario, and even another communications system or communications application environment that has a higher requirement, a sequence used for a DMRS of a PDSCH can maintain relatively good sequence frequency domain flatness when a signal is sent on the PDSCH. In addition, a relatively low PAPR value and a relatively low cross-correlation between sequences are maintained. The embodiments of the present invention provide a specific implementation process of sequence-based signal processing. Detailed descriptions are provided by using the following embodiments.

In the embodiments of the present invention, sequence-based signal processing is mainly described from the perspective of a receiver side and a transmitter side in a communications system or a communications application environment. The receiver side may be a network device, and the transmitter side may be a terminal device. Alternatively, the receiver side may be a terminal device, and the transmitter side may be a network side. In the following embodiments, an example in which the receiver side is a network device and the transmitter side is a terminal device is used for description, but the present invention is not limited thereto.

The terminal device in the embodiments of this application may be user equipment. The user equipment may be a wired device or a wireless device. The wireless device may be a handheld device having a wireless connection function, or another processing device connected to a wireless modem, or a mobile terminal that communicates with one or more core networks by using a radio access network. For example, the wireless terminal may be a mobile telephone, a mobile phone, a computer, a tablet computer, a personal digital assistant (personal digital assistant, PDA), a mobile internet device (mobile internet device, MID), a wearable device, an electronic reader, or the like. For another example, the wireless terminal may also be a portable, pocket-sized, handheld, computer built-in, or vehicle-mounted mobile device. For still another example, the wireless terminal may be a mobile station or an access point.

The network device in the embodiments of this application may be a base station. The base station may include a macro base station, a micro base station, a relay node, an access point, a base station controller, a transmission point, a reception point, and the like that are in various forms. In systems in which different radio access technologies are used, specific names of the base station may be different.

FIG. 1 is a schematic flowchart of a sequence-based signal processing method according to an embodiment of this application. The method includes the following steps.

S101. A terminal device determines a sequence $\{x_n\}$ including N elements.

Optionally, S101 may be performed as follows: After accessing a network, the terminal device determines the sequence $\{x_n\}$ including the N elements. Alternatively, when the terminal device accesses the network, the network device determines a sequence $\{b_n\}$ and configures the sequence $\{b_n\}$ for the terminal device, and the terminal device determines, based on the sequence $\{b_n\}$, the sequence $\{x_n\}$ including N elements, where N is a positive integer greater than 1.

During specific implementation, $x_n$ is an element in the sequence $\{x_n\}$, and $b_n$ is an element in the sequence $\{b_n\}$. The determined sequence $\{x_n\}$ is a sequence satisfying a preset condition. The preset condition is: $x_n = A \cdot b_n \cdot j^n$, where n is an integer, a value of n ranges from 0 to N−1, N is a positive integer greater than 1, A is a non-zero complex number, $j=\sqrt{-1}$, the element $b_n = u \cdot (-2 \cdot s_n)$, and u is a non-zero complex number.

It should be noted that, in a calculation process, optionally, a value of u is not constant. During specific implementation, the value of u is the same for all elements in a same currently selected sequence. The value of u may be different for elements in different sequences.

A sequence $\{s_n\}$ including an element $s_n$ is a sequence in a first sequence set or an equivalent sequence of the sequence in the first sequence set.

In a possible embodiment, when N=18, calculation may be performed based on the foregoing preset condition, and a corresponding operation is performed.

In another possible embodiment, when N=18, the preset condition may alternatively be: $x_n = y_{(n+M) \mod N}$, where $M \in \{0, 1, 2, \ldots, N-1\}$, $y_n = A \cdot b_n \cdot j^n$, n is an integer, a value of n ranges from 0 to N−1, N is a positive integer greater than 1, A is a non-zero complex number, $j=\sqrt{-1}$, the element $b_n = u \cdot (1-2 \cdot s_n)$, u is a non-zero complex number, and (n+M) mod N is a subscript of y.

It should be noted that, in a calculation process, optionally, a value of u is not constant. During specific implementation, the value of u is the same for all elements in a same currently selected sequence. The value of u may be different for elements in different sequences.

A sequence $\{s_n\}$ including an element $s_n$ is a sequence in a third sequence set.

In addition, in another possible embodiment, when N=12, and/or when N=18, and/or when N=24, the preset condition may further be: $x_n = y_{(n+M) \mod N}$, where $M \in \{0, 1, 2, \ldots, N-1\}$, $y_n = A \cdot b_n \cdot j^{n \mod 2}$, a value of n ranges from 0 to N−1, A is a non-zero complex number, $j=\sqrt{-1}$, the element $b_n = u \cdot (1-2 \cdot s_n)$, u is a non-zero complex number, and (n+M) mod N is a subscript of y.

A set of one or more sequences $\{s_n\}$ including an element $s_n$ includes at least one sequence in a fifth sequence set.

It should be noted that, in a calculation process, optionally, a value of u is not constant. During specific implementation, the value of u is the same for all elements in a same currently selected sequence. The value of u may be different for elements in different sequences.

A sequence $\{s_n\}$ including an element $s_n$ is a sequence in a third sequence set.

In a possible example, when a sequence length of the first sequence set is 12, that is, when N=12, some or all sequences in a sequence set 1 in the first sequence set are included, and the sequences in the sequence set 1 include the following 61 sequences. When time domain filtering is performed on sequences $\{x_n\}$ corresponding to these sequences and equivalent sequences of these sequences obtained after π/2 BPSK modulation, and a filtering coefficient is [0.1, 1, 0.1], a PAPR is less than 3.05 dB; when a filtering coefficient is [0.16, 1, 0.16], a PAPR is less than 2.52 dB; when a filtering coefficient is [0.22, 1, 0.22], a PAPR is less than 1.95 dB; or when a filtering coefficient is [0.28, 1, 0.28], a PAPR is less than 1.50 dB. In addition, when a first maximum normalized power of a frequency domain sequence corresponding to $\{x_n\}$ is less than 4 dB, and a first minimum normalized power is greater than −4 dB, frequency domain flatness of the corresponding sequence $\{x_n\}$ is better:

{1, 0, 0, 0, 0, 0, 0, 0, 1, 0, 1, 1}; {1, 0, 0, 0, 0, 0, 0, 0, 1, 1, 1, 0}; {1, 0, 0, 0, 0, 0, 0, 1, 0, 1, 0, 1}; {1, 0, 0, 0, 0, 0, 0, 1, 1, 0, 1, 0}; {1, 0, 0, 0, 0, 0, 1, 0, 0, 0, 1, 0}; {1, 0, 0, 0, 0, 0, 1, 0, 1, 0, 0, 0}; {1, 0, 0, 0, 0, 1, 0, 0, 1, 0, 1, 0}; {1, 0, 0, 0, 0, 1, 0, 1, 0, 0, 1}; {1, 0, 0, 0, 0, 1, 0, 1, 0, 0, 0, 1}; {1, 0, 0, 0, 0, 1, 0, 1, 0, 0}; {1, 0, 0, 0, 0, 1, 0, 1, 0, 1, 1}; {1, 0, 0, 0, 0, 1, 0, 1, 1, 1, 0, 1}; {1, 0, 0, 0, 0, 1, 1, 0, 0, 0, 1, 0}; {1, 0, 0, 0, 0, 1, 1, 0, 1, 0, 1, 1}; {1, 0, 0, 0, 1, 1, 0, 1, 1, 1, 0}; {1, 0, 0, 0, 0, 1, 1, 1, 0, 1, 0, 0}; {1, 0, 0, 0, 0, 1, 1, 1, 0, 1, 1, 0}; {1, 0, 0, 1, 0, 0, 0, 0, 1, 0, 1}; {1, 0, 0, 1, 0, 0, 0, 0, 1, 1}; {1, 0, 0, 1, 0, 1, 1, 1, 1, 0}; {1, 0, 0, 1, 0, 1, 0, 0, 0, 0, 1}; {1, 0, 0, 1, 0, 1, 0, 1, 0, 0, 1, 1,

1}; {1, 0, 0, 1, 0, 1, 0, 0, 1, 1, 1, 1}; {1, 0, 0, 1, 0, 0, 1, 1, 1, 1, 1}; {1, 0, 0, 1, 0, 1, 1, 0, 0, 0, 0, 0}; {1, 0, 0, 1, 0, 1, 1, 0, 1, 1, 1, 1}; {1, 0, 0, 1, 0, 1, 1, 1, 1, 0, 0, 0}; {1, 0, 0, 1, 0, 1, 1, 1, 1, 1, 0, 0, 1}; {1, 0, 0, 1, 0, 1, 1, 1, 1, 1, 1, 0, 1}; {1, 0, 0, 1, 1, 0, 0, 0, 0, 0, 1, 0}; {1, 0, 0, 1, 1, 0, 0, 1, 1, 0, 0, 0, 0, 1}; {1, 0, 0, 1, 1, 1, 0, 0, 0, 0}; {1, 0, 0, 1, 1, 0, 1, 0, 0, 0, 0, 1}; {1, 0, 0, 1, 1, 0, 1, 0, 1, 1, 1, 1}; {1, 0, 0, 1, 1, 0, 1, 1, 1, 1, 1, 0}; {1, 0, 0, 1, 1, 1, 0, 1, 0, 1, 1, 1}; {1, 0, 0, 1, 1, 1, 0, 0, 0, 1, 0}; {1, 0, 0, 1, 1, 1, 1, 0, 1, 0, 0, 0}; {1, 0, 0, 1, 1, 1, 1, 0, 1, 1, 0, 1, 1}; {1, 0, 0, 1, 1, 1, 1, 1, 0, 1, 0, 1}; {1, 0, 0, 1, 1, 1, 1, 1, 1, 0, 1, 0}; {1, 1, 0, 0, 0, 0, 1, 1, 0, 1, 0}; {1, 1, 0, 0, 0, 1, 0, 0, 0, 0, 1, 0}; {1, 1, 0, 0, 0, 1, 0, 0, 0, 1, 1, 0}; {1, 1, 0, 0, 0, 1, 0, 1, 1, 0, 1, 1}; {1, 1, 0, 0, 0, 1, 0, 1, 1, 1, 1, 1}; {1, 1, 0, 0, 1, 0, 0, 1, 1, 1, 0, 1}; {1, 1, 0, 0, 1, 0, 1, 1, 1, 1, 0, 1}; {1, 1, 0, 1, 0, 0, 0, 0, 1, 0, 0, 0}; {1, 1, 0, 1, 0, 0, 0, 1, 1, 1, 1, 0}; {1, 1, 0, 1, 0, 0, 0, 1, 1, 1, 1, 1}; {1, 1, 0, 1, 0, 0, 1, 1, 1, 0, 1, 1}; {1, 1, 0, 1, 0, 1, 0, 1, 1, 0, 1, 1}; {1, 1, 0, 1, 0, 1, 0, 1, 1, 1, 0}; {1, 1, 0, 1, 0, 1, 1, 1, 0, 1, 1, 1}; {1, 1, 0, 1, 0, 1, 1, 1, 1, 1, 0, 1}.

The sequences in the sequence set 1 further include the following and the following 8 sequences. When time domain filtering is performed on sequences {$x_n$} corresponding to these sequences and equivalent sequences of these sequences obtained after π/2 BPSK modulation, and the filtering coefficient is [0.28, 1, 0.28], the PAPR is less than 1.50 dB. In addition, when a first maximum normalized power of a frequency domain sequence corresponding to {$x_n$} is less than 4 dB, and a first minimum normalized power is greater than −4 dB, frequency domain flatness of the corresponding sequence {$x_n$} is better:

{1, 0, 0, 0, 0, 1, 0, 0, 0, 1, 0, 1}; {1, 0, 0, 0, 0, 1, 0, 0, 1, 1, 1, 0}; {1, 0, 0, 0, 0, 1, 0, 1, 1, 1, 0, 0}; {1, 0, 0, 0, 0, 1, 1, 0, 1, 0, 0, 0}; {1, 0, 0, 1, 0, 1, 1, 1, 0, 1, 1, 1}; {1, 0, 0, 1, 1, 1, 1, 0, 1, 1, 1, 0}; {1, 1, 0, 0, 0, 1, 0, 1, 1, 1, 1, 0}; {1, 1, 0, 1, 0, 0, 0, 1, 1, 0, 1, 1}.

In a possible example, when a sequence length of the first sequence set is 24, that is, when N=24, some or all sequences in a sequence set 2 in the first sequence set are included, and the sequence set 2 includes the following 194 sequences. When time domain filtering is performed on sequences {$x_n$} corresponding to these sequences and equivalent sequences of these sequences obtained after π/2 BPSK modulation, and a filtering coefficient is [0.1, 1, 0.1], a PAPR is less than 3.17 dB; when a filtering coefficient is [0.16, 1, 0.16], a PAPR is less than 2.58 dB; when a filtering coefficient is [0.22, 1, 0.22], a PAPR is less than 1.94 dB; or when a filtering coefficient is [0.28, 1, 0.28], a PAPR is less than 1.39 dB. In addition, when a first maximum normalized power of a frequency domain sequence corresponding to {$x_n$} is less than 1.5 dB, and a first minimum normalized power is greater than −1.5 dB, frequency domain flatness of the corresponding sequence {$x_n$} is better:

{1, 0, 0, 0, 0, 1, 0, 0, 1, 0, 0, 0, 1, 0, 1, 0, 0, 0, 1, 1, 0, 1, 1}; {1, 0, 0, 0, 0, 1, 0, 0, 1, 0, 0, 0, 1, 0, 1, 0, 0, 0, 1, 1, 1, 1, 0, 0}; {1, 0, 0, 0, 0, 1, 0, 0, 1, 1, 1, 0, 0, 0, 1, 0, 1, 0, 0, 0, 1, 0, 0}; {1, 0, 0, 0, 0, 1, 0, 1, 0, 0, 0, 1, 0, 0, 1, 0}; {1, 0, 0, 0, 0, 1, 0, 1, 0, 0, 0, 1, 0, 0, 0, 1, 1, 1, 0, 1}; {1, 0, 0, 0, 0, 1, 0, 1, 0, 0, 0, 1, 0, 0, 0, 1, 0, 0, 0, 1, 0, 0, 1, 0, 1, 0, 1, 1, 0, 0, 0, 1}; {1, 0, 0, 0, 0, 1, 0, 1, 0, 1, 1, 0, 0, 1, 1, 0, 1, 0, 0, 0, 1, 1}; {1, 0, 0, 1, 0, 0, 0, 0, 1, 0, 1, 0, 0, 1, 1, 0, 0, 0, 0, 1, 0, 1}; {1, 0, 0, 1, 0, 0, 0, 0, 1, 0, 1, 1, 1, 0, 0, 1, 0, 1, 0, 0}; {1, 0, 0, 1, 0, 0, 0, 0, 0, 1, 1, 0, 0, 0, 1, 0, 1, 0, 1, 1, 1, 1, 0}; {1, 0, 0, 1, 0, 0, 0, 0, 0, 1, 1, 1, 0, 0, 0, 0, 1}; {1, 0, 0, 1, 0, 0, 0, 0, 0, 1, 1, 1, 0, 0, 0, 0, 1}; {1, 0, 0, 1, 0, 0, 0, 0, 1, 1, 1, 0, 0, 0, 1}; {1, 0, 0, 1, 1, 1, 1, 1, 1, 0, 0}; {1, 0, 0, 1, 0, 0, 1, 0, 0, 0, 0, 0, 1, 1, 1, 0}; {1, 0, 0, 1, 0, 0, 0, 0, 1, 1, 1, 1, 0, 0, 0, 0}; {1, 0, 0, 1, 0, 0, 1, 0, 1, 1, 1, 1, 1, 0, 0, 1, 0, 1}; {1, 0, 0, 1, 0, 0, 0, 0, 1, 1, 1, 1, 0, 1, 1, 1, 0, 0, 0, 0}; {1, 0, 0, 1, 0, 0, 0, 0, 1, 1, 1, 1, 0, 1, 1, 0, 0}; {1, 0, 0, 1, 0, 0, 0, 0, 1, 1, 1, 1, 0, 1, 1, 0, 1, 1, 0, 1, 0, 1, 1}; {1, 0, 0, 1, 0, 0, 0, 1, 0, 0, 1, 0, 1}; {1, 0, 0, 0, 1, 0, 0, 0, 0, 1, 1, 1}; {1, 0, 0, 1, 0, 0, 0, 1, 0, 1, 1, 1, 1, 0, 0, 1, 1, 1}; {1, 0, 0, 1, 0, 0, 0, 1, 0, 0, 0, 1, 0, 0, 1, 0}; {1, 0, 0, 1, 0, 0, 1, 1, 1, 1, 1, 0, 1, 0}; {1, 0, 0, 1, 0, 0, 1, 0, 0, 1, 1, 1, 1, 1, 0, 0, 0, 0}; {1, 0, 0, 1, 0, 0, 0, 1, 0, 1, 0, 0, 0, 1, 1, 1, 1, 0, 0, 0, 0}; {1, 0, 0, 1, 0, 1, 0, 1, 1, 1, 1, 1, 0, 0, 0, 0}; {1, 0, 0, 1, 0, 0, 0, 1, 0, 1, 1, 1, 0, 0, 0, 1, 0}; {1, 0, 0, 1, 0, 0, 0, 0, 1, 1, 1, 0, 0, 0, 1, 0}; {1, 0, 0, 1, 0, 0, 1, 0, 1, 0, 1, 1, 0, 0, 0, 1, 0}; {1, 0, 0, 1, 0, 0, 1, 0, 1, 1, 1, 0, 0, 0, 1, 1, 1, 1, 1}; {1, 0, 0, 1, 0, 0, 1, 0, 1, 0, 0, 0, 1, 0, 1, 1, 1, 1, 0}; {1, 0, 0, 1, 0, 0, 1, 0, 1, 0, 0, 0, 0, 0, 1, 1, 0, 0, 1, 1}; {1, 0, 0, 1, 0, 0, 1, 0, 1, 0, 1, 0, 0, 0, 0, 0, 1, 1, 0, 0, 1, 1}; {1, 0, 0, 1, 0, 0, 1, 0, 1, 0, 1, 0, 0, 1, 1, 0, 0, 0, 0}; {1, 0, 0, 1, 0, 1, 0, 1, 1, 0, 0, 1, 1, 1, 1, 1, 1, 0, 0}; {1, 0, 0, 1, 0, 0, 1, 0, 1, 0, 1, 0, 0, 0, 0, 1, 1, 0, 0, 1, 1}; {1, 0, 0, 1, 0, 1, 0, 1, 1, 0, 0, 1, 1, 1, 1, 1, 1, 0, 0}; {1, 0, 0, 1, 0, 1, 0, 1, 1, 0, 0, 1, 1, 1, 1, 1, 1, 0, 0, 1, 1, 0}; {1, 0, 0, 1, 0, 1, 0, 1, 0, 1, 1, 0, 0, 0, 0, 1, 1, 1, 1, 0}; {1, 0, 0, 1, 0, 1, 0, 1, 1, 0, 0, 1, 0, 0, 0, 0, 1, 1, 1, 1, 0}; {1, 0, 0, 1, 0, 1, 0, 1, 0, 1, 0, 0, 1, 1, 1, 1, 1, 0, 0, 1}; {1, 0, 0, 1, 0, 1, 0, 1, 1, 0, 0, 0, 0, 0, 1, 1, 1, 1, 0, 1}

0, 0, 0}; {1, 0, 0, 1, 0, 1, 0, 1, 1, 0, 0, 1, 0, 0, 0, 0, 1, 1, 1, 0, 1, 1, 1, 1}; {1, 0, 0, 1, 0, 1, 0, 1, 1, 0, 0, 1, 0, 0, 0, 1, 1, 1, 1, 0, 1, 1, 1, 1}; {1, 0, 0, 1, 0, 1, 0, 1, 1, 0, 1, 1, 1, 1, 0, 0, 0, 1, 1, 1, 1, 0, 1}; {1, 0, 0, 1, 0, 1, 0, 1, 1, 1, 1, 0, 0, 1, 1, 0, 1, 0, 0, 0, 0, 0, 1}; {1, 0, 0, 1, 0, 1, 0, 1, 1, 1, 1, 0, 1, 1, 1, 0, 0, 0, 0, 1, 1, 0, 1}; {1, 0, 0, 1, 0, 1, 1, 0, 0, 0, 1, 0, 1, 1, 1, 0, 0, 0, 0, 0, 0}; {1, 0, 0, 1, 0, 1, 1, 0, 0, 0, 0, 1, 0, 1, 1, 1, 1, 0, 0, 1, 1, 0}; {1, 0, 0, 1, 0, 1, 1, 0, 0, 0, 1, 0, 1, 1, 1, 1, 1, 0, 0, 1, 1}; {1, 0, 0, 1, 0, 1, 1, 0, 1, 0, 1, 1, 1, 1, 0, 0, 0, 1, 0, 1, 1}; {1, 0, 0, 1, 0, 1, 1, 0, 0, 0, 1, 0, 0, 0, 0, 1, 0, 0, 1, 1, 1, 0}; {1, 0, 0, 1, 0, 1, 1, 1, 0, 0, 0, 1, 1, 0, 1, 1, 1, 1, 1, 1, 0, 1, 0, 1}; {1, 0, 0, 1, 0, 1, 1, 1, 0, 1, 0, 0, 0, 0, 0, 1, 1, 0, 0, 0, 1}; {1, 0, 0, 1, 0, 1, 1, 1, 0, 1, 0, 0, 0, 1, 1, 0, 1, 1, 1, 1, 1, 0, 1, 1}; {1, 0, 0, 1, 0, 1, 1, 1, 1, 0, 1, 0, 1, 1, 0, 0, 0, 1, 1, 0, 1, 1, 1, 1}; {1, 0, 0, 1, 0, 1, 1, 1, 1, 0, 0, 1, 1, 0, 1, 1, 1, 1, 0, 0, 0, 1, 0}; {1, 0, 0, 1, 0, 1, 1, 1, 1, 0, 1, 1, 0, 0, 0, 1, 0, 1, 0, 0, 0, 0, 1}; {1, 0, 0, 1, 0, 1, 1, 1, 1, 1, 0, 0, 0, 1, 0, 0, 0, 0, 1, 0, 1, 0, 0, 1}; {1, 0, 0, 1, 0, 1, 1, 1, 1, 1, 0, 1, 1, 0, 1, 0, 1, 0, 0, 0, 0, 1}; {1, 0, 0, 1, 1, 0, 0, 0, 0, 1, 0, 1, 0, 0, 1, 1, 1, 0, 1, 0, 0, 0, 0, 0}; {1, 0, 0, 1, 1, 0, 0, 0, 0, 1, 0, 1, 1, 0, 1, 0, 1, 1, 1, 0, 0, 0, 0, 0}; {1, 0, 0, 1, 1, 0, 0, 0, 1, 0, 1, 0, 0, 0, 0, 1, 0, 0, 1, 1, 1, 1, 0}; {1, 0, 0, 1, 1, 0, 1, 0, 0, 0, 0, 0, 1, 1, 1, 0, 1, 1, 1, 1, 0, 1, 0, 1}; {1, 0, 0, 1, 1, 0, 1, 0, 0, 0, 0, 1, 0, 0, 1, 1, 1, 0, 1, 0, 1, 1, 1, 1}; {1, 0, 0, 1, 1, 0, 1, 0, 0, 0, 0, 1, 1, 1, 1, 1, 0, 1, 1, 0, 1}; {1, 0, 0, 1, 1, 0, 1, 0, 0, 0, 0, 1, 1, 1, 1, 1, 0, 1, 1, 0, 1, 1, 1, 0, 0}; {1, 0, 0, 1, 1, 0, 1, 0, 1, 0, 1, 1, 1, 1, 0, 0, 0, 0, 0, 0, 1, 0, 0, 0}; {1, 0, 0, 1, 1, 0, 1, 0, 1, 0, 1, 1, 1, 1, 1, 1, 0, 1}; {1, 0, 0, 1, 1, 0, 1, 0, 1, 0, 1, 1, 1, 1, 0, 1, 0, 1, 1, 1, 1}; {1, 0, 0, 1, 1, 0, 1, 0, 1, 1, 1, 0, 0, 0, 1, 1, 1, 0}; {1, 0, 0, 1, 1, 0, 1, 0, 1, 1, 1, 1, 0, 0, 1, 0}; {1, 0, 0, 1, 1, 0, 1, 0, 1, 1, 1, 1, 0, 0, 0, 1, 1, 1, 0, 1, 0}; {1, 0, 0, 1, 1, 0, 1, 0, 1, 1, 1, 1, 0, 0, 0, 1, 1, 1, 0, 1, 0, 1}; {1, 0, 0, 1, 1, 1, 0, 0, 0, 1, 1, 1, 1, 1, 0, 1, 1, 0, 1, 0}; {1, 0, 0, 1, 1, 0, 1, 1, 1, 1, 0, 1, 0, 1, 1, 0, 0, 0, 0, 1, 0, 1, 1}; {1, 0, 0, 1, 1, 0, 1, 1, 1, 1, 1, 0, 1, 0, 0, 1, 1, 1, 0, 0, 0, 1, 0}; {1, 0, 0, 1, 1, 1, 0, 0, 1, 0, 0, 0, 0, 0, 1, 1, 0, 1, 0, 0, 0, 1, 0}; {1, 0, 0, 1, 1, 1, 0, 0, 1, 1, 1, 1, 1, 0, 1, 0, 0, 0, 1, 0, 1, 1, 0}; {1, 0, 0, 1, 1, 1, 0, 1, 0, 0, 0, 0, 1, 1, 0, 1, 0, 1, 1, 1, 1, 0, 1}; {1, 0, 0, 1, 1, 1, 0, 1, 0, 0, 0, 1, 0, 1, 1, 0, 0, 0, 0, 0}; {1, 0, 0, 1, 1, 1, 0, 1, 0, 0, 0, 1, 1, 1, 0, 1, 1, 1, 1, 0, 1, 1, 0}; {1, 0, 0, 1, 1, 1, 0, 1, 0, 0, 1, 1, 0, 1, 1, 0, 0, 0, 0, 0, 1, 0, 1, 1}; {1, 0, 0, 1, 1, 1, 0, 1, 0, 0, 1, 0, 1, 1, 1, 1, 1, 0, 0, 0, 0, 1, 0, 1}; {1, 0, 0, 1, 1, 1, 0, 1, 0, 1, 1, 1, 1, 0, 0, 0, 0, 0}; {1, 0, 0, 1, 1, 1, 0, 1, 1, 1, 1, 0, 0, 0, 0, 0, 1, 0, 1}; {1, 0, 0, 1, 1, 0, 1, 1, 1, 0, 0, 0, 0, 0, 0, 1, 0, 1}; {1, 0, 0, 1, 1, 1, 1, 0, 1, 1, 0, 0, 0, 0, 1, 0, 1, 1, 1, 0}; {1, 0, 0, 1, 1, 1, 1, 1, 0, 1, 0, 0, 0, 0, 0, 1, 0, 0, 1, 1, 0, 1, 1}; {1, 0, 0, 1, 1, 1, 1, 1, 0, 1, 1, 0, 1, 1, 0, 0, 0, 0, 1, 0, 1, 0, 1, 1}; {1, 0, 0, 1, 1, 1, 1, 1, 0, 1, 1, 1, 0, 0, 0, 0, 1, 0, 0, 1, 1, 0, 1}; {1, 0, 0, 1, 1, 1, 1, 1, 0, 1, 1, 1, 1, 0, 0, 0, 0, 1, 0, 0, 1, 0, 1}; {1, 0, 0, 1, 1, 1, 1, 1, 1, 0, 1, 1, 1, 0, 0, 0, 0, 1, 0, 1, 1, 0, 0, 1}; {1, 1, 0, 0, 0, 0, 0, 0, 0, 1, 0, 1, 0, 0, 1, 1, 0, 1, 1, 0, 0, 1}; {1, 1, 0, 0, 0, 0, 0, 1, 0, 1, 1, 0, 0, 0, 0, 1, 1, 1, 0, 0, 0, 1, 1, 0}; {1, 1, 0, 0, 0, 0, 0, 1, 1, 0, 0, 0, 1, 0, 0, 1, 0, 1, 1, 1, 0, 1, 0}; {1, 1, 0, 0, 0, 0, 0, 1, 1, 0, 0, 1, 0, 1, 1, 1, 1, 0, 1, 1, 0, 0, 1, 0}; {1, 1, 0, 0, 0, 0, 0, 1, 1, 0, 1, 0, 0, 1, 1, 1, 0, 1, 0, 0, 1, 0, 1}; {1, 1, 0, 0, 0, 0, 1, 1, 1, 0, 1, 0, 1, 1, 1, 0, 1, 1, 0, 0, 0}; {1, 1, 0, 0, 0, 0, 1, 1, 1, 0, 1, 0, 1, 1, 1, 0, 1, 1, 1, 0, 0, 1, 0, 1}; {1, 1, 0, 0, 0, 1, 0, 0, 1, 0, 1, 1, 0, 0, 0, 1, 0, 1, 1, 1, 0}; {1, 1, 0, 0, 0, 1, 1, 1, 1, 1, 1, 0, 1, 0, 1, 0, 0, 1, 1, 1, 1, 0}; {1, 1, 0, 0, 0, 1, 1, 1, 1, 1, 0, 1, 1, 0, 0, 0, 1, 0, 0}; {1, 1, 0, 0, 1, 0, 0, 0, 0, 0, 1, 0, 1, 1, 0, 0, 0, 1, 0, 0, 1, 0, 1}; {1, 1, 0, 0, 1, 0, 0, 0, 0, 0, 1, 0, 1, 1, 0, 0, 0, 1, 0, 1, 1, 0, 1}; {1, 1, 0, 0, 1, 0, 0, 0, 0, 0, 1, 0, 1, 1, 1, 0, 0, 0, 1, 0, 0}; {1, 1, 0, 0, 1, 0, 0, 0, 0, 1, 0, 1, 1, 1, 0, 1, 0, 1, 0, 1, 1, 0, 1}; {1, 1, 0, 0, 0, 0, 1, 0, 1, 1, 0, 1, 0, 0, 0, 1, 1, 1, 1, 1, 0, 1, 1, 1}; {1, 1, 0, 0, 1, 0, 0, 0, 0, 0, 0, 1, 1, 0, 1, 1, 0, 0, 1, 0, 1, 1, 1, 1, 0, 1, 0, 1, 1, 1, 1, 0, 0, 0, 1, 0, 1, 1, 1, 0, 1, 0, 0, 1, 0, 1, 1, 1}; {1, 1, 0, 0, 0, 0, 0, 1, 1, 1, 0, 1, 0, 1, 1, 1, 0}; {1, 1, 0, 0, 0, 1, 1, 0, 1, 0, 1, 1, 1, 0, 1, 0, 1, 1, 1, 0, 1}; {1, 1, 0, 0, 0, 1, 0, 0, 0, 0, 0, 1, 0, 1, 1, 0, 0, 0, 1, 0, 0, 1, 0, 1}; {1, 1, 0, 0, 0, 1, 0, 0, 0, 0, 0, 1, 0, 1, 1, 0, 0, 0, 1, 0, 0, 1, 1, 0, 1}; {1, 1, 0, 0, 0, 1, 0, 0, 0, 0, 0, 1, 0, 1, 1, 1, 0, 0, 0, 1, 0, 0}; {1, 1, 0, 0, 0, 1, 0, 0, 0, 0, 1, 1, 0, 1, 0, 0, 0, 1, 1, 0, 1, 0, 1}; {1, 1, 0, 0, 0, 1, 0, 0, 0, 1, 1, 0, 1, 0, 1, 0, 0, 0, 1, 0}; {1, 1, 0, 0, 0, 1, 0, 0, 1, 1, 1, 1, 0, 1, 1, 1, 0, 0, 1, 0, 1}; {1, 1, 0, 0, 0, 1, 0, 0, 1, 1, 1, 1, 1, 0, 0, 0, 1, 1, 0, 1, 0, 1}; {1, 1, 0, 0, 0, 1, 0, 1, 0, 0, 0, 0, 0, 1, 0, 0, 1, 1, 0, 1, 0, 1, 1, 1}; {1, 1, 0, 0, 0, 1, 0, 1, 0, 1, 0, 0, 0, 0, 1, 0, 0, 1, 0, 1, 1, 1, 1}; {1, 1, 0, 0, 0, 1, 0, 1, 0, 1, 0, 1, 0, 0, 0, 0, 0, 1, 1, 0, 1, 0, 1}; {1, 1, 0, 0, 1, 0, 0, 1, 0, 1, 0, 1, 0, 1, 1, 1, 1, 1, 1}; {1, 1, 0, 0, 1, 0, 0, 1, 1, 1, 1, 0, 1, 0}; {1, 1, 0, 0, 1, 0, 1, 0, 0, 0, 1, 1, 1, 0, 1, 1, 0, 1, 1, 0, 0, 0, 0}; {1, 1, 0, 1, 0, 0, 1, 0, 0, 0, 1, 1, 1, 0, 1, 1, 0, 1, 0, 0, 0, 0}; {1, 1, 0, 1, 0, 0, 0, 1, 1, 0, 1, 1, 1, 0, 1, 0, 0, 0, 0}; {1, 1, 0, 1, 0, 0, 0, 0, 1, 1, 0, 1, 0, 0, 1, 0, 0, 0, 0}; {1, 1, 0, 1, 0, 0, 0, 0, 0, 1, 1, 0, 1, 1, 0, 1, 0, 0, 0, 0}; {1, 1, 0, 1, 0, 0, 0, 0, 1, 1, 0, 1, 1, 1, 1, 0, 1, 0, 0, 1, 1, 0}; {1, 1, 0, 1, 0, 0, 1, 0, 0, 0, 1, 1, 0, 1, 0, 0, 1, 1, 0, 1, 1}; {1, 1, 0, 1, 0, 0, 1, 0, 0, 0, 1, 1, 1, 0, 1, 1, 1, 1, 0, 1, 0, 0, 1}.

The sequence set 2 further includes the following 100 sequences. When time domain filtering is performed on sequences $\{x_n\}$ corresponding to these sequences and equivalent sequences of these sequences obtained after π/2 BPSK modulation, and the filtering coefficient is [0.28, 1, 0.28], the PAPR is less than 1.39 dB. In addition, when a first maximum normalized power of a frequency domain sequence corresponding to $\{x_n\}$ is less than 1.5 dB, and a first minimum normalized power is greater than −1.5 dB, frequency domain flatness of the corresponding sequence $\{x_n\}$ is better:

{1, 0, 0, 0, 0, 1, 0, 0, 0, 1, 0, 1, 1, 0, 0, 0, 1, 0, 1, 1, 1, 1, 0, 1}; {1, 0, 0, 0, 0, 1, 0, 0, 0, 1, 0, 1, 1, 1, 0, 0, 1, 0, 1, 1, 1, 1, 0, 1}; {1, 0, 0, 0, 0, 1, 0, 1, 1, 0, 0, 0, 1, 0, 1, 1, 1, 0, 1, 1, 1, 1, 0, 0}; {1, 0, 0, 0, 0, 1, 0, 1, 1, 1, 0, 0, 1, 0, 1, 1, 1, 0, 1, 1, 1, 1, 0, 0}; {1, 0, 0, 1, 0, 0, 0, 0, 0, 0, 1, 1, 1, 0, 0, 1, 1, 0, 1, 0, 0, 0, 1, 0}; {1, 0, 0, 1, 0, 0, 0, 0, 0, 0, 1, 0, 1, 0, 1, 1, 0, 0, 1, 1, 1, 1, 0, 0, 0}; {1, 0, 0, 1, 0, 0, 0, 0, 0, 1, 0, 1, 0, 1, 1, 0, 1, 1, 1, 0, 0, 0, 0, 1}; {1, 0, 0, 1, 0, 0, 0, 0, 0, 1, 1, 1, 0, 1, 1, 0, 0, 1, 1, 1, 1, 0, 1, 0}; {1, 0, 0, 1, 0, 0, 0, 0, 0, 1, 1, 1, 0, 1, 1, 1, 1, 0, 0, 1, 0, 1, 1}; {1, 0, 0, 1, 0, 0, 0, 0, 1, 1, 0, 1, 0, 1, 0, 0, 1, 1, 1}; {1, 0, 0, 1, 0, 0, 0, 1, 1, 0, 0, 0, 0, 1, 1, 0, 1, 0, 1, 0, 1, 1, 1, 1}; {1, 0, 0, 1, 0, 0, 0, 1, 1, 1, 0, 1, 0, 1, 1, 1, 1, 1, 0, 0, 1, 1, 0}; {1, 0, 0, 1, 0, 0, 0, 1, 1, 1, 1, 0, 0, 1, 1, 0, 1, 0, 1, 0, 0, 0, 0}; {1, 0, 0, 1, 0, 0, 0, 1, 1, 1, 1, 0, 0, 1, 1, 0, 1, 1, 1, 1, 1, 0, 1, 0}; {1, 0, 0, 1, 0, 0, 0, 1, 1, 1, 1, 1, 0, 1, 1, 0, 1, 0, 1, 0, 0, 0, 0, 1}; {1, 0, 0, 1, 0, 0, 0, 1, 1, 1, 1, 1, 1, 0, 1, 0, 1, 1, 1, 0, 0, 1, 1, 0}; {1, 0, 0, 1, 0, 0, 1, 0, 0, 0, 0, 0, 0, 0, 1, 1, 0, 1, 0, 0, 1, 1, 0, 1, 1}; {1, 0, 0, 1, 0, 1, 0, 0, 0, 1, 1, 0, 1, 0, 0, 0, 1, 1, 0}; {1, 0, 0, 1, 0, 1, 0, 0, 0, 1, 0, 0, 0, 1, 0, 0, 1, 1, 0, 1, 1, 0, 0}; {1, 0, 0, 1, 0, 1, 0, 0, 1, 1, 1, 1, 1, 0, 0, 1, 1, 0, 0}; {1, 0, 0, 1, 0, 1, 0, 0, 0, 1, 0, 0, 0, 0, 0, 1, 1}; {1, 0, 0, 1, 0, 1, 0, 0, 1, 1, 1, 0, 1, 0, 0, 0, 1, 1, 1, 1, 1, 0, 1, 1}; {1, 0, 0, 1, 0, 1, 0, 0, 1, 1, 0, 0, 0, 0, 0, 0, 1, 0, 0, 0, 1, 0, 1}; {1, 0, 0, 1, 0, 1, 0, 0, 1, 1, 1, 0, 1, 1, 1, 1, 1, 1, 0, 0, 0, 1, 0, 1}; {1, 0, 0, 1, 0, 1, 0, 0, 1, 1, 0, 0, 1, 1, 0, 1, 0, 0, 0, 1}; {1, 0, 0, 1, 0, 1, 0, 1, 0, 0, 0, 0, 0, 1, 1, 0, 0, 1, 1}; {1, 0, 0, 1, 0, 1, 0, 1, 0, 0, 0, 0, 1, 0, 0, 0, 1, 0, 0, 1, 1}; {1, 0, 0, 1, 0, 1, 0, 1, 1, 0, 0, 0, 1, 1, 0, 1, 1, 1, 1}; {1, 0, 0, 1, 0, 1, 0, 1, 1, 0, 0, 1, 1, 1, 1, 1, 0, 1, 0, 0, 0, 1}; {1, 0, 0, 1, 0, 1, 0, 1, 1, 1, 1, 1, 0, 0, 0, 0, 1, 1}; {1, 0, 0, 1, 0, 1, 1, 0, 0, 0, 1, 1, 1, 1, 0, 1, 1, 0, 0, 0, 0}; {1, 0, 0, 1, 0, 1, 1, 0, 1, 1, 1, 1, 0, 1, 1, 0, 1, 0, 0, 0, 1}; {1, 0, 0, 1, 0, 1, 1, 0, 0, 0, 0, 0, 0, 1, 0, 1, 0, 0, 1, 1, 1, 0, 1}; {1, 0, 0, 1, 0, 1, 1, 0, 0, 1, 1, 1, 1, 0, 1, 0, 1, 1, 1, 1, 1, 0, 0, 0}; {1, 0, 0, 1, 0, 1, 1, 0, 1, 0, 1, 1, 1, 1, 0, 1, 1, 0, 1, 1, 0, 0, 0, 1, 0}; {1, 0, 0, 1, 0, 1, 1, 0, 0, 1, 1, 1, 1, 1, 0, 0, 0, 1, 0, 0, 0, 1}; {1, 0, 0, 1, 0, 1, 1, 0, 1, 0, 1, 1, 0, 1, 1, 1, 1, 1, 0, 0, 0, 0}; {1, 0, 0, 1, 1, 0, 0, 0, 0, 1, 0, 1, 0, 1, 1, 1, 1, 1, 1, 0, 0, 0}; {1, 0, 0, 1, 1, 0, 0, 0, 0, 1, 1, 1, 0, 1, 1, 0, 1, 1, 1, 1, 0, 1, 0}; {1, 0, 0, 1, 1, 0, 0, 0, 0, 1, 0, 1, 0, 0, 0, 0, 0, 0, 1, 1}; {1, 0, 0, 1, 1, 0, 0, 0, 0, 1, 1, 1, 0, 1, 1, 0, 1, 0, 1, 1, 1, 1, 0, 1, 0}; {1, 0, 0, 1, 1, 0, 0, 0, 0, 1, 0, 1, 1, 0, 1, 1, 1, 1, 1, 0, 0, 0, 0}; {1, 0, 0, 1, 1, 0, 0, 0, 1, 0, 1, 1, 0, 1, 1, 1, 1, 1, 0, 0, 0, 0}; {1, 0, 0, 1, 1, 0, 1, 0, 1, 0, 1, 0, 1, 0, 1, 1, 1, 1, 1, 1, 0, 0, 0, 0}; {1, 0, 0, 1, 1, 0, 0, 0, 1, 0, 1, 0, 1, 0, 0, 1, 1, 1, 1}; {1, 0, 0, 1, 1, 0, 0, 1, 0, 0, 0, 0, 0, 0, 0, 0, 1, 1}; {1, 0, 0, 1, 1, 0, 0, 1, 0, 1, 1, 1, 1, 0, 1, 1, 1, 1, 1, 1, 0, 0, 1}; {1, 0, 0, 1, 1, 0, 1, 0, 0, 1, 1, 0, 1, 1, 1, 1, 1, 0, 0, 0}; {1, 0, 0, 1, 0, 1, 1, 0, 0, 1, 1, 1, 1, 0, 0, 1, 0, 0, 0, 1}; {1, 0, 0, 1, 0, 1, 1, 0, 0, 1, 0, 1, 1, 1, 1, 1, 1, 0, 1, 1, 1, 1, 0}; {1, 0, 0, 1, 0, 1, 0, 0, 1, 1, 1, 1, 1, 0, 0, 0, 1, 0, 0, 0, 0}; {1, 0, 0, 1, 0, 1, 1, 0, 1, 0, 1, 1, 0, 0, 1, 1, 0, 0}; {1, 0, 0, 1, 1, 0, 0, 1, 0, 1, 1, 0, 1, 1, 0, 1, 0, 1, 1, 1, 1, 0, 0}; {1, 0, 0, 1, 1, 0, 0, 0, 0, 1, 0, 0, 0, 0, 0, 0, 0, 1, 1}; {1, 0, 0, 1, 1, 0, 0, 0, 0, 1, 0, 1, 1, 1, 0, 1, 0, 1, 1, 1, 1, 0, 0}; {1, 0, 1, 1, 0, 0, 1, 1, 0, 1, 0}; {1, 0, 0, 1, 1, 1, 0, 1, 0}; {1, 0, 0, 1, 1, 0, 1, 0, 0, 0, 0, 0, 0, 0, 1, 1, 1, 1, 1, 0, 0, 0, 0}; {1, 0, 1, 1, 0, 0, 1, 1, 0, 1, 0}; {1, 0, 0, 1, 1, 1, 1, 0, 0, 0, 0, 0, 0, 1, 0, 1, 0, 1, 1, 1, 1, 0, 1, 1, 0, 0}; {1, 0, 0, 1, 1, 1, 1, 1, 1, 0, 0, 0, 1, 0, 1, 0, 1, 1, 1, 1, 0, 1, 0}; {1, 0, 0, 1, 1, 0, 0, 1, 1, 0, 1, 0, 1, 0, 0, 0, 0, 0, 1, 0}; {1, 0, 0, 1, 1, 0, 1, 0, 0, 1, 0, 0, 0, 1, 0, 0, 1, 1, 1, 0, 0, 0, 0}; {1, 0, 0, 1, 1, 0, 0, 1, 0, 1, 1, 1, 1, 1, 1, 0, 1, 1, 1, 1, 0}; {1, 0, 0, 1, 1, 0, 0, 0, 1, 0, 1, 0, 0, 0, 0, 0, 0, 1, 1}; {1, 0, 1, 1, 0, 0, 1, 1, 0, 1, 0}; {1, 0, 0, 1, 1, 1, 0, 1, 1, 0, 0, 0, 0, 0};

{1, 1, 0, 0, 1, 1, 1, 0, 1, 1, 1, 0}; {1, 0, 0, 1, 0, 0, 1, 1, 1, 1, 0, 1, 1, 1, 0, 1, 0, 0, 0, 0, 0}; {1, 0, 0, 1, 1, 1, 0, 1, 0, 0, 1, 1, 1, 1, 1, 0, 1, 0, 1, 1, 0, 0, 0, 0, 0}; {1, 0, 0, 1, 1, 1, 0, 1, 0, 0, 1, 0, 1, 0, 0, 1, 1, 1, 1, 1}; {1, 0, 0, 1, 1, 1, 0, 1, 1, 1, 0, 1, 1, 1, 0, 0, 0, 0, 0, 0, 0, 0, 0, 0, 0, 0}; {1, 0, 1, 0, 1, 1, 1, 0, 1, 0, 1, 1, 0, 0, 0, 0, 0, 0, 1, 0, 1}; {1, 0, 0, 1, 1, 1, 1, 1, 0, 1, 0, 1, 1, 0, 0, 0, 0, 0, 1, 0, 0, 0, 0}; {1, 0, 0, 1, 1, 1, 1, 1, 0, 1, 1, 1, 0, 0, 0, 0, 0, 1, 1, 0, 0}; {1, 0, 0, 1, 1, 1, 1, 1, 1, 0, 1, 0, 1, 1, 0, 0, 0, 0, 1, 0, 0}; {1, 1, 0, 0, 0, 0, 0, 0, 1, 0, 1, 1, 1, 1, 0, 1, 0, 1, 0, 0, 1, 0, 0, 0, 1}; {1, 1, 0, 0, 0, 0, 1, 0, 0, 0, 0, 0, 1, 1, 1, 0, 1, 0, 1, 0, 0, 0, 1, 0, 0, 0}; {1, 1, 0, 0, 0, 0, 1, 0, 0, 1, 1, 0, 1, 0, 0, 0, 0, 1, 0, 0, 0, 1, 0}; {1, 1, 0, 0, 0, 0, 1, 0, 1, 0, 1, 0, 1, 1, 1, 1, 0, 1, 0, 0, 1}; {1, 1, 0, 0, 0, 0, 1, 0, 1, 0, 1, 0, 1, 0, 0, 1, 0, 0, 1, 0}; {1, 1, 0, 0, 0, 1, 0, 1, 1, 1, 1, 0, 0, 1, 0, 1, 1, 0, 0}; {1, 1, 0, 0, 0, 1, 1, 1, 0, 1, 1, 1, 0, 1, 1, 0, 1, 1, 1}; {1, 1, 0, 0, 0, 1, 0, 1, 1, 1, 1, 0, 1, 0, 0, 1, 1, 1, 1, 1, 0, 1, 1}; {1, 1, 0, 0, 0, 0, 1, 1, 1, 1, 1, 0, 1, 1, 1, 0, 1, 1, 1, 1, 0}; {1, 1, 0, 0, 0, 0, 1, 1, 1, 1, 1, 0, 1, 1, 0, 1, 0, 1, 1, 1, 0, 0, 0, 0}; {1, 1, 0, 0, 0, 1, 0, 0, 0, 1, 1, 1, 1, 1, 1, 0, 0, 0, 1, 0}; {1, 1, 0, 0, 0, 0, 1, 0, 0, 1, 1, 1, 0, 1, 0, 1, 0, 0, 1, 0}; {1, 1, 0, 0, 0, 1, 0, 0, 1, 1, 1, 1, 0, 1, 0, 1, 0, 0, 1, 0}; {1, 1, 0, 0, 0, 0, 1, 0, 0, 1, 1, 0, 1, 0, 1, 0, 0, 1, 1}; {1, 1, 0, 0, 0, 1, 1, 1, 1, 0, 0, 1, 1, 1, 1, 1, 0, 1, 0, 1, 1}; {1, 1, 0, 0, 0, 0, 1, 1, 0, 1, 0, 1, 1, 1, 1, 0, 0, 1, 1}; {1, 1, 0, 0, 0, 0, 1, 1, 1, 1, 0, 1, 0, 1, 1, 1, 0}; {1, 1, 0, 0, 0, 0, 1, 1, 1, 1, 0, 1, 0, 1, 1, 1, 1, 0}; {1, 1, 0, 0, 0, 1, 0, 1, 1, 1, 0, 1, 0, 1, 0, 1, 0, 0, 0}; {1, 1, 0, 0, 0, 1, 0, 0, 0, 1, 0, 1, 1, 1, 1, 1, 1, 1, 0, 0, 1, 0, 1}; {1, 1, 0, 0, 0, 1, 0, 1, 0, 1, 1, 0, 1, 0, 1, 1, 1, 0, 1, 1}; {1, 1, 0, 0, 0, 1, 0, 1, 1, 1, 0, 1, 0, 1, 1, 1, 1, 0}; {1, 1, 0, 0, 0, 1, 1, 1, 1, 1, 0, 1, 1, 0, 1, 1, 0, 1, 0, 0, 0}; {1, 1, 0, 0, 0, 1, 1, 0, 0, 0, 1, 0, 1, 0, 0, 1, 1, 1, 1, 1, 1, 0, 0, 0, 0, 1}; {1, 1, 0, 0, 0, 1, 0, 0, 0, 1, 1, 1, 0, 1, 1, 0, 0, 0, 1}; {1, 1, 0, 0, 0, 1, 0, 1, 1, 1, 1, 0, 1, 1, 1, 1, 1, 0}; {1, 1, 0, 0, 1, 0, 0, 0, 0, 1, 0, 1, 0, 1, 1, 0, 0, 0, 1}; {1, 1, 0, 0, 1, 0, 0, 0, 1, 0, 1, 0, 0, 0, 1, 0, 1, 1, 1}; {1, 1, 0, 0, 1, 0, 0, 1, 1, 0, 1, 0, 0, 0, 0, 1, 1, 1, 1}; {1, 1, 0, 0, 1, 0, 1, 0, 0, 0, 0, 0, 1, 0, 0, 1, 1, 1, 1}; {1, 1, 0, 0, 1, 0, 1, 1, 1, 0, 1, 1, 1, 0, 0, 1, 1}; {1, 1, 0, 0, 1, 0, 1, 1, 0, 1, 0, 1, 1, 1, 0, 1, 1}; {1, 1, 0, 0, 0, 1, 1, 1, 1, 0, 1, 0, 0, 1, 1}; {1, 1, 0, 0, 1, 0, 0, 1, 0, 1, 0, 0, 1, 1, 1, 1}; {1, 1, 0, 0, 1, 0, 0, 1, 0, 1, 0, 1, 0, 0, 1, 1, 1, 0, 1, 1, 1, 1}; {1, 1, 0, 0, 0, 1, 0, 1, 1, 1, 0, 1, 0, 1, 1, 1, 0, 0, 1, 1}; {1, 1, 0, 0, 1, 0, 1, 0, 0, 1, 0, 1, 0, 1, 1, 1, 0, 1, 1}; {1, 1, 0, 0, 1, 0, 0, 1, 0, 1, 1, 1, 1, 0, 0, 0, 1, 1, 1}; {1, 1, 0, 0, 1, 0, 1, 0, 0, 1, 0, 0, 0, 0, 0, 1, 1, 1, 0, 1, 1}; {1, 1, 0, 0, 0, 1, 0, 1, 1, 1, 0, 1, 0, 0, 0, 0, 1, 1, 1, 1}; {1, 1, 0, 1, 0, 1, 1, 1, 1, 0, 1, 0, 1, 0, 0, 0, 0, 1, 1, 1, 1}; {1, 0, 0, 1, 1, 1, 1, 0, 1, 1, 0, 1, 0, 1, 0, 0, 0, 0, 1, 1, 1, 1}; {1, 1, 0, 0, 1, 1, 1, 1, 1, 0, 1, 1, 1, 0, 1, 0, 0, 0, 0, 1, 1, 1, 1}; {1, 1, 0, 0, 1, 1, 0, 1, 1, 0, 1, 0, 1, 0, 0, 0, 1, 0, 0, 1, 1, 1}; {1, 1, 0, 0, 1, 1, 1, 0, 1, 1, 1, 0, 1, 0, 0, 1, 0, 0, 0, 1, 1, 1, 1}; {1, 1, 0, 1, 0, 1, 0, 0, 0, 1, 0, 1, 1, 1, 1, 1, 0, 1, 1, 1, 1, 1}; {1, 1, 0, 1, 0, 0, 0, 1, 0, 1, 1, 1, 0, 1, 1, 0, 1, 1, 1, 1, 1}; {1, 1, 0, 0, 1, 0, 0, 0, 1, 0, 1, 0, 0, 1, 0, 1, 1, 1, 0, 0, 0, 1}; {1, 1, 0, 1, 0, 1, 0, 0, 0, 1, 0, 0, 0, 0, 0, 0, 0, 1, 1}; {1, 1, 0, 1, 0, 0, 0, 0, 1, 0, 0, 0, 0, 0, 1, 1, 0, 1, 1}; {1, 1, 0, 1, 0, 0, 0, 0, 1, 0, 0, 0, 0, 0, 0, 1, 1, 1, 1, 0, 1, 1}.

In a possible example, when a sequence length of the first sequence set is 36, that is, when N=36, some or all sequences in a sequence set 3 in the first sequence set are included, and the sequence set 3 includes the following 144 sequences. When time domain filtering is performed on sequences $\{x_n\}$ corresponding to these sequences and equivalent sequences of these sequences obtained after π/2 BPSK modulation, when a filtering coefficient is [0.1, 1, 0.1], a PAPR is less than 3.19 dB; when a filtering coefficient is [0.16, 1, 0.16], a PAPR is less than 2.59 dB; when a filtering coefficient is [0.22, 1, 0.22], a PAPR is less than 1.95 dB; or when a filtering coefficient is [0.28, 1, 0.28], a PAPR is less than 1.40 dB. In addition, when a first maximum normalized power of a frequency domain sequence corresponding to $\{x_n\}$ is less than 1 dB, and a first minimum normalized power is greater than −1 dB, frequency domain flatness of the corresponding sequence $\{x_n\}$ is better:

{0, 0, 0, 0, 0, 0, 0, 0, 1, 0, 1, 1, 0, 0, 0, 1, 1, 0, 1, 0, 1, 1, 0, 0, 1, 1, 0, 1, 0, 0, 0, 1, 1, 1, 0, 1}; {0, 0, 0, 0, 0, 0, 0, 0, 1, 0, 1, 1, 0, 0, 1, 1, 1, 0, 1, 0, 1, 1, 0, 0, 0, 1, 1, 1, 0, 1}; {0, 0, 0, 0, 0, 0, 0, 0, 1, 0, 1, 1, 1, 0, 0, 0, 1, 0, 1, 1, 1, 0, 0, 0, 1, 1, 1, 0, 1}; {0, 0, 0, 0, 0, 0, 0, 0, 1, 0, 1, 1, 1, 0, 0, 0, 1, 0, 1, 1, 0, 0, 1, 1, 0, 1, 1, 0, 0, 1, 1, 0, 1}; {0, 0, 0, 0, 0, 0, 0, 1, 0, 1, 1, 1, 0, 0, 1, 1, 0, 0, 1, 1, 0, 1, 0, 1, 0, 1, 1, 0, 0, 0, 1, 1, 0, 1}; {0, 0, 0, 0, 0, 0, 0, 1, 0, 1, 1, 1, 0, 1, 0, 1, 1, 0, 0, 1, 1, 0, 0, 0, 1, 0, 1, 1, 0, 0, 0, 1, 1}; {0, 0, 0, 0, 0, 0, 1, 1, 0, 0, 0, 1, 1, 0, 1, 0, 0, 0, 0, 1, 0, 1, 1, 0, 0, 1, 1, 0, 1, 0, 1, 1, 1, 0, 1}; {0, 0, 0, 0, 0, 0, 1, 0, 0, 0, 1, 0, 1, 0, 1, 1, 0, 1, 1, 0, 0, 0, 0, 1, 1, 0, 0, 0, 1, 0, 1, 0, 0, 1, 1, 1}; {0, 0, 0, 0, 0, 0, 1, 0, 0, 0, 1, 1, 0, 0, 0, 1, 0, 1, 0, 1, 0, 0, 0, 1, 0, 1, 1, 0, 0, 1, 1, 1, 1, 1}; {0, 0, 0, 0, 0, 0, 1, 0, 0, 0, 1, 1, 0, 1, 1, 0, 0, 0, 1, 0, 1, 1, 0, 1, 1, 1, 1, 0, 1, 0, 1, 0, 0, 0, 1, 1, 1}; {0, 0, 0, 0, 0, 0, 1, 0, 0, 0, 1, 0, 0, 1, 0, 0, 0, 1, 1, 1, 0, 1, 0, 1, 0, 0, 1, 0, 1, 1, 0, 0, 1, 1, 1, 1}; {0, 0, 0, 0, 0, 0, 1, 0, 0, 1, 0, 1, 0, 0, 0, 0, 1, 1, 1, 0, 0, 1, 0, 0, 1, 1, 0, 1, 0, 1, 1, 1, 0, 1, 1, 1}; {0, 0, 0, 0, 0, 1, 0, 0, 1, 0, 0, 1, 0, 0, 0, 1, 0, 0, 1, 1, 0, 0, 0, 1, 1, 0, 0, 1, 0, 1, 0, 1, 0, 1}; {0, 0, 0, 0, 0, 1, 0, 1, 0, 1, 0, 0, 1, 0, 0, 0, 0, 1, 1, 0, 1, 1, 1, 0, 0, 1, 0, 1, 1}; {0, 0, 0, 0, 0, 1, 0, 0, 1, 1, 0, 1, 1, 0, 0, 0, 0, 1, 1, 0, 1, 0, 1, 0, 0, 1, 1, 1, 1, 0, 0, 1}; {0, 0, 0, 0, 0, 1, 0, 0, 1, 0, 1, 1, 1, 0, 0, 0, 0, 1, 1, 0, 0, 1, 0, 1, 0, 1, 1, 0, 0, 1, 0, 0, 1, 0}; {0, 0, 0, 0, 1, 1, 0, 0, 1, 1, 1, 0, 1, 0, 1, 1, 0, 1, 0, 1, 1, 1, 0, 1, 0, 1, 0, 0, 1}; {0, 0, 0, 0, 0, 1, 1, 0, 0, 1, 0, 1, 1, 1, 0, 1, 1, 1, 0, 0, 0, 1, 1, 0, 0, 1, 0, 1, 0, 1}; {0, 0, 0, 0, 0, 1, 1, 0, 0, 1, 0, 1, 0, 1, 1, 1, 0, 1, 1, 0, 0, 0, 0, 1, 0, 0, 0, 1, 0, 0, 1}; {0, 0, 0, 0, 0, 1, 1, 1, 1, 1, 0, 0, 1, 1, 0, 1, 0, 0, 1, 0, 0, 1, 0, 1, 0, 0, 0, 1}; {0, 0, 0, 0, 0, 1, 0, 0, 0, 1, 0, 0, 1, 0, 1, 1, 1, 0, 0, 0, 0, 1, 0, 1, 0, 0, 1, 0, 0, 1, 1, 1}; {0, 0, 0, 0, 1, 0, 0, 0, 1, 0, 0, 0, 1, 0, 0, 1, 1, 1, 1, 0, 1, 0, 0, 1, 1, 0, 1, 1, 1, 1, 0, 1, 1, 1, 1}; {0, 0, 0, 0, 0, 1, 0, 0, 1, 0, 0, 0, 1, 0, 1, 0, 0, 0, 0, 1, 0, 1, 0, 0, 0, 1, 1, 1, 0, 0, 1, 1, 1, 1, 1, 0, 1}; {0, 0, 0, 0, 0, 1, 0, 0, 0, 1, 0, 0, 0, 0, 1, 0, 1, 1, 1, 0, 0, 1, 1, 0, 0, 1, 1, 1, 0, 1}; {0, 0, 0, 0, 0, 1, 0, 1, 0, 1, 1, 1, 1, 0, 0, 1, 0, 1, 1, 1, 0, 0, 1, 0, 0, 1, 1}; {0, 0, 0, 0, 0, 1, 0, 1, 1, 1, 1, 0, 0, 0, 1, 1, 1, 1, 0, 0, 1, 0, 1, 0, 1, 0, 0, 1, 0, 0, 0, 1}; {0, 0, 0, 0, 0, 1, 0, 1, 1, 1, 1, 0, 0, 1, 1, 0, 0, 1, 1, 0, 0, 0, 0, 1, 0, 1, 1, 1, 0, 0, 0, 1, 1, 0, 1, 1, 0, 1, 0, 1, 0, 1, 1, 0, 0, 1, 1, 1, 0, 1, 1, 0, 1, 1, 1, 1}; {0, 0, 0, 0, 0, 1, 0, 0, 0, 1, 0, 0, 1, 0, 0, 1, 0, 0, 1, 0, 0, 1, 0, 1, 0, 0, 1, 1}; {0, 0, 0, 0, 0, 1, 0, 1, 0, 0, 0, 0, 1, 0, 1, 1, 0, 0, 1, 1, 1, 0, 1}; {0, 0, 0, 0, 0, 1, 0, 0, 1, 0, 1, 0, 1, 1, 1, 1, 0, 0, 0, 1, 0, 0, 1, 1}; {0, 0, 0, 0, 0, 1, 0, 1, 1, 1, 1, 0, 0, 1, 0, 1, 1, 0, 1, 1, 1, 0, 0, 0, 1, 0, 0, 1, 1, 1, 0, 1}; {0, 0, 0, 0, 0, 1, 1, 0, 0, 1, 1, 0, 0, 0, 1, 1, 1, 1, 0, 1, 0, 1, 0, 0, 0, 0, 1}; {0, 0, 0, 0, 0, 1, 1, 0, 1, 0, 1, 1, 1, 0, 0, 1, 1, 0, 1, 0, 1, 1, 1, 1, 1, 1}; {0, 0, 0, 0, 0, 1, 1, 0, 1, 0, 1, 1, 1, 0, 0, 1, 1, 0, 1, 0, 1, 1, 1, 0, 0, 0, 1, 0, 0, 0, 0, 1, 1, 0, 1}; {0, 0, 0, 0, 0, 1, 1, 1, 0, 0, 1, 0, 0, 1, 0, 1, 0, 0, 0, 0, 1, 0, 0, 0, 1, 1, 1, 1, 0, 1, 0, 0, 1, 0, 0, 0, 1}; {0, 0, 0, 0, 1, 1, 1, 1, 1, 1, 0, 1, 1, 0, 0, 1, 1, 1, 0, 1, 0, 1, 0, 1, 1, 0, 1, 1, 0, 1, 0, 0, 1, 1}; {0, 0, 0, 0, 1, 0, 0, 0, 0, 1, 0, 1, 1, 1, 1, 0, 1, 1, 0, 0, 0, 1, 0, 0, 0, 1}; {0, 0, 0, 0, 1, 0, 0, 0, 0, 1, 1, 1, 0, 1, 1, 0, 0, 0, 1, 0, 0, 0, 1}; {0, 0, 0, 0, 1, 0, 0, 0, 0, 1, 1, 1, 1, 0, 1, 0, 0, 1, 1, 1, 0, 1, 1, 1}; {0, 0, 0, 1, 0, 0, 0, 0, 1, 0, 0, 1, 1, 1, 1, 0, 1, 1, 0, 1, 1, 0, 1, 1, 1}; {0, 0, 0, 0, 1, 0, 0, 0, 0, 1, 1, 1, 1, 0, 1, 1, 0, 0, 1, 1, 1, 0, 1, 0, 1, 1, 1, 0, 1}; {0, 0, 0, 0, 1, 0, 0, 0, 0, 1, 0, 0, 0, 1, 1, 0, 1, 0, 0, 0, 1, 1, 0, 1, 1, 1, 0, 0, 1, 0, 1, 1, 1, 0, 1}; {0, 0, 0, 1, 0, 0, 0, 0, 1, 1, 0, 0, 1, 0, 1, 1, 0, 0, 0, 1, 0, 0, 0, 1, 1, 0, 1, 1, 1, 0, 0, 1, 0, 1, 1, 1, 0}; {0, 0, 0, 0, 1, 0, 0, 0, 0, 1, 1, 1, 0, 0, 0, 1, 0, 0, 0, 1, 0, 1, 1, 1, 0, 1}; {0, 0, 0, 0, 1, 0, 0, 0, 0, 1, 1, 0, 1, 0, 0, 1, 0, 0, 0, 1, 0, 0, 1, 1, 1, 1, 1, 0, 0, 1, 1, 0, 1, 1, 1, 1}; {0, 0, 0, 0, 1, 0, 0, 0, 0, 1, 0, 1, 1, 0, 0, 0, 1, 0, 0, 1, 0, 1, 0, 1, 1, 1, 1, 1, 0, 0, 1, 1, 1, 0, 1, 1, 1}; {0, 0, 0, 0, 1, 0, 0, 0, 0, 1, 0, 1, 1, 0, 0, 0, 1, 0, 0, 1, 1, 1, 1, 1, 0, 1, 1, 1, 0, 1, 1, 0, 0, 1, 1, 1, 0, 1, 0, 1}; {0, 0, 0, 0, 1, 0, 0, 0, 0, 1, 0, 0, 0, 0, 1, 0, 1, 1, 0, 0, 0, 1, 0, 0, 1, 1, 1, 0, 1, 1, 1, 0, 1}; {0, 0, 0, 0, 1, 0, 0, 0, 1, 0, 1, 1, 0, 0, 1, 0, 1, 1, 1, 1, 0, 1, 0, 0, 1, 0, 1, 1, 1, 1, 1, 1}; {0, 0, 0, 0, 1, 0, 0, 0, 1, 0, 1, 1, 0, 0, 0, 1, 0, 0, 1, 1, 0, 1, 1, 1, 1, 0, 1, 1, 1, 1, 0, 1, 1, 0, 1, 1}; {0, 0, 0, 0, 1, 0, 1, 0, 1, 0, 0, 0, 1, 0, 0, 1, 1, 0, 0, 1, 1, 1, 1, 1, 0, 1, 0, 1, 0, 0, 0, 1}; {0, 0, 0, 0, 1, 0, 1, 0, 1, 1, 1, 0, 0, 1, 1, 1, 1, 1, 1, 0, 1, 1, 1, 0, 0, 1, 1, 1, 1, 1, 0, 1, 1, 0, 1, 0, 0, 1}; {0, 0, 0, 0, 1, 0, 1, 0, 1, 0, 0, 0, 1, 1, 1, 1, 0, 1, 0, 1, 0, 1, 0, 0, 0, 1}; {0, 0, 0, 0, 1, 0, 1, 1, 1, 0, 1, 1, 1, 1, 0, 1, 1, 0, 1, 1, 1, 1, 0, 0, 0, 1}; {0, 0, 0, 0, 1, 0, 1, 1, 0, 1, 1, 1, 0, 0, 1, 0, 0, 0, 1, 1, 0, 1, 0, 0, 0, 1}; {0, 0, 0, 0, 1, 0, 1, 1, 1, 0, 1, 1, 1, 0, 0, 1, 1, 0, 1, 1, 0, 0, 1, 1, 1, 1}; {0, 0, 0, 0, 1, 1, 0, 0, 0, 0, 0, 1, 0, 0, 0, 0, 0, 1, 1, 1, 0, 1, 1, 0, 1, 0, 0, 1}; {0, 0, 0, 0, 1, 1, 0, 0, 0, 1, 0, 1, 1, 0, 1, 0, 0, 1, 1, 1, 1, 1, 0, 1, 0, 1, 0, 1, 0, 0, 1}; {0, 0, 0, 0, 1, 1, 0, 1, 0, 0, 0, 1, 0, 0, 1, 1, 1, 1, 0, 1, 1, 1, 1, 0, 1}; {0, 0, 0, 0, 1, 1, 0, 1, 0, 0, 0, 1, 0, 1, 1, 1, 1, 0, 0, 1, 1, 0, 1, 0, 0, 1, 0, 0, 0, 1}; {0, 0, 0, 0, 1, 1, 0, 1, 1, 1, 0, 1, 1, 1, 0, 1, 1, 1, 0, 0, 1, 0, 0, 0, 1, 0, 1, 0, 1, 1, 0, 1}; {0, 0, 0, 0, 1, 1, 0, 1, 1, 1, 1, 1, 1, 0, 1, 1, 0, 0, 1, 0, 0, 1, 1, 0, 1}; {0, 0, 0, 0, 1, 1, 1, 0, 0, 1, 0, 1, 0, 1, 1, 1, 1, 0, 1, 0, 1, 0, 0, 1}; {0, 0, 0, 1, 1, 0, 1, 0, 0, 0, 1, 0, 1, 1, 1, 1, 0, 0, 1, 1, 1, 1, 0, 1, 1, 1, 1, 0, 1}; {0, 0, 0, 0, 1, 1, 1, 0, 1, 0, 1, 0, 1, 1, 0, 1, 1, 0, 1, 1, 0, 1, 0, 0, 1}; {0, 0, 0, 0, 1, 1, 1, 0, 1, 1, 0, 1, 0, 1, 1, 1, 0, 0, 1, 0, 0, 0, 1, 0, 1, 0, 1, 1, 0, 1}; {0, 0, 0, 1, 1, 0, 0, 0, 1, 0, 0, 1, 0, 0, 1, 1, 1, 0, 1, 0, 1, 1, 1, 0, 1, 1, 1, 1, 0, 1}; {0, 0, 0, 0, 1, 1, 1, 1, 0, 1, 1, 0, 0, 1, 1, 0, 0, 1, 0, 1, 0, 1, 0, 1, 0, 1}; {0, 0, 0, 0, 1, 1, 1, 1, 1, 1, 0, 1, 1, 0, 0, 1, 1, 1, 0, 1, 1, 1, 0, 0, 0, 1, 0, 1, 0, 1, 1, 0, 1, 0, 0, 1, 1}; {0, 0, 0, 1, 0, 0, 0, 1, 0, 0, 1, 0, 1, 0, 0, 0, 1, 1, 1, 1, 0, 0, 1, 1, 0, 1, 0, 1, 1, 0, 1, 1, 1, 1}; {0, 0, 0, 1, 0, 0, 0, 1, 0, 1, 0, 0, 1, 1, 0, 1, 1, 0, 0, 0, 1, 1, 1, 1, 0, 1, 0, 1, 1, 0, 1, 1, 1, 1, 1, 1}; {0, 0, 0, 1, 0, 0, 0, 1, 1, 1, 1, 1, 0, 1, 0, 1, 0, 1, 1, 0, 0, 1, 1, 1, 1, 1, 0, 0, 0, 1, 0, 0, 1}; {0, 0, 0, 1, 0, 0, 0, 1, 1, 1, 1, 1, 1, 0, 1, 1, 0, 1, 0, 1, 1, 1, 1, 0, 0, 0, 1, 1, 0, 1, 1, 0, 0, 1, 0, 1}; {0, 0, 0, 1, 0, 0, 1, 1, 0, 0, 0, 1, 0, 1, 0, 0, 1, 1, 1, 1, 1, 0, 0, 1, 1, 1, 0, 1, 1, 1, 1, 0, 1}; {0, 0, 0, 1, 0, 0, 1, 1, 1, 1, 0, 1, 0, 0, 1, 1, 1, 1, 1, 0, 1, 1, 1, 1, 0, 1, 0, 0, 0, 1, 0, 1}; {0, 0, 0, 1, 0, 0, 1, 1, 0, 0, 1, 1, 0, 0, 0, 1, 0, 1, 1, 1, 1, 0, 1, 0, 0, 0, 1, 1, 0, 0, 1, 1, 0, 0, 1, 1, 0, 0, 1, 1, 1, 1, 1, 0, 1}; {0, 0, 0, 1, 0, 1, 0, 0, 1, 1, 1, 1, 1, 0, 0, 1, 1, 1, 0, 0, 1, 0, 1, 1, 0, 1, 0, 0, 1, 1, 0, 0, 1, 0, 1}; {0, 0, 0, 1, 0, 1, 1, 1, 1, 1, 1, 0, 0, 1, 1, 1, 0, 0, 1, 0, 1, 1, 1, 1, 0, 1, 0, 0, 1, 1, 1, 0, 0, 1, 0, 1, 1, 1, 1, 0, 1}; {0, 0, 0, 1, 0, 1, 1, 1, 1, 1, 1, 1, 0, 1, 0, 0, 1, 1, 1, 0, 1, 0, 1, 0, 0, 1, 1, 1, 1, 0, 1, 0, 1, 0, 1, 1, 1, 1, 1}; {0, 0, 0, 1, 0, 1, 1, 1, 1, 1, 1, 1, 0, 1, 0, 0, 1, 1}; {0, 0, 0, 1, 0, 1, 0, 1, 1, 1, 1, 1, 0, 0, 1, 1, 1, 0, 0, 1, 0, 1, 1, 0, 0, 1, 0, 1, 1, 1, 0, 0, 1, 0, 0, 1, 0, 1, 1, 1}; {0, 0, 0, 1, 1, 0, 1, 0, 0, 1, 1, 0, 0, 1, 0, 1, 0, 0, 1, 1, 1, 0, 0, 1, 0, 1, 1, 1, 1, 1, 1, 1, 0, 1}; {0, 0, 0, 1, 1, 1, 0, 1, 0, 0, 1, 1, 0, 0, 1, 0, 1, 0, 0, 1, 1, 0, 0, 1, 1, 1, 0, 1}; {0, 0, 0, 1, 1, 1, 1, 1, 1, 1, 0, 1}; {0, 0, 0, 1, 1, 1, 1, 1, 1, 1, 0, 1, 1, 1, 0, 1, 0, 1, 1, 0, 1, 0, 1, 1, 0, 0, 0, 1, 1, 0, 1, 1, 1, 1, 0, 1, 0, 1}; {0, 1, 0, 0, 0, 0, 0, 1, 1, 0, 0, 1, 1, 1, 1, 0, 1, 0, 0, 0, 0, 1, 1, 0, 1, 1, 0, 0, 1, 0, 1, 0, 1, 0, 0, 0}; {0, 1, 0, 0, 0, 0, 1, 0, 1, 0, 1, 0, 0, 1, 1, 0, 1, 1, 0, 0, 0, 0, 0, 1, 0, 1, 1, 1, 1}; {0, 1, 0, 0, 0, 0, 1, 0, 1, 0, 1, 0, 1, 1, 1, 0, 0, 1, 1, 0, 0, 1, 0, 0, 0, 0}; {0, 1, 0, 0, 0, 0, 1, 0, 1, 1, 1, 0, 1, 0, 0, 0, 1, 1, 1, 1, 0, 0, 1, 1, 0, 0, 0, 0, 1, 0}; {0, 1, 0, 0, 0, 1, 0, 0, 0, 0, 0, 1, 1, 0, 0, 0, 1, 1, 0, 1, 0, 0, 0, 0, 1, 1, 0, 1, 0, 1, 0}; {0, 1, 0, 0, 0, 1, 0, 0, 0, 1, 1, 1, 1, 0, 0, 1, 1, 0, 0, 0, 0, 1, 1, 0, 1, 1, 0, 0, 0, 1, 0, 1, 1, 0}; {0, 1, 0, 0, 0, 1, 0, 0, 1, 1, 0, 0, 0, 0, 1, 0, 1, 1, 0, 1, 0, 1, 1, 0, 1, 1, 0}; {0, 1, 0, 0, 0, 1, 0, 1, 1, 0, 0, 0, 0, 1, 0, 1, 1, 0, 1, 0, 1, 1, 0, 0, 1, 0, 1, 1, 1, 0, 1, 0, 0, 0}; {0, 1, 0, 0, 1, 0, 0, 0, 0, 1, 0, 0, 0, 1, 1, 1, 1, 1, 0, 0, 1, 0, 0, 1, 1, 1, 0, 1, 0, 1, 0, 0, 0}; {0, 1, 0, 0, 1, 0, 0, 0, 0, 1, 1, 0, 0, 1, 1, 1, 1, 1, 0, 1, 0, 1, 0, 0, 1, 1, 0}; {0, 1, 0, 0, 1, 0, 0, 0, 1, 0, 0, 1, 1, 0, 0, 0, 0, 1, 1, 0, 0, 1, 0, 1, 1, 0, 0, 1, 1, 1, 0, 1, 0, 1, 0, 1, 0, 0, 0}; {0, 1, 0, 0, 1, 0, 0, 0, 0, 1, 1, 0, 0, 1, 1, 1, 1, 1, 0, 0, 0, 1, 1, 1, 1, 0, 1, 0, 1, 0, 0, 0}; {0, 1, 0, 0, 1, 0, 1, 0, 0, 0, 0, 0, 1, 1, 1, 0, 1, 0, 0, 1, 1, 0, 1, 1, 1, 1, 0, 1, 0, 1, 0, 1}; {0, 1, 0, 1, 0, 0, 0, 0, 0, 1, 1, 1, 0, 1, 0, 0, 1, 1, 1, 0, 1, 1, 1, 0, 1, 0, 0, 1, 0, 0, 0, 0, 1, 1, 0}; {0, 1, 0, 1, 0, 0, 0, 0, 1, 1, 1, 0, 1, 0, 0, 1, 1, 1, 0, 1, 1, 1, 0, 1, 1, 0, 1, 1, 0, 0, 1, 0, 1, 1, 0, 1, 1, 1, 1, 1, 0, 1, 1, 1, 0}; {0, 1, 0, 1, 0, 0, 0, 0, 1, 1, 1, 0, 1, 0, 0, 1, 1, 1, 0, 1, 1, 1, 1, 0, 0, 1, 0, 0, 0, 0, 1, 1, 1, 1, 0, 0, 0, 0, 0, 1, 0, 1, 1, 0}; {0, 1, 0, 1, 0, 0, 0, 1, 1, 1, 1, 0, 1, 0, 0, 0, 1, 1, 0, 1, 1, 0, 0, 1, 1, 1, 1, 1, 0, 1, 0, 1, 0, 1, 1, 0, 1, 1, 0, 0, 0, 0, 1, 1, 1}; {0, 1, 0, 1, 0, 1, 0, 0, 1, 1, 1, 1, 1, 1, 0, 1, 0, 0, 0, 1, 1, 1, 1, 0, 0, 1, 0, 1, 0, 1, 0, 1}; {0, 1, 0, 1, 0, 1, 0, 0, 1, 1, 1, 1, 1, 1, 0, 0, 1, 1, 1, 0, 0, 0, 1, 0, 1, 0, 1, 1, 0, 1, 1, 1, 1, 1, 0, 1, 0, 0, 1, 1, 1, 0, 1}; {0, 1, 0, 1, 0, 1, 0, 0, 0, 0, 1, 1, 0, 0, 1, 1, 1, 0, 0, 1, 1, 0, 0, 0, 1, 0, 0}; {0, 1, 0, 1, 0, 1, 0, 0, 1, 1, 1, 1, 1, 1, 0, 1, 1, 0, 0, 1, 1, 1, 0, 1, 0, 0, 1, 1, 1, 1, 1, 0, 1}; {0, 1, 0, 1, 0, 1, 0, 0, 1, 1, 1, 1, 1, 0, 0, 1, 1, 0, 0, 1, 1, 0, 0, 0, 1, 0, 0}; {0, 1, 0, 1, 0, 1, 1, 0, 0, 0, 0, 1, 0, 0, 0, 1, 0, 1, 1, 0, 1, 0, 1, 0, 0, 0, 1, 0, 0, 0, 1, 1, 0, 0, 1, 1, 1, 0, 0, 1, 0, 0}; {0, 1, 0, 1, 1, 1, 1, 1, 1, 1, 0, 1, 1, 0, 0, 1, 1, 0, 0, 1, 0, 0, 0, 0, 0, 0, 1, 0, 0, 1, 0, 0}; {0, 1, 0, 1, 1, 1, 1, 1, 1, 1, 0, 1, 1, 0, 0, 1, 1, 1, 1, 1, 0, 1, 0, 0, 1, 1, 1, 1, 1}.

The sequence set 3 further includes some or all of the following 95 sequences. When time domain filtering is performed on sequences {$x_n$} corresponding to these sequences and equivalent sequences of these sequences obtained after π/2 BPSK modulation, and the filtering coefficient is [0.28, 1, 0.28], the PAPR is less than 1.40 dB. In addition, when a first maximum normalized power of a frequency domain sequence corresponding to {$x_n$} is less than 1 dB, and a first minimum normalized power is greater than −1 dB, frequency domain flatness of the corresponding sequence {$x_n$} is better:

{0, 0, 0, 0, 0, 0, 0, 1, 0, 0, 1, 0, 1, 1, 0, 0, 0, 1, 1, 1, 1, 0, 1, 1, 0, 0, 1, 1, 0, 1, 0, 1, 0, 1, 1, 1}; {0, 0, 0, 0, 0, 0, 0, 1, 1, 1, 0, 1, 0, 0, 0, 1, 0, 1, 0, 1, 1, 0, 0, 1, 1, 1, 0, 0, 0, 1, 0}; {0, 0, 0, 0, 0, 0, 0, 1, 0, 0, 0, 1, 1, 0, 0, 1}; {0, 0, 0, 0, 0, 0, 0, 1, 0, 0, 0, 1, 1, 0, 1, 0, 1, 1, 1, 0, 1, 0, 0, 1, 1, 0, 0, 0, 1, 0, 1, 1, 1, 1}; {0, 0, 0, 0, 0, 0, 0, 1, 0, 1, 1, 0, 0, 0, 0, 1, 1, 1, 1, 0, 1, 0, 1, 0, 1, 1, 1}; {0, 0, 0, 0, 0, 0, 0, 1, 1, 1, 0, 0, 1, 0, 0, 0, 1, 0, 1, 1, 1, 0, 0, 1, 1}; {0, 0, 0, 0, 0, 0, 0, 1, 1, 0, 0, 0, 1, 1, 0, 1, 0, 1, 1, 1, 1, 1, 0, 0, 1, 0, 0, 1, 0, 1, 0, 1, 0, 1, 1}; {0, 0, 0, 0, 0, 0, 1, 1, 0, 0, 0, 1, 1, 0, 1, 1, 1, 0, 1, 1, 1, 0, 1, 0, 0, 1, 1, 1}; {0, 0, 0, 0, 0, 0, 0, 1, 1, 0, 0, 1, 0, 1, 0, 1, 1, 0, 1, 1, 0, 0, 1, 1, 1}; {0, 0, 0, 0, 0, 0, 0, 1, 1, 0, 1, 0, 1, 0, 0, 1, 1, 0, 1, 1, 0, 0, 1, 1, 1}; {0, 0, 0, 0, 0, 0, 1, 1, 0, 1, 0, 0, 0, 1, 0, 1, 1, 0, 1, 1, 1, 1, 1}; {0, 0, 0, 0, 0, 0, 1, 1, 1, 0, 1, 0, 1, 0, 1, 1, 0, 1, 0, 1, 0, 1, 0, 0, 1, 1, 1, 1}; {0, 0, 0, 0, 0, 0, 1, 1, 1, 0, 1, 0, 1, 0, 1, 1, 0, 0, 1, 0, 0, 1, 1, 1, 1}; {0, 0, 0, 0, 0, 0, 1, 1, 1, 0, 0, 1, 1, 0, 1, 1, 0, 1, 0, 1, 0, 1, 0, 0, 1, 1}; {0, 0, 0, 0, 0, 0, 1, 1, 1, 0, 0, 1, 1, 0, 1, 0, 1, 1, 0, 1, 0, 1, 0, 0, 1, 1}; {0, 0, 0, 0, 0, 0, 1, 1, 0, 1, 1, 0, 1, 0, 1, 0, 0, 1, 0, 1}; {0, 0, 0, 0, 0, 0, 1, 1, 1, 0, 0, 1, 0, 0, 0, 1, 0, 1, 1, 0, 0, 0, 1}; {0, 0, 0, 0, 0, 0, 1, 1, 1, 0, 1, 0, 1, 0, 1, 1, 0, 0, 1, 1, 0, 0, 0, 1}; {0, 0, 0, 0, 0, 0, 1, 0, 0, 1, 0, 1, 1, 0, 0, 0, 1, 1, 0}.

0, 1, 0, 1, 0, 0, 1, 0, 1, 1, 0, 0, 1, 0, 0, 0, 0, 1, 1, 1, 0, 1, 1, 1, 0, 1, 0, 0, 0, 1, 1}; {0, 0, 0, 0, 0, 0, 0, 1, 0, 1, 0, 1, 1, 1, 0, 0, 0, 1, 0, 0, 1, 1, 1, 1, 0, 0, 1, 0, 1, 1, 0, 0, 0, 1, 0, 0, 1}; {0, 0, 0, 0, 0, 0, 1, 0, 1, 1, 1, 0, 1, 1, 0, 1, 1, 0, 1, 0, 1, 1, 0, 1, 1, 1, 0, 1, 1, 1, 0, 0, 0, 1, 1, 1}; {0, 0, 0, 0, 0, 0, 0, 1, 1, 0, 0, 0, 1, 0, 1, 1, 1, 0, 1, 1, 1, 0, 0, 0, 0, 0, 1, 0, 0, 1, 1, 0, 1, 0, 1, 0, 1, 0, 0, 0, 1, 1, 0, 0, 0, 0, 1, 1, 0, 0, 0, 0, 0, 1, 1, 0, 0, 0, 1, 0, 1, 0, 1, 1, 0, 1, 1, 1, 1}; {0, 0, 0, 0, 0, 0, 1, 1, 0, 1, 0, 1, 0, 0, 0, 1, 1, 0, 0, 0, 1, 1, 1, 1, 1, 0, 0, 1, 0, 1, 1, 0, 1, 1, 0, 0, 1}; {0, 0, 0, 0, 0, 0, 1, 1, 1, 0, 0, 0, 1, 1, 1, 0, 1, 1, 0, 1, 1, 0, 1, 1, 0, 1, 1, 0, 1, 1, 1, 0}; {0, 0, 0, 0, 0, 1, 1, 1, 1, 0, 1, 1, 0, 1, 0, 1, 0, 0, 0, 1, 1, 0, 0, 0, 0, 1, 0, 0, 1, 1}; {0, 0, 0, 0, 0, 1, 0, 0, 0, 0, 1, 1, 1, 1, 0, 1, 1, 0, 1, 0, 1, 0, 1, 0, 0, 1, 1, 1, 0, 1, 1}; {0, 0, 0, 0, 0, 1, 0, 0, 0, 1, 0, 0, 0, 1, 0, 0, 1, 1, 1, 1, 0, 0, 0, 1, 0, 0, 0, 1, 0, 1, 0, 0, 1, 0, 1, 1, 1, 1}; {0, 0, 0, 0, 1, 0, 0, 1, 0, 0, 0, 1, 1, 0, 1, 1, 1, 1, 0, 0, 0, 1, 1, 1, 0, 0, 1, 0, 0, 0, 0, 1, 1, 0, 1, 0, 1, 1, 1, 1, 1, 1, 1, 0, 0, 1, 0, 1, 1, 0, 1, 1, 1, 1, 0, 1, 1, 1, 1}; {0, 0, 0, 0, 0, 1, 0, 1, 0, 0, 1, 1, 1, 1, 1, 1, 0, 0, 1, 0, 1, 1, 1, 0, 0, 1, 1, 1}; {0, 0, 0, 0, 0, 1, 0, 1, 0, 1, 0, 1, 0, 1, 0, 1, 0, 1, 0, 1, 0, 1, 1, 0, 0, 0, 1, 1, 1, 1, 1, 0, 0, 1, 0, 1, 0, 1, 1, 0, 0, 1, 1, 0, 0, 0, 1, 1, 1, 1, 0, 1, 1}; {0, 0, 0, 0, 0, 1, 0, 1, 0, 0, 1, 0, 0, 0, 1, 1, 1, 0, 1, 1, 1, 1, 0, 0, 1, 0, 1, 1, 0, 1, 1, 0, 1, 1}; {0, 0, 0, 0, 0, 1, 0, 1, 1, 1, 1, 1, 0, 1, 0, 0, 1, 1, 1, 0, 0, 0, 1, 1, 1, 1, 0, 1, 0, 0, 0, 0, 1, 1, 0, 1}; {0, 0, 0, 0, 1, 0, 0, 0, 1, 1, 1, 0, 1, 1, 1, 0, 1, 0, 0, 0, 1, 1, 1, 1, 1, 1, 0, 0, 1, 0, 1, 0, 0, 1, 1, 0, 1, 1, 1, 0, 0, 1, 0, 1, 1, 1, 1, 1, 1, 0, 0, 1, 0, 0, 1, 1, 0, 1, 1, 1, 1, 0, 0, 0, 1, 1, 0, 0, 1, 1, 0, 1, 1, 0, 1, 1, 1, 0, 1, 0, 1, 1, 1, 0, 1, 0, 1, 1, 1, 1, 0, 0, 0, 1, 0, 1, 0, 0, 1, 1, 1, 0, 0, 0, 1}; {0, 0, 0, 1, 0, 1, 1, 1, 1, 1, 1, 0, 0, 0, 1, 0, 0, 1, 0, 1, 0, 1, 1, 1, 1, 0, 1, 1, 0, 0, 1, 1, 1, 1, 1, 0, 1, 0, 0, 0, 0, 0, 0, 0, 1, 1, 1, 0, 0, 0, 0, 1, 0, 1}; {0, 1, 1, 0, 0, 1, 0, 1, 0, 1, 1, 1, 0, 0, 1, 1, 0, 1, 1, 0, 1, 1, 0, 1, 1, 0, 1, 1, 0, 0, 1, 0, 0, 1, 0, 0, 0, 1, 1, 0, 0, 1, 1, 1, 1, 0, 1, 1, 1, 0, 1, 1, 0, 0, 1, 0, 0, 0, 0, 0, 1, 1, 0, 1, 1, 1, 1}; {0, 1, 0, 0, 0, 0, 1, 1, 0, 0, 0, 0, 1, 0, 1, 0, 1, 0, 0, 1, 0, 1, 1, 1, 0, 1, 1, 1, 0, 0, 0, 1, 0, 0, 0, 0, 1, 1, 0, 1, 1, 0, 1, 1, 1, 0, 0, 0, 0, 1, 0, 1, 1, 1, 1, 1, 1, 1, 1, 0, 1, 1, 0, 0, 0, 1, 0, 1, 1, 0, 0, 0, 0, 1, 1, 1, 0, 1, 0, 0, 0, 1, 0, 0, 0, 0, 1, 0, 0, 0, 1, 1, 0, 0, 0, 1, 1, 1, 0, 0, 0, 0, 1, 0, 1, 1, 1, 0, 0, 0, 1, 1, 1, 0, 0, 0, 1, 0, 1, 0, 1, 1, 1, 1, 0, 1, 0, 0, 1, 0, 1, 0, 1, 0, 0, 0, 1, 0, 0, 0, 1, 1, 0, 1, 0, 1, 1, 1, 0, 1, 0, 0, 1, 1, 0, 1, 1, 1, 1}; {0, 1, 0, 1, 0, 0, 0, 0, 0, 1, 1, 1, 1, 0, 0, 1, 1, 1, 0, 1, 0}; {0, 1, 0, 0, 0, 1, 0, 0, 0, 0, 1, 1, 0, 1, 0, 0, 0, 0, 0, 1, 0, 1, 1, 0, 1, 1, 1, 1, 0, 0, 0, 1, 1, 0, 1, 0}; {0, 1, 0, 0, 0, 1, 0, 0, 1, 0, 1, 1, 0, 0, 0, 1, 1, 1, 1, 0, 1, 1, 1, 0, 1, 0, 0, 0, 0, 0, 1, 0, 1, 1, 0, 0}; {0, 1, 0, 0, 0, 1, 0, 0, 1, 0, 1, 1, 1, 0, 0, 1, 1, 1, 1}; {0, 0, 0, 0, 0, 0, 1, 0, 1, 0, 1, 1, 0, 0, 1, 0, 0, 0}; {0, 1, 0, 0, 0, 1, 1, 0, 1, 1, 1, 0, 1, 1, 0, 0, 1, 1, 1, 1, 0, 0, 0, 0, 0, 0, 0, 1, 0, 1, 0, 1, 1, 0, 0, 1, 0, 0, 0, 0}; {0, 1, 0, 1, 0, 0, 0, 1, 1, 0, 1, 1, 1, 0, 0, 1, 0, 1, 0, 1, 0, 0, 0, 1, 0, 1, 1, 0, 0, 0, 1, 1, 1, 1, 0}; {0, 1, 0, 1, 0, 0, 0, 1, 1, 1, 1, 0, 0, 0, 1, 1, 1, 1, 0, 0, 0, 0, 0, 1, 0}; {0, 1, 0, 1, 0, 1, 0, 0, 0, 0, 0, 1, 1, 1, 1, 0, 0, 1, 0, 1, 0}; {0, 1, 0, 1, 0, 1, 0, 0, 1, 0, 0, 1, 1, 1, 1, 1, 0, 0, 0, 0, 0, 0, 1, 1, 1, 1, 1, 0, 1, 0, 1, 1, 1, 0, 0, 1, 0, 1, 1, 0, 1, 0, 1, 1, 1, 0, 1, 1, 0, 0}; {0, 1, 0, 1, 1, 0, 0, 0, 1, 0, 0, 0, 1, 1, 0, 1, 0, 1, 1, 1, 1, 0, 0, 0, 0, 0, 1, 0, 1, 1, 1, 0, 0, 1, 1, 0, 1, 1, 0, 0}; {0, 1, 0, 1, 1, 1, 1, 1, 0, 1, 0, 0, 1, 1, 0, 1, 1, 0, 1, 1, 0, 0, 0, 0, 1, 0, 0}.

In a possible example, when a sequence length of the first sequence set is 120, that is, when N=120, sequences in the first sequence set include some or all sequences of a length of 120 that are obtained by intercepting 120 elements in one Gold sequence of a length of 127 obtained through an operation of two preset m-sequences of a length of 127 modulo 2.

A generator polynomial of the two preset m-sequences of a length of 127 includes: $\{x^7+x^3+1 \text{ and } x^7+x+1\}$, and when an initial state of the first m-sequence is $\{1, 1, 1, 1, 1, 1, 1\}$, an initial state of the second m-sequence includes:

{1, 0, 0, 1, 0, 0, 1}; {1, 0, 0, 1, 0, 1, 0}; {0, 0, 1, 0, 0, 1, 1}; {1, 0, 0, 1, 1, 1, 1}; {1, 1, 0, 0, 1, 0, 0}; {1, 1, 1, 0, 1, 1, 1}; {0, 1, 0, 0, 0, 0, 0}; {1, 0, 1, 0, 1, 0, 0}; {0, 1, 1, 0, 0, 1, 0}; {1, 1, 0, 1, 0, 0, 0}; {1, 0, 1, 0, 0, 0, 0}; {0, 0, 0, 1, 0, 0, 1}; {1, 0, 0, 0, 1, 0, 0}; {0, 0, 0, 0, 0, 0, 1}; {1, 1, 0, 0, 0, 1, 1}; {1, 0, 0, 1, 0, 0, 0}; {0, 1, 1, 1, 1, 1, 1}; {0, 1, 0, 0, 1, 0, 0}; {0, 0, 1, 0, 1, 0, 1}; {1, 1, 0, 0, 1, 1, 1}; {0, 0, 1, 0, 1, 1, 1}; {1, 0, 1, 1, 0, 0, 1}; {1, 0, 0, 0, 1, 0, 1}; {0, 0, 0, 1, 0, 0, 0}; {1, 1, 0, 1, 0, 1, 1}; {0, 1, 1, 1, 0, 1, 1}; {1, 0, 0, 1, 1, 0, 0}; {1, 1, 1, 0, 0, 0, 1}; {0, 0, 0, 1, 0, 1, 0}; {1, 1, 1, 0, 0, 0, 0}; or a generator polynomial of the two preset m-sequences of a length of 127 includes: $\{x^7+x^3+1 \text{ and } x^7+x^6+1\}$, and when an initial state of the first m-sequence is $\{1, 1, 1, 1, 1, 1, 1\}$, an initial state of the second m-sequence includes:

{1, 0, 0, 1, 0, 0, 1}; {0, 0, 1, 1, 1, 1, 0}; {0, 0, 0, 1, 1, 1, 0}; {0, 1, 1, 0, 0, 1, 0}; {1, 1, 0, 1, 1, 1, 1}; {1, 1, 0, 0, 1, 0, 1}; {1, 0, 0, 1, 1, 0, 1}; {0, 0, 0, 0, 1, 0, 0}; {1, 0, 1, 0, 1, 1, 0}; {1, 0, 1, 1, 0, 0, 1}; {1, 1, 0, 0, 0, 0, 0}; {1, 0, 1, 0, 0, 0, 0}; {0, 0, 0, 0, 0, 0, 1}; {1, 0, 0, 1, 1, 0, 0}; {1, 1, 0, 0, 1, 1, 0}; {0, 1, 1, 1, 1, 0, 1}; {0, 0, 1, 1, 0, 1, 1}; {1, 0, 1, 0, 0, 0, 1}; {0, 0, 1, 1, 0, 1, 1}; {1, 1, 1, 1, 0, 0, 1}; {0, 1, 0, 0, 1, 1, 1}; {1, 1, 1, 1, 1, 0, 0}; {1, 1, 1, 0, 0, 0, 0}; {0, 0, 1, 1, 1, 0, 0}; {1, 0, 1, 1, 1, 1, 0}; {0, 1, 1, 1, 1, 1, 1}; {1, 1, 0, 0, 1, 1, 1}; {1, 1, 0, 1, 0, 0, 0}; {0, 0, 0, 0, 1, 0}; or a generator polynomial of the two preset m-sequences of a length of 127 includes: $\{x^7+x+1 \text{ and } x^7+x^4+1\}$, and when an initial state of the first m-sequence is $(1, 1, 1, 1, 1, 1, 1)$, an initial state of the second m-sequence includes:

{0, 0, 0, 1, 0, 1, 0}; {1, 1, 0, 0, 0, 0, 0}; {0, 1, 0, 1, 0, 1, 0}; {1, 1, 0, 0, 1, 0, 0}; {1, 0, 1, 1, 0, 1, 0}; {0, 0, 1, 1, 0, 1, 0}; {1, 1, 1, 1, 0, 0, 0}; {1, 0, 1, 0, 0, 0, 0}; {0, 1, 0, 0, 0, 1, 1}; {1, 0, 0, 1, 0, 0, 0}; {0, 0, 0, 1, 1, 0, 1}; {1, 1, 0, 0, 0, 0, 1}; {0, 0, 1, 1, 1, 1, 0}; {0, 0, 1, 1, 0, 0, 0}; {0, 1, 1, 0, 0, 1, 0}; {0, 1, 0, 1, 0, 1, 1}; {0, 1, 1, 1, 0, 0, 0}; {0, 0, 1, 0, 1, 1, 1, 1}; {1, 0, 1, 0, 1, 1, 0}; {1, 0, 0, 1, 1, 1, 0}; {1, 1, 1, 0, 1, 1, 0}; {0, 0, 1, 1, 0, 0, 0}; {1, 1, 1, 1, 1, 0, 1}; {1, 0, 0, 0, 0, 0, 0}; {0, 0, 1, 1, 1, 1, 1}; {1, 0, 1, 1, 0, 1, 1}; {0, 1, 1, 1, 1, 0, 0}; {1, 1, 0, 1, 1, 0, 0}; {0, 1, 1, 0, 1, 0, 1}; {0, 1, 0, 1, 1, 1, 0}; or a generator polynomial of the two preset m-sequences of a length of 127 includes: $\{x^7+x+1 \text{ and } x^7+x^4+1\}$, and when an initial state of the first m-sequence is $\{1, 1, 1, 1, 1, 1, 1\}$, an initial state of the second m-sequence includes:

{1, 0, 0, 1, 0, 1, 1}; {0, 0, 1, 1, 1, 1, 1}; {0, 0, 1, 0, 1, 1, 1}; {1, 1, 1, 0, 0, 1, 1}; {1, 0, 1, 1, 1, 1, 0}; {0, 1, 1, 0, 0, 1, 0}; {1, 1, 0, 0, 0, 1, 1}; {1, 1, 1, 0, 0, 1, 1}; {0, 1, 1, 0, 1, 0, 1}; {1, 1, 0, 1, 1, 1, 1}; {1, 0, 0, 1, 0, 0, 0}; {1, 1, 0, 1, 0, 0, 1}; {1, 1, 0, 1, 1, 0, 0}; {0, 0, 0, 1, 1, 0, 1}; {1, 1, 0, 0, 0, 0, 0}; {0, 1, 1, 1, 1, 1, 1}; {0, 1, 1, 1, 1, 1, 0}; {0, 1, 1, 1, 1, 0, 1}; {1, 1, 0, 1, 0, 1, 0}; {1, 0, 0, 1, 0, 1, 1}; {0, 0, 0, 1, 0, 1, 0}; {1, 1, 0, 1, 0, 0, 0}; {0, 0, 0, 0, 1, 1, 0}; {1, 0, 1, 1, 0, 0, 0}; {0, 1, 0, 0, 1, 1, 0}; {1, 1, 1, 0, 0, 0, 0}; {0, 0, 0, 1, 0, 0, 0}; {0, 0, 0, 1, 1, 0, 0}; {0, 1, 0, 1, 0, 1, 0}; {1, 0, 0, 0, 0, 1, 1}.

The generator polynomials of all the foregoing m-sequences are polynomials with a smaller quantity of terms in a primitive polynomial.

In a possible example, when a sequence length of a third sequence set is 18, that is, when N=18, some or all sequences in a sequence set 14 in the third sequence set are included, and the sequences in the sequence set 14 include the following 108 sequences. When time domain filtering is performed on sequences $\{x_n\}$ corresponding to these sequences obtained after $\pi/2$ BPSK modulation., and a filtering coefficient is [0.1, 1, 0.1], a PAPR is less than 2.89 dB; when a filtering coefficient is [0.16, 1, 0.16], a PAPR is less than 2.35 dB; when a filtering coefficient is [0.22, 1, 0.22], a PAPR is less than 1.76 dB; or when a filtering coefficient is [0.28, 1, 0.28], a PAPR is less than 1.27 dB. In addition, when a second maximum normalized power of a frequency domain sequence corresponding to $\{x_n\}$ is less than 0.5 dB, and a second minimum normalized power is greater than −0.5 dB, frequency domain flatness of the corresponding sequence $\{x_n\}$ is better:

{1, 0, 0, 0, 0, 0, 0, 0, 1, 1, 0, 1, 1, 0, 0, 1, 0, 1}; {1, 0, 0, 1, 1, 0, 1, 1, 0, 0, 0, 0, 0, 0, 0, 1, 0, 1};

{1, 0, 0, 1, 1, 1, 0, 1, 1, 1, 0, 1, 0, 0, 0, 0, 0, 1}; {1, 1, 1, 0, 1, 0, 0, 0, 1, 0, 0, 0, 1, 1, 0, 1, 0, 0};

{1, 1, 0, 0, 1, 1, 1, 1, 0, 0, 0, 1, 0, 1, 0, 0, 1, 0}; {1, 0, 0, 1, 0, 1, 0, 1, 1, 1, 0, 0, 1, 1, 1, 1, 0, 0};

{1, 0, 0, 1, 1, 1, 0, 1, 1, 0, 1, 0, 1, 1, 1, 0, 0, 0, 0, 0, 1, 0, 1, 0, 1, 0, 0, 1, 0, 0, 0};

{1, 0, 0, 0, 1, 0, 1, 0, 1, 1, 0, 0, 0, 0, 1, 1, 1, 1}; {1, 0, 1, 1, 0, 1, 0, 0, 0, 0, 0, 1, 0, 0, 0, 1, 1, 1};

{1, 0, 1, 1, 0, 1, 1, 1, 1, 0, 1, 0, 0, 0, 0, 0, 1, 1}; {1, 0, 1, 1, 0, 0, 0, 0, 0, 0, 1, 0, 1, 1, 0, 0, 1, 1};

{1, 0, 0, 1, 1, 0, 1, 0, 0, 0, 1, 1, 1, 1, 0, 1, 1, 1}; {1, 0, 1, 1, 1, 1, 0, 1, 0, 0, 0, 0, 0, 1, 0, 0, 1, 0};

{1, 1, 0, 0, 0, 0, 0, 0, 0, 1, 1, 0, 1, 0, 1, 0, 0, 1}; {1, 1, 0, 1, 0, 0, 0, 1, 1, 0, 1, 0, 1, 1, 1, 1, 1, 1};

{1, 1, 1, 1, 1, 1, 0, 0, 1, 0, 0, 0, 1, 0, 1, 0, 1, 1, 0}; {1, 0, 0, 0, 0, 0, 0, 0, 0, 1, 0, 1, 1, 0, 0, 1, 1, 0, 1, 1};

{1, 0, 0, 1, 0, 0, 1, 0, 0, 0, 1, 0, 1, 1, 1, 1, 1, 1, 1}; {1, 1, 0, 0, 0, 0, 0, 1, 0, 0, 0, 1, 0, 1, 0, 0, 0, 0, 1, 1, 0};

{1, 0, 0, 0, 1, 1, 0, 0, 0, 1, 0, 1, 0, 0, 0, 0, 0}; {1, 0, 0, 0, 1, 1, 0, 1, 0, 1, 1, 0, 0, 0, 0, 1, 1, 1, 1, 1};

{1, 0, 0, 0, 0, 1, 1, 1, 0, 0, 1, 0, 1, 0, 0, 1, 1, 1}; {1, 0, 0, 0, 0, 0, 0, 1, 1, 1, 1, 0, 1, 0, 1, 1, 1};

{1, 0, 0, 0, 0, 0, 1, 0, 1, 0, 0, 0, 1, 0, 1, 1, 0}; {1, 0, 0, 0, 0, 1, 0, 0, 0, 0, 0, 0, 1, 0, 0, 0};

{1, 0, 0, 1, 0, 1, 1, 1, 0, 0, 0, 1, 0, 1, 0, 0, 0, 1}; {1, 1, 0, 0, 0, 1, 0, 1, 1, 1, 1, 1, 0, 0, 0, 0, 1, 1, 0, 1, 0};

{1, 1, 0, 1, 1, 1, 1, 0, 1, 0, 0, 1, 1, 0, 1, 0, 0, 0}; {1, 0, 0, 0, 0, 0, 0, 0, 0, 1, 0, 1, 0, 0, 0, 0, 1, 1};

{1, 0, 0, 1, 0, 1, 1, 1, 1, 0, 1, 1, 1, 1, 1, 0, 1, 0}; {1, 0, 1, 0, 0, 0, 1, 1, 1, 1, 1, 0, 1, 1, 1, 1, 1};

{1, 0, 1, 1, 1, 1, 0, 0, 0, 1, 0, 0, 0, 0, 1, 1, 0, 1}; {1, 1, 1, 0, 1, 0, 0, 1, 0, 0, 0, 1, 1, 0, 1, 1, 1, 1};

{1, 0, 1, 1, 1, 0, 0, 0, 1, 0, 1, 0, 0, 0, 0, 0, 1, 1}; {1, 0, 0, 0, 0, 1, 0, 1, 1, 0, 1, 0, 1, 1, 0};

{1, 0, 0, 1, 0, 1, 0, 0, 1, 0, 1, 1, 1, 1, 1, 0, 0, 1}; {1, 1, 1, 0, 0, 1, 0, 0, 0, 1, 1, 0, 1, 1, 1, 0, 0, 0};

{1, 0, 1, 1, 1, 0, 0, 1, 0, 1, 1, 1, 1, 1, 0, 1, 0, 1}; {1, 0, 0, 0, 0, 1, 0, 1, 1, 1, 1, 0, 1, 0, 0, 0, 0, 1, 0, 1};

{1, 0, 1, 1, 1, 1, 0, 0, 0, 1, 0, 0, 0, 1, 1, 0, 1, 0, 1}; {1, 0, 0, 1, 0, 0, 1, 0, 0, 0, 0, 0, 0, 1, 1, 1, 0, 1};

{1, 0, 0, 0, 0, 0, 0, 1, 0, 0, 0, 1, 0, 1, 0, 0, 0, 1}; {1, 0, 0, 0, 0, 1, 1, 1, 1, 1, 1, 0, 0, 1, 1, 1, 0};

{1, 0, 1, 1, 0, 0, 1, 0, 1, 1, 0, 0, 0, 0, 1, 0, 0, 0, 0, 1}; {1, 0, 1, 1, 0, 0, 1, 0, 1, 1, 0, 0, 0, 0, 1, 0, 0, 1, 0, 1, 0};

{1, 1, 0, 1, 0, 0, 0, 1, 0, 1, 1, 1, 1, 1, 1, 0}; {1, 1, 1, 1, 0, 0, 0, 1, 0, 0, 0, 0, 1, 0, 0, 1, 0, 1};

{1, 0, 0, 0, 0, 0, 0, 1, 0, 1, 1, 1, 1, 0, 1, 0, 0, 0, 0, 1}; {1, 0, 1, 1, 0, 0, 0, 0, 1, 0, 1, 1, 1, 1, 1, 0, 1, 0, 1, 0, 0, 1};

{1, 0, 1, 1, 0, 0, 0, 0, 0, 1, 0, 1, 1, 1, 1, 0, 0, 0, 0, 1}; {1, 0, 1, 0, 0, 0, 1, 1, 1, 1, 1, 1, 0, 0, 0};

{1, 1, 0, 1, 0, 0, 0, 0, 0, 0, 0, 0, 1, 1, 1, 1, 0, 0}; {1, 1, 1, 1, 0, 0, 0, 1, 0, 0, 0, 0, 1, 0, 1, 0, 1, 1, 1, 1};

{1, 1, 1, 0, 1, 0, 1, 0, 0, 0, 1, 0, 0, 0, 1, 1, 1, 1}; {1, 0, 0, 1, 1, 1, 1, 1, 1, 1, 0, 1, 0, 0, 1, 1, 0, 1};
{1, 0, 1, 1, 1, 1, 1, 1, 0, 0, 1, 0, 1, 0, 0, 1, 1}; {1, 0, 0, 0, 0, 0, 1, 0, 1, 1, 1, 1, 0, 0, 1, 1, 0, 1};
{1, 0, 0, 1, 1, 0, 0, 0, 0, 1, 0, 1, 1, 1, 1, 1, 0, 1}; {1, 0, 0, 0, 0, 1, 1, 0, 0, 1, 1, 0, 0, 0, 0, 1, 0, 1};
{1, 0, 1, 0, 0, 0, 1, 0, 0, 0, 1, 1, 1, 0, 0, 0, 1, 1}; {1, 0, 1, 0, 1, 0, 0, 0, 1, 1, 1, 0, 0, 0, 1, 1, 0, 0};
{1, 1, 0, 1, 1, 1, 0, 1, 0, 1, 1, 0, 0, 0, 1, 1, 1, 0}; {1, 0, 1, 1, 0, 1, 0, 1, 1, 1, 1, 0, 0, 1, 0, 0, 0, 0};
{1, 0, 0, 0, 0, 1, 0, 1, 0, 0, 1, 0, 0, 0, 0, 0, 1, 0}; {1, 1, 1, 0, 0, 0, 0, 1, 0, 1, 0, 1, 1, 1, 1, 1, 1, 0};
{1, 0, 0, 0, 0, 0, 0, 1, 0, 1, 0, 1, 1, 1, 1, 0, 0, 0}; {1, 0, 0, 0, 0, 1, 1, 0, 1, 0, 0, 0, 0, 0, 1, 0, 0, 1};
{1, 0, 0, 1, 1, 1, 1, 0, 1, 0, 0, 1, 0, 0, 0, 0, 0, 1}; {1, 0, 0, 0, 0, 0, 1, 0, 1, 1, 1, 0, 1, 0, 1, 1, 1, 0};
{1, 0, 0, 0, 1, 0, 0, 0, 1, 0, 1, 0, 0, 1, 0, 0, 0, 0}; {1, 0, 0, 0, 1, 1, 1, 1, 1, 0, 1, 1, 0, 1, 0, 1, 1, 1};
{1, 1, 0, 0, 1, 1, 1, 0, 1, 0, 1, 1, 1, 0, 1, 0, 0, 0}; {1, 1, 1, 0, 1, 0, 0, 0, 1, 1, 0, 1, 0, 1, 1, 1, 1, 1};
{1, 1, 1, 1, 1, 0, 1, 0, 1, 1, 0, 0, 0, 1, 0, 1, 1, 1}; {1, 0, 0, 0, 1, 0, 1, 1, 0, 1, 1, 0, 1, 1, 0, 1, 1, 1, 1, 0};
{1, 0, 1, 1, 0, 1, 0, 0, 0, 1, 1, 0, 0, 0, 0, 1, 0}; {1, 0, 0, 0, 0, 0, 1, 0, 0, 1, 0, 0, 0, 0, 1, 0, 0, 1};
{1, 1, 1, 0, 1, 0, 1, 1, 0, 0, 0, 0, 0, 1, 1, 0, 1}; {1, 0, 0, 1, 0, 0, 0, 1, 1, 1, 1, 1, 0, 0, 0, 1, 0, 1};
{1, 0, 1, 0, 0, 0, 1, 1, 1, 1, 1, 0, 0, 0, 1, 0, 0, 1}; {1, 1, 1, 1, 1, 1, 0, 0, 1, 0, 1, 0, 0, 0, 1, 0, 1, 1};
{1, 0, 0, 0, 0, 0, 1, 0, 1, 0, 0, 1, 0, 1, 1, 1, 0}; {1, 0, 0, 0, 0, 1, 0, 1, 1, 0, 1, 0, 1, 1, 1, 1, 1, 0};
{1, 0, 0, 0, 0, 1, 1, 1, 1, 0, 1, 0, 1, 0, 0, 1, 1, 0}; {1, 0, 1, 0, 1, 1, 1, 1, 0, 0, 0, 0, 1, 1, 0};
{1, 0, 0, 0, 0, 1, 1, 1, 0, 1, 1, 0, 1, 0, 1, 1, 0, 0}; {1, 1, 0, 0, 1, 0, 1, 0, 0, 1, 0, 0, 0, 1, 1, 1, 1, 0};
{1, 0, 0, 0, 1, 0, 0, 0, 0, 0, 1, 1, 0, 1, 0, 1, 0, 0}; {1, 0, 0, 0, 0, 0, 1, 0, 1, 1, 0, 0, 0, 0, 1, 0, 1, 0};
{1, 1, 1, 1, 1, 0, 1, 0, 0, 1, 0, 0, 0, 0, 1, 0, 1, 1}; {1, 0, 0, 0, 0, 0, 0, 1, 1, 0, 1, 0, 1, 1, 0, 1, 0, 0};
{1, 0, 0, 1, 0, 1, 0, 0, 1, 1, 1, 1, 1, 0, 0, 0, 1}; {1, 0, 1, 1, 1, 1, 0, 0, 1, 0, 1, 0, 0, 0, 0, 1, 1, 1};
{1, 1, 0, 0, 0, 1, 1, 1, 0, 1, 1, 1, 1, 0, 0, 1, 0, 1}; {1, 1, 1, 0, 0, 1, 0, 1, 0, 0, 1, 1, 1, 1, 1, 0, 1, 1, 1};
{1, 0, 0, 0, 0, 0, 0, 1, 0, 0, 1, 1, 1, 1, 0, 0, 1}; {1, 0, 0, 0, 1, 1, 1, 1, 1, 0, 1, 0, 0, 0, 0, 0, 1};
{1, 0, 1, 0, 1, 1, 1, 1, 0, 0, 0, 1, 0, 0, 1, 0, 0}; {1, 1, 1, 0, 0, 1, 0, 1, 0, 1, 0, 0, 0, 0, 1, 0, 0};
{1, 1, 1, 1, 0, 1, 1, 1, 1, 0, 0, 1, 0, 1, 0, 1, 1, 0}; {1, 1, 0, 0, 0, 0, 1, 0, 1, 0, 0, 0, 1, 0, 0, 1, 0, 0};
{1, 1, 0, 1, 1, 0, 1, 1, 0, 0, 0, 0, 1, 0, 1, 0, 0}; {1, 1, 1, 0, 0, 1, 1, 1, 1, 0, 1, 0, 1, 0, 1, 1, 1, 1, 0};
{1, 0, 0, 1, 1, 1, 1, 0, 0, 0, 1, 0, 1, 0, 1, 0, 0, 0}; {1, 0, 1, 1, 1, 0, 1, 0, 0, 1, 0, 1, 1, 0, 0, 0, 0, 0};
{1, 0, 1, 1, 1, 1, 1, 0, 0, 1, 0, 1, 1, 0, 1, 0, 0}; {1, 1, 0, 1, 0, 1, 1, 1, 1, 1, 0, 0, 1, 0, 0, 1, 0, 0}.

In a possible example, when a sequence length of a fifth sequence set is 12, that is, when N=12, some or all sequences in a sequence set 15 in the fifth sequence set are included, and the sequences in the sequence set 15 include the following 30 sequences. When time domain filtering is performed on sequences {x_n} corresponding to these sequences obtained after π/2 BPSK modulation, and a filtering coefficient is [0.28, 1, 0.28], a PAPR is less than 1.50 dB. In addition, when a first maximum normalized power of a frequency domain sequence corresponding to {x_n} is less than 4 dB, a first minimum normalized power is greater than −4 dB, and a cross-correlation coefficient is less than 0.85, frequency domain flatness of the corresponding sequence {x_n} is better:

{1, 0, 1, 1, 0, 1, 1, 0, 1, 0, 0, 0}; {1, 0, 1, 0, 0, 1, 1, 1, 0, 0, 1, 0}; {1, 0, 0, 1, 0, 1, 1, 0, 1, 1, 0, 1, 0}; {1, 0, 1, 1, 0, 0, 0, 1, 1, 0, 1, 1}; {1, 0, 1, 0, 0, 1, 0, 0, 1, 0, 1, 0}; {1, 0, 1, 1, 0, 0, 1, 0, 0, 0, 1};
{1, 0, 1, 1, 0, 0, 0, 1, 0, 0, 0, 1}; {1, 0, 1, 1, 0, 1, 1, 1, 0, 1, 1, 0}; {1, 0, 1, 1, 0, 1, 0, 1, 1, 0, 1, 1}; {1, 0, 1, 1, 0, 1, 0, 0, 0, 1, 0, 1}; {1, 0, 1, 0, 1, 0, 1, 1, 0, 0, 0, 1}; {1, 0, 1, 0, 1, 1, 0, 0, 1, 0, 0, 1};
{1, 0, 1, 0, 0, 0, 1, 0, 0, 0, 0, 0}; {1, 1, 1, 1, 0, 1, 1, 1, 0, 1, 0, 1}; {1, 0, 1, 1, 0, 1, 0, 1, 1, 1, 0, 1}; {1, 0, 1, 0, 1, 1, 1, 0, 1, 1, 0, 1}; {1, 0, 1, 0, 0, 1, 0, 0, 1, 0, 0, 0}; {1, 0, 1, 0, 1, 1, 0, 1, 1, 0, 1, 1};
{1, 0, 1, 0, 0, 1, 0, 1, 0, 0, 1, 1}; {1, 0, 1, 0, 0, 1, 0, 1, 1, 1, 0, 0}; {1, 0, 1, 1, 0, 1, 0, 1, 1, 0, 0, 0}; {1, 0, 1, 0, 1, 1, 0, 1, 1, 0, 0, 1}; {1, 0, 1, 0, 1, 1, 0, 1, 1, 0, 0, 0}; {1, 0, 1, 0, 1, 0, 0, 0, 0, 1};
{1, 0, 1, 0, 0, 1, 0, 0, 1, 1, 1, 0}; {1, 0, 1, 0, 1, 0, 0, 0, 1, 1, 0, 1}; {1, 0, 1, 1, 0, 0, 1, 1, 1, 0, 0, 0}; {1, 0, 1, 1, 0, 1, 1, 0, 0, 1, 1, 1}; {1, 0, 1, 1, 0, 0, 1, 1, 1, 1, 0, 1}; {1, 0, 1, 1, 0, 1, 1, 0, 0, 1}.

In a possible example, when a sequence length of a fifth sequence set is 18, that is, when N=18, some or all sequences in a sequence set 16 in the fifth sequence set are included, and the sequences in the sequence set 16 include the following 30 sequences. When time domain filtering is performed on sequences {x_n} corresponding to these sequences obtained after π/2 BPSK modulation, and a filtering coefficient is [0.1, 1, 0.1], a PAPR is less than 2.89 dB; when a filtering coefficient is [0.16, 1, 0.16], a PAPR is less than 2.35 dB; when a filtering coefficient is [0.22, 1, 0.22], a PAPR is less than 1.76 dB; or when a filtering coefficient is [0.28, 1, 0.28], a PAPR is less than 1.27 dB. In addition, when a second maximum normalized power of a frequency domain sequence corresponding to {x_n} is less than 0.5 dB, a second minimum normalized power is greater than −0.5 dB, and a cross-correlation coefficient is less than 0.672, frequency domain flatness of the corresponding sequence {x_n} is better:

{1, 0, 1, 1, 0, 0, 1, 1, 1, 1, 0, 1, 0, 1, 0, 0, 1}; {1, 0, 1, 0, 1, 0, 0, 0, 0, 0, 0, 1, 1, 0, 0, 1, 0, 0, 1};
{1, 1, 1, 1, 1, 1, 0, 0, 0, 0, 1, 0, 0, 1, 1, 1, 1, 0}; {1, 0, 1, 0, 1, 1, 1, 0, 1, 0, 0, 1, 1, 1, 0, 1, 0, 0};
{1, 0, 1, 1, 1, 0, 1, 0, 0, 1, 0, 1, 0, 0, 0, 0, 0}; {1, 0, 1, 1, 1, 0, 0, 1, 1, 1, 1, 1, 0, 0, 0, 0, 1, 1};
{1, 0, 0, 0, 0, 1, 0, 0, 1, 0, 0, 0, 1, 1, 1, 0}; {1, 0, 0, 0, 1, 1, 0, 1, 1, 0, 1, 1, 0, 1, 1, 1, 1, 0};
{1, 1, 1, 1, 0, 0, 1, 1, 0, 1, 0, 1, 1, 0, 0, 1, 0, 1}; {1, 0, 1, 1, 1, 1, 1, 0, 0, 1, 1, 1, 1, 1, 0, 1, 0, 0};
{1, 0, 1, 0, 1, 0, 1, 1, 0, 0, 1, 0, 1, 1, 1, 0, 0}; {1, 0, 1, 1, 0, 0, 0, 0, 1, 1, 0, 1, 1, 1, 0, 1, 1, 0};
{1, 0, 1, 1, 0, 1, 1, 0, 0, 0, 1, 1, 0, 1, 0, 1, 0}; {1, 1, 1, 0, 0, 1, 0, 0, 0, 1, 0, 0, 1, 0, 1, 0, 0};
{1, 0, 1, 0, 0, 1, 0, 0, 0, 1, 0, 0, 1, 1, 1, 0}; {1, 1, 1, 0, 0, 0, 0, 0, 0, 1, 0, 0, 1, 1, 1, 0};
{1, 0, 1, 1, 1, 0, 0, 1, 0, 1, 0, 0, 1, 1, 1, 0, 1, 0}; {1, 0, 0, 0, 1, 0, 1, 0, 1, 0, 0, 0, 1, 1, 0, 1};
{1, 0, 1, 0, 1, 0, 0, 0, 0, 1, 1, 1, 1, 1, 0, 1, 1}; {1, 0, 1, 1, 0, 0, 1, 0, 0, 1, 0, 0, 0, 1, 0, 0};
{1, 1, 1, 1, 0, 1, 1, 0, 1, 1, 0, 0, 1, 0, 0, 1, 0, 0}; {1, 0, 0, 0, 0, 1, 1, 1, 0, 0, 1, 0, 1, 1, 1, 0, 1};
{1, 0, 1, 0, 0, 1, 1, 1, 0, 1, 1, 1, 0, 0, 0, 1, 0}; {1, 0, 0, 1, 0, 1, 0, 1, 0, 0, 0, 1, 1, 0, 1, 0, 1};
{1, 0, 1, 1, 0, 1, 0, 0, 0, 0, 1, 1, 1, 1, 0, 1, 1}; {1, 0, 1, 1, 0, 0, 1, 0, 0, 1, 0, 0, 1, 0, 1, 0, 0};
{1, 1, 1, 1, 0, 1, 1, 0, 1, 1, 0, 0, 1, 0, 0, 1, 0, 0}; {1, 0, 0, 0, 0, 1, 1, 1, 0, 0, 1, 0, 1, 1, 1, 0, 1};
{1, 0, 1, 0, 0, 1, 1, 1, 0, 0, 1, 1, 1, 1, 0, 1, 0}; {1, 1, 1, 1, 0, 0, 0, 1, 0, 0, 1, 0, 0, 1, 0, 0};
{1, 0, 1, 0, 0, 1, 1, 1, 0, 0, 1, 1, 1, 1, 1, 0, 1, 1}; {1, 0, 1, 1, 0, 0, 1, 0, 0, 1, 0, 0, 1, 0, 1, 0, 0};
{1, 1, 1, 1, 0, 1, 1, 0, 1, 1, 0, 0, 1, 0, 0, 1, 0, 0}; {1, 0, 0, 0, 0, 1, 1, 1, 0, 0, 1, 0, 1, 1, 1, 1, 0};
{1, 0, 1, 0, 0, 1, 1, 1, 0, 0, 1, 1, 1, 1, 0, 1, 0}; {1, 0, 1, 1, 1, 1, 0, 0, 0, 1, 0, 1, 0, 1};

{1, 1, 0, 1, 0, 1, 0, 0, 1, 0, 0, 1, 1, 1, 1, 0, 0, 0}; {1, 0, 1, 0, 0, 1, 0, 1, 1, 0, 1, 1, 1, 0, 1, 1, 1, 0, 0};
{1, 1, 0, 1, 1, 0, 0, 1, 0, 1, 1, 1, 0, 0, 0, 0, 1, 1}; {1, 0, 1, 1, 0, 1, 0, 0, 1, 0, 0, 0, 0, 1, 1, 0, 0, 0}.

Figure 2:
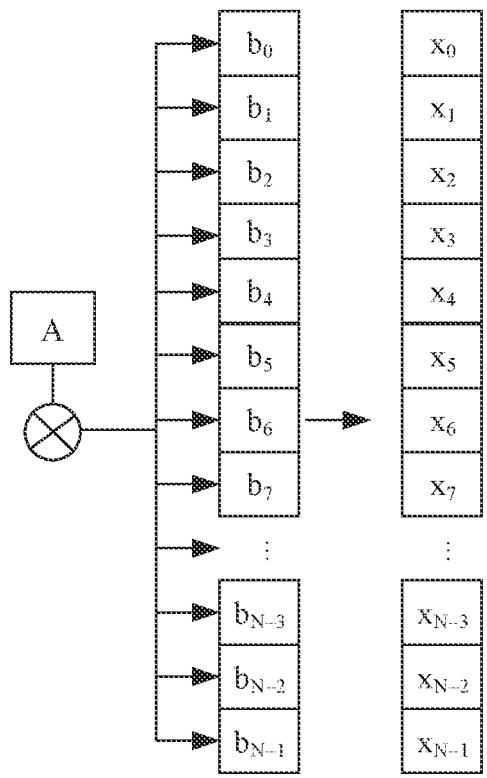
FIG. 2 is a schematic flowchart of determining a sequence $\{x_n\}$ by a terminal device according to an embodiment of this application.

In a possible example, when a sequence length of a fifth sequence set is 24, that is, when N=24, some or all sequences in a sequence set 17 in the fifth sequence set are included, and the sequences in the sequence set 17 include the following 30 sequences. When time domain filtering is performed on sequences {x$_n$} corresponding to these sequences obtained after π/2 BPSK modulation, and a filtering coefficient is [0.28, 1, 0.28], a PAPR is less than 1.39 dB. In addition, when a first maximum normalized power of a frequency domain sequence corresponding to {x$_n$} is less than 1.5 dB, a first minimum normalized power is greater than −1.5 dB, and a cross-correlation coefficient is less than 0.6, frequency domain flatness of the corresponding sequence {x$_n$} is better:

{1, 0, 1, 0, 1, 1, 0, 0, 1, 0, 0, 1, 0, 1, 0, 1, 0, 0, 1, 0, 0, 1, 1, 0}; {1, 0, 1, 0, 0, 0, 1, 1, 0, 1, 0, 0, 0, 1, 0, 1, 1, 0, 0, 0, 1, 0, 1, 1};

{1, 0, 1, 0, 1, 1, 0, 0, 0, 1, 0, 0, 1, 0, 1, 1, 1, 0, 1, 0, 1, 0, 0, 1}; {1, 1, 1, 1, 1, 0, 0, 1, 0, 0, 0, 1, 1, 1, 1, 0, 1, 1, 1, 1, 1, 1, 0, 0};

{1, 0, 1, 0, 0, 0, 1, 0, 0, 1, 1, 1, 0, 0, 0, 0, 0, 1, 0, 0, 1, 0, 1, 1}; {1, 1, 1, 1, 0, 1, 1, 1, 0, 0, 1, 0, 0, 1, 0, 1, 0, 0, 0, 1, 1, 1, 1, 0};

{1, 0, 1, 0, 0, 0, 1, 0, 0, 0, 1, 1, 0, 1, 0, 1, 1, 0, 0, 1, 0, 1, 0, 0}; {1, 1, 1, 1, 0, 0, 1, 1, 1, 1, 1, 0, 0, 0, 0, 0, 1, 0, 0, 0, 0, 1, 0, 0, 1};

{1, 0, 1, 1, 0, 1, 1, 1, 1, 0, 1, 1, 1, 0, 0, 1, 0, 0, 0, 0, 0, 1, 1, 1}; {1, 0, 1, 0, 0, 0, 1, 0, 1, 0, 1, 1, 0, 0, 0, 1, 1, 1, 0, 0, 0, 1, 1, 0};

{1, 1, 1, 1, 0, 0, 0, 0, 1, 0, 0, 1, 1, 1, 0, 1, 1, 1, 1, 0, 1, 1, 0, 1}; {1, 0, 1, 0, 0, 1, 1, 1, 0, 0, 0, 1, 1, 1, 0, 0, 1, 0, 1, 0, 1, 1, 1, 0};

{1, 1, 1, 1, 1, 0, 1, 0, 0, 1, 1, 0, 1, 1, 1, 0, 1, 1, 0, 1, 0, 1, 0, 0}; {1, 0, 1, 0, 0, 0, 0, 1, 1, 1, 0, 0, 1, 0, 1, 0, 0, 1, 1, 1, 0, 0, 0, 1, 0};

{1, 1, 1, 1, 1, 0, 1, 0, 1, 1, 0, 0, 0, 1, 0, 0, 0, 1, 0, 1, 0}; {1, 0, 1, 0, 0, 1, 1, 1, 0, 1, 1, 0, 1, 0, 1, 1, 0, 0, 1, 0, 0, 0, 0, 0};

{1, 0, 1, 0, 0, 1, 1, 1, 0, 1, 1, 1, 0, 1, 0, 0, 1, 1, 1, 0, 1, 0, 1, 1}; {1, 0, 1, 0, 0, 1, 0, 1, 0, 1, 0, 0, 1, 1, 0, 1, 0, 0, 0, 1, 0, 0, 0, 1};

{1, 0, 1, 0, 0, 0, 1, 1, 1, 0, 0, 1, 0, 0, 0, 0, 0, 0, 0, 0, 1, 1, 1, 0, 0}; {1, 0, 1, 0, 1, 1, 1, 0, 0, 0, 0, 1, 0, 0, 1, 0, 1, 0, 0, 0, 1, 0};

{1, 0, 1, 0, 0, 1, 0, 0, 0, 1, 1, 1, 0, 1, 0, 1, 1, 1, 0, 0, 0, 1, 0, 0}; {1, 0, 1, 0, 1, 1, 1, 1, 0, 1, 1, 1, 1, 0, 0, 1, 0, 0, 0, 0, 1, 0, 0, 1};

{1, 0, 1, 0, 0, 0, 1, 0, 0, 0, 0, 1, 1, 0, 0, 0, 1, 1, 0, 1, 0, 1, 0, 0}; {1, 0, 1, 0, 1, 1, 1, 0, 0, 0, 0, 0, 1, 1, 1, 0, 1, 1, 1, 0, 0, 0, 1, 1};

{1, 0, 1, 0, 0, 1, 1, 0, 1, 1, 0, 1, 1, 0, 0, 0, 0, 1, 1, 1, 1, 1, 0}; {1, 0, 1, 0, 1, 0, 0, 1, 1, 1, 0, 0, 1, 1, 1, 0, 1, 0, 1, 1, 1, 1, 0, 1};

{1, 0, 1, 0, 0, 0, 1, 0, 0, 1, 0, 0, 0, 1, 1, 0, 1, 0, 0, 0, 1, 0, 0, 0}; {1, 1, 1, 0, 0, 0, 1, 1, 0, 1, 1, 1, 0, 1, 0, 1, 1, 0, 1, 1, 0, 1, 1, 1};

{1, 0, 1, 0, 0, 0, 1, 1, 1, 0, 1, 0, 0, 0, 1, 1, 0, 1, 0, 0, 0, 0, 1}; {1, 0, 1, 0, 0, 1, 0, 0, 1, 1, 0, 0, 0, 0, 1, 0, 1, 0, 0, 0, 1, 1, 0, 1, 0};

In a possible example, a process in which the terminal device determines the sequence {x$_n$} including N elements after accessing the network may be shown in FIG. 2. A specific procedure is as follows:

The terminal device determines a sequence {b$_n$} and A, where a value of n ranges from 0 to N−1, and A is a non-zero complex number. The sequence {b$_n$} may be stored in the terminal device, may be configured by the network device for the terminal device, or may be obtained by the terminal device through calculation according to a predefined formula.

S102. Generate a first signal and send the first signal to the network device.

Figure 3:
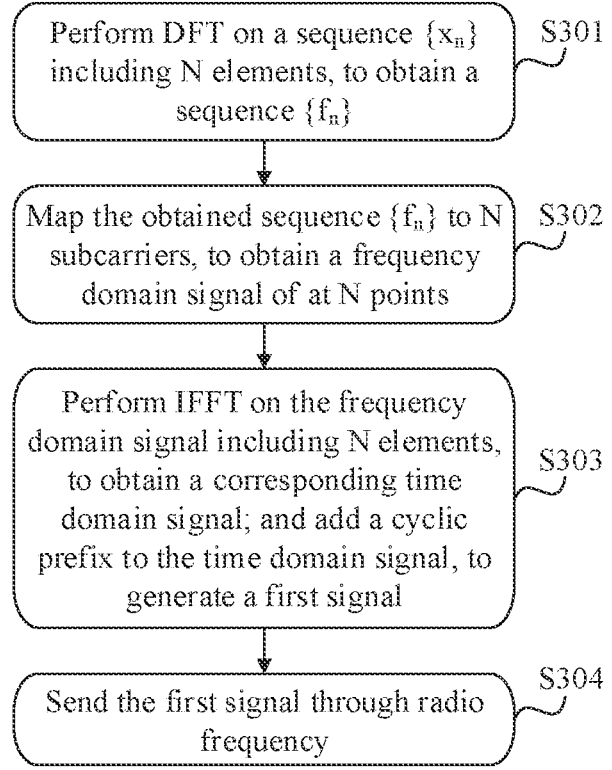
FIG. 3 is a schematic flowchart of generating and sending a first signal by a terminal device according to an embodiment of this application.

Optionally, a process of generating the first signal is shown in FIG. 3. During specific implementation, first, the terminal device performs discrete Fourier transform (discrete fourier transform, DFT) processing on N elements in the sequence {x$_n$}, to obtain a sequence {f$_n$}. Herein, it mainly means that the terminal device performs DFT processing by using the N elements in the configured sequence {x$_n$}, to obtain a frequency domain sequence. The frequency domain sequence herein is the sequence {f$_n$}. Then, the terminal device maps the sequence {f$_n$} to N subcarriers, to generate the first signal, and sends the first signal to the network device.

Optionally, as shown in FIG. 3, a specific process in which the terminal device performs DFT processing on the sequence {x$_n$} including the N elements, to obtain the frequency domain sequence, and then separately maps the frequency domain sequence to the N subcarriers, to generate the first signal, and sends the first signal to the network device includes the following steps.

S301. The terminal device performs DFT processing on the sequence {x$_n$} including the N elements, to obtain the sequence, {f$_n$}.

Figure 4A:
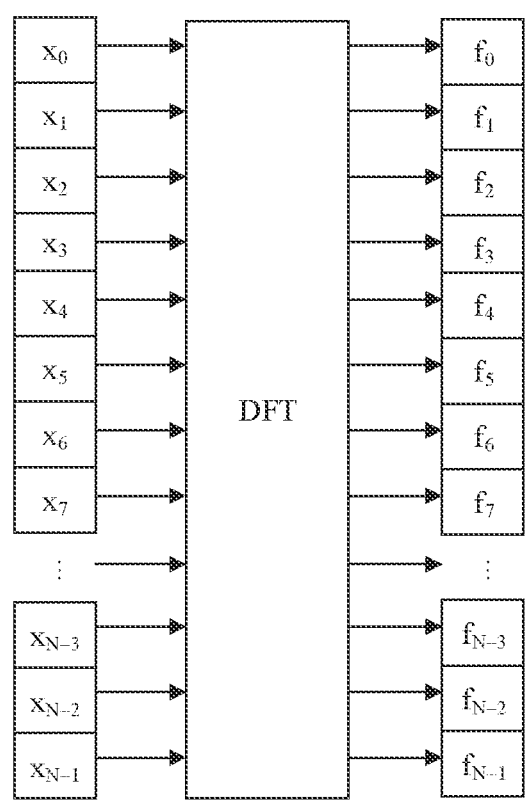
FIG. 4a, FIG. 4b, and FIG. 4c are schematic diagrams of obtaining, by performing DFT on a sequence $\{x_n\}$ including N elements, a sequence $\{f_n\}$ including N elements in frequency domain according to an embodiment of this application.
Figure 4B:
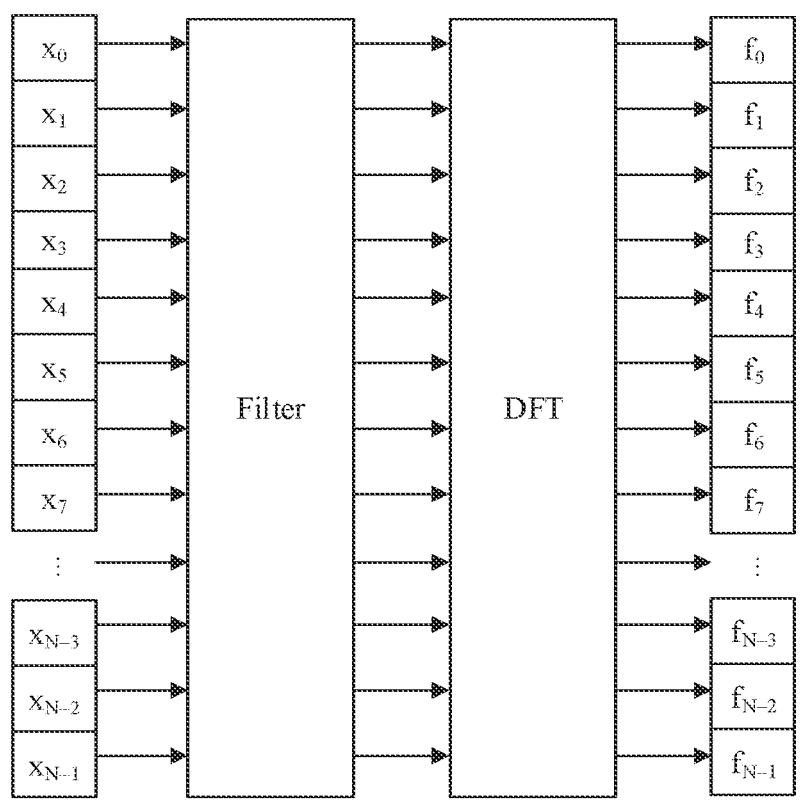
Figure 4C:
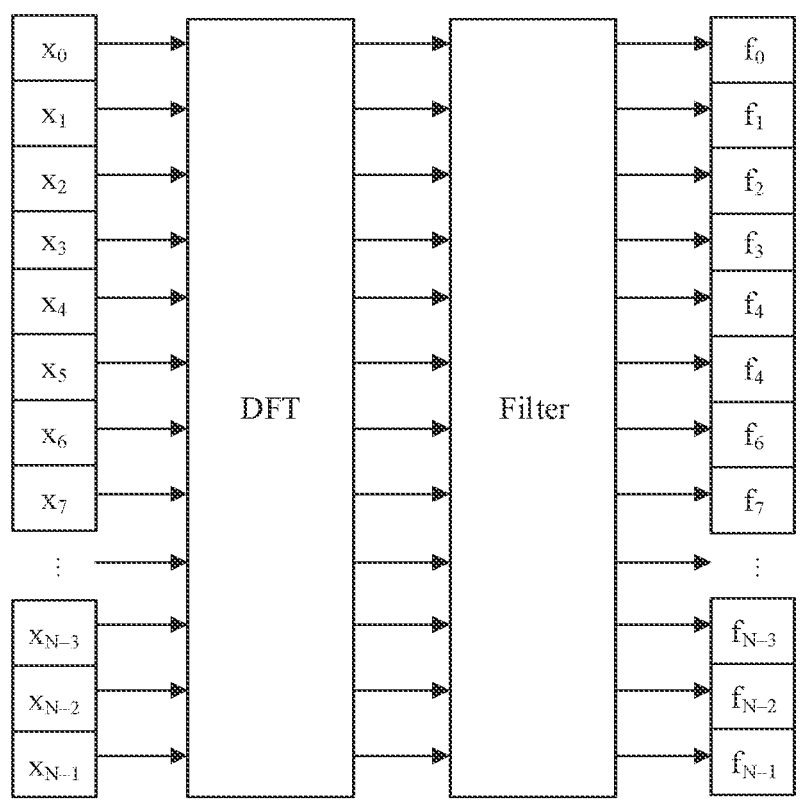

S301 is performed. Optionally, as shown in FIG. 4a, in a process in which the terminal device performs DFT processing on the sequence {x$_n$} to obtain the sequence {f$_n$}, a filter may not be used. Optionally, as shown in FIG. 4b, in a process in which the terminal device performs DFT processing on the sequence {x$_n$} to obtain the sequence {f$_n$}, the terminal device may perform DFT processing to obtain the sequence {f$_n$}, after using the filter. Optionally, as shown in FIG. 4c, in a process in which the terminal device performs DFT processing on the sequence {x$_n$} to obtain the sequence {f$_n$}, the terminal device may obtain the sequence {f$_n$} by using the filter, after performing DFT processing.

S302. The terminal device separately maps the sequence {f$_n$} to N subcarriers, to obtain a frequency domain signal at N points.

During specific implementation, the frequency domain signal at the N points is a frequency domain signal including N elements.

Figure 5A:
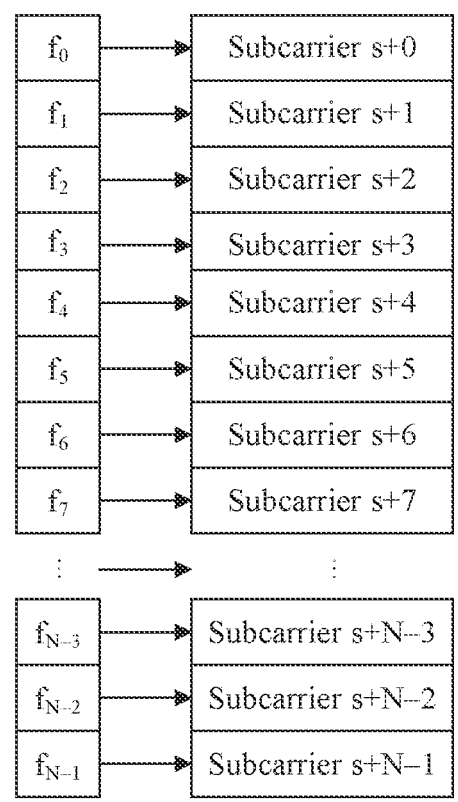
FIG. 5a and FIG. 5b are schematic diagrams showing that a sequence $\{f_n\}$ that includes N elements in frequency domain and that is obtained by performing DFT on a sequence $\{x_n\}$ including N elements is mapped to N subcarriers according to an embodiment of this application.
Figure 5B:
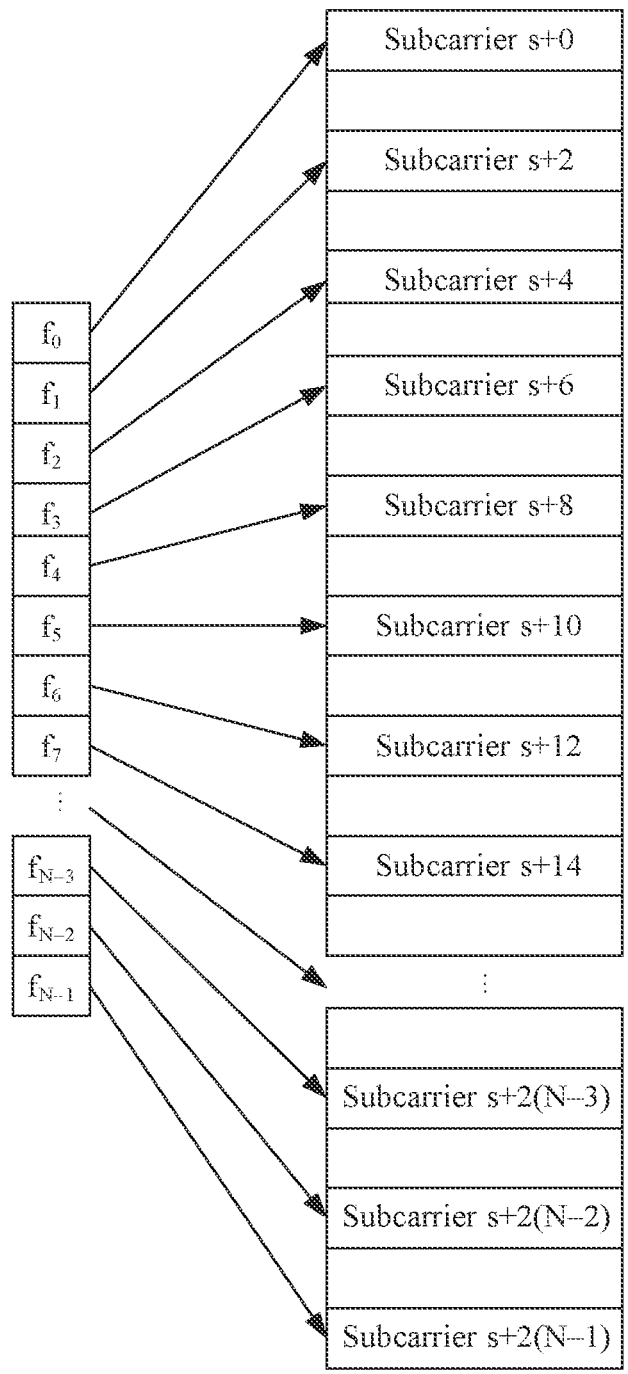

In FIG. 5a and FIG. 5b disclosed in the following embodiments of this application, s indicates an index of a first subcarrier, in subcarriers in a communications system, in the N subcarriers to which the sequence {f$_n$} is mapped.

Optionally, the terminal device respectively maps the N elements in the sequence {f$_n$} to N consecutive subcarriers. As shown in FIG. 5a, optionally, elements f$_0$ to f$_{N−1}$ in the sequence {f$_n$} are respectively mapped to N consecutive subcarriers, and subcarrier numbers are s+0, s+1, . . . , and s+N−1.

In a possible example, the terminal device successively maps the N elements in the sequence {f$_n$} to the N subcarriers in descending order of the subcarriers. One element in the sequence {f$_n$} is mapped to one frequency domain subcarrier. The frequency domain subcarrier is a minimum unit of a frequency domain resource, and is used to carry data information.

In a possible example, the terminal device successively maps the N elements in the sequence $\{f_n\}$ to the N subcarriers in ascending order of the subcarriers. Mapping one element in the sequence $\{f_n\}$ to one subcarrier means that the element is carried on the subcarrier. After mapping, when the terminal device sends data through radio frequency, it is equivalent that the element is sent on the subcarrier. In a communications system, different terminal devices may occupy different subcarriers to send data. Locations of the N subcarriers in a plurality of subcarriers in the communications system may be predefined or may be configured by the network device by using signaling.

Optionally, the N elements in the sequence $\{f_n\}$ may alternatively be mapped to N subcarriers having equal spacings. As shown in FIG. 5b, optionally, a spacing between the N subcarriers is 1, and the N subcarriers are equally spaced in frequency domain. A spacing between subcarriers to which the elements $f_0$ to $f_{N-1}$ in the sequence $\{f_n\}$ are mapped is one subcarrier. Specifically, the elements $f_0$ to $f_{N-1}$ in the sequence $\{f_n\}$ are respectively mapped to N equally spaced subcarriers, and the subcarriers are numbered s+0, s+2, . . . , and s+2(N−1).

In this embodiment of this application, a manner of respectively mapping the N elements in the sequence $\{f_n\}$ to the N subcarriers is not limited to the foregoing manner.

S303. The terminal device performs inverse fast Fourier transformation (inverse fast Fourier transformation, IFFT) on the frequency domain signal including N elements, to obtain a corresponding time domain signal; and adds a cyclic prefix to the time domain signal, to generate the first signal.

S304. The terminal device sends the first signal through radio frequency.

Optionally, when S303 is performed, the time domain signal obtained after the terminal device performs IFFT on the generated frequency domain signal at the N points is an orthogonal frequency division multiplexing (orthogonal frequency division multiplexing, OFDM) symbol. When S303 is performed, the terminal device sends the first signal through radio frequency. In other words, the terminal device sends, on the N subcarriers, the first signal that carries the sequence $\{f_n\}$.

In a possible example, the terminal device may send, on one OFDM symbol, the first signal carrying the sequence $\{f_n\}$, or may send, on a plurality of OFDM symbols, the first signal carrying the sequence $\{f_n\}$.

It should be noted that, in this embodiment of this application, a manner of generating the first signal is not limited to the foregoing implementation in which the terminal device performs DFT processing on the sequence $\{x_n\}$ including the N elements, to obtain the frequency domain sequence, then separately maps the frequency domain sequence to the N subcarriers, and generates the first signal and sends the first signal to the network device.

Optionally, the sequence $\{y_n\}$ may be obtained by using a shaping filter for the sequence $\{x_n\}$. Then, the sequence $\{y_n\}$ is modulated onto a carrier, to generate the first signal and send the first signal to the network device.

Optionally, the first signal is a reference signal. Specifically, the first signal may be UCI, a DMRS, an SRS, or a PTRS, or may be acknowledgment (acknowledgment, ACK) information, negative acknowledgment (negative acknowledgment, NACK) information, or uplink scheduling request (scheduling request, SR) information. In this embodiment of this application, the first signal includes but is not limited to only the foregoing information.

Optionally, the first signal is a signal used to carry communication information. During specific implementation, the communication information may be carried in a sequence selection manner, or may be carried in a sequence modulation scheme, but is not limited thereto.

Optionally, in the sequence selection manner, $2^n$ orthogonal sequences are allocated to one terminal device. Optionally, the $2^n$ orthogonal sequences may be obtained by performing $2^n$ cyclic shifts on one root sequence, and the $2^n$ orthogonal sequences can carry n-bit information. For example, the $2^n$ orthogonal sequences are four sequences numbered 0, 1, 2, and 3, where 00 corresponds to a sequence 0, 01 corresponds to a sequence 1, 10 corresponds to a sequence $\{2\}$, and 11 corresponds to a sequence 3. In this way, four sequences can carry 2-bit information.

Optionally, in the sequence modulation scheme, one sequence is allocated to one user, and a modulation symbol is generated for information that needs to be transmitted by the user. The modulation symbol includes but is not limited to a BPSK symbol, a QPSK symbol, an 8QAM symbol, a 16QAM symbol, and the like. The modulation symbol is multiplied by the sequence, to generate an actually sent sequence. For example, one BPSK symbol may be 1 or −1, and for one sequence $\{x_n\}$, a sent sequence may be $\{x_n\}$ or $\{-x_n\}$ after modulation is performed based on the BPSK symbol.

In a possible example, according to the description corresponding to FIG. 2 in the specification, after accessing a network, the terminal device may determine, based on A and a sequence $\{b_n\}$, a sequence $\{x_n\}$ that includes N elements and that is configured by the network device.

It should be noted that for the sequence modulation scheme, different information is carried by using different values of A in the sequence $\{x_n\}$.

Optionally, A may be a modulation symbol. In this case, A is obtained after a data information bit or a control information bit is modulated. A is carried on the N elements included in the sequence $\{x_n\}$, and A does not change with n.

Optionally, A is a constant. For example, A=1. For example, A may be a symbol known to both the terminal device and the network device. Alternatively, A may indicate an amplitude.

It should be noted that, that A is a constant in a transmission time unit does not mean that A is fixed, and A may change when the first signal is sent at different moments. For example, all the N elements included in the sequence $\{x_n\}$ are reference signals, and A is an amplitude of the reference signals. When the terminal device sends the first signal for a first time, the first signal may be sent based on A=1. When the terminal device sends the first signal for a second time, the first signal may be sent based on A=2.

S103. The network device receives the first signal carried on the N subcarriers, to obtain the N elements in the sequence $\{x_n\}$.

S103 is performed. The network device receives the signal on the N subcarriers based on the locations that are of the N subcarriers in subcarriers in the communications system and that are predefined or configured by a base station.

Optionally, the network device obtains, on N continuous subcarriers, the first signal on the N subcarriers; or obtains, on N subcarriers having equal spacings, the first signal on the N subcarriers.

Optionally, a manner of obtaining the N elements in the sequence $\{x_n\}$ is that the network device obtains the N elements in the sequence $\{f_n\}$, and performs inverse discrete Fourier transformation processing (inverse discrete fourier transformation, IDFT) on the sequence $\{f_n\}$, to obtain the N elements in the sequence $\{x_n\}$.

It can be learned from the description in the specification corresponding to S102 that the first signal is generated after the terminal device performs DFT processing on the N elements in the sequence $\{x_n\}$, to obtain the sequence $\{f_n\}$, and then maps the sequence $\{f_n\}$ to N subcarriers. For a detailed description of the sequence $\{x_n\}$, refer to the corresponding descriptions in S101 and S102. Details are not described herein again.

S103 is performed. In a possible design, first, the network device obtains, on N continuous subcarriers, the first signal on the N subcarriers; or obtains, on N subcarriers having equal spacings, the first signal on the N subcarriers. Then, the cyclic prefix of the first signal is removed, to obtain a time domain signal. Next, an M-point DFT is performed on the time domain signal, to obtain a frequency domain signal including N elements, where M is greater than or equal to N. Subsequently, N elements in the sequence $\{f_n\}$ are determined based on the frequency domain signal including N elements.

During specific implementation, after accessing the network, the terminal device sends a PUSCH by using the configured sequence $\{x_n\}$, and the network device receives the PUSCH by using the sequence $\{x_n\}$ configured for the terminal device.

S104. The network device processes the first signal based on the N elements in the sequence $\{x_n\}$.

Figure 6:
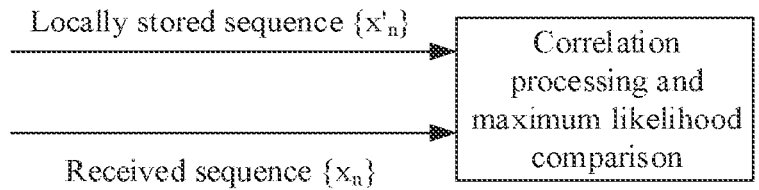
FIG. 6 is a schematic diagram of processing a first signal by a network device according to an embodiment of this application.

Optionally, FIG. 6 is a schematic diagram of a process in which the network device processes the first signal. The network device obtains all possible sequences by traversing a locally stored sequence $\{x_n'\}$, and separately performs related processing and maximum likelihood comparison on the obtained sequence $\{x_n\}$ and all the possible sequences of the sequence $\{x_n'\}$, to obtain data transmitted by the terminal device.

With reference to the description corresponding to S102 in the specification, a value combination of 2-bit information is $\{(0, 0), (0, 1), (1, 0), (1, 1)\}$. With reference to FIG. 2, when the 2-bit information is (0, 0), the obtained sequence $\{x_n'\}$ is a sequence $\{x_{1,n}'\}$; when the 2-bit information is (0, 1), the obtained sequence $\{x_n'\}$ is a sequence $\{x_{2,n}'\}$; when the 2-bit information is (1, 0), the obtained sequence $\{x_n'\}$ is a sequence $\{x_{3,n}'\}$; or when the 2-bit information is (1, 1), the obtained sequence $\{x_n'\}$ is a sequence $\{x_{4,n}'\}$. The four sequences $\{x_{1,n}'\}$, $\{x_{2,n}'\}$, $\{x_{3,n}'\}$, and $\{x_{4,n}'\}$ may be cyclic shift sequences of a same sequence, and the sequence $\{x_n\}$ is separately correlated to $\{x_{1,n}'\}$, $\{x_{2,n}'\}$, $\{x_{3,n}'\}$, and $\{x_{4,n}'\}$ to obtain four correlation values. A value of the 2-bit information corresponding to a largest correlation value is the data obtained by the network device. For example, if the largest correlation value is obtained through a correlation between the sequences $\{x_n\}$ and $\{x_{1,n}'\}$, the 2-bit information is (0, 0).

According to the sequence-based signal processing method disclosed in this embodiment of this application, a sequence used to send a signal on a PUSCH is determined. The sequence is a sequence $\{x_n\}$ including N elements, $x_n$ is an element in the sequence $\{x_n\}$, and the determined sequence $\{x_n\}$ is a sequence satisfying the preset condition. Then, the first signal is generated and sent. By using the determined sequence, when a signal is sent on the PUSCH, relatively good sequence frequency domain flatness can be maintained, and a relatively low PAPR value and a relatively low cross-correlation between sequences can be maintained, thereby satisfying a communications application environment in which a signal is sent on the PUSCH, especially an NR system scenario or an NR similar scenario.

Further, according to the sequence-based signal processing method disclosed in this embodiment of this application, for the sequence $\{s_n\}$ related to the sequence $\{x_n\}$ that includes the N elements and that is determined in S101, a set that includes the sequence $\{s_n\}$ including the element $s_n$ includes at least a first sequence in a second sequence set or an equivalent sequence of the first sequence, and a second sequence in the second sequence set or an equivalent sequence of the second sequence. In other words, the set that includes the sequence $\{s_n\}$ including the element $s_n$ includes at least a sequence in the second sequence set and two non-equivalent sequences in a sequence set including equivalent sequences of the sequences in the second sequence set. To be specific, the set that includes the sequence $\{s_n\}$ including the element $s_n$ includes at least two sequences in the second sequence set, or the set that includes the sequence $\{s_n\}$ including the element $s_n$ includes at least one sequence in the second sequence set and one equivalent sequence of another sequence in the second sequence set, or the set that includes the sequence $\{s_n\}$ including the element $s_n$ includes at least one equivalent sequence of one sequence in the second sequence set and one equivalent sequence of another sequence in the second sequence set. Herein, when the sequences in the first sequence set partially overlap those of the second sequence set, either the first sequence or the second sequence may be a sequence in the first sequence set, or neither the first sequence nor the second sequence is a sequence in the first sequence set.

In another possible embodiment, when N=18, the set that includes the sequence $\{s_n\}$ including the element $s_n$ in S101 includes at least a first sequence in a fourth sequence set and a second sequence in the fourth sequence set. In other words, the set that includes the sequence $\{s_n\}$ including the element $s_n$ includes at least two sequences in the fourth sequence set.

It should be noted that the second sequence set includes at least two sequences, or may include more than two sequences.

When N=12, the second sequence set is a sequence set 4 or a sequence set 5; and/or when N=24, the second sequence set is a sequence set 6, a sequence set 7, a sequence set 8, or a sequence set 9; and/or when N=36, the second sequence set is a sequence set 10, a sequence set 11, a sequence set 12, or a sequence set 13.

The sequence set 4 includes some or all of the following 30 sequences. When time domain filtering is performed on sequences $\{x_n\}$ corresponding to these sequences and equivalent sequences of these sequences obtained after π/2 BPSK modulation, and a filtering coefficient is [0.1, 1, 0.1], a PAPR is less than 3.05 dB; when a filtering coefficient is [0.16, 1, 0.16], a PAPR is less than 2.52 dB; when a filtering coefficient is [0.22, 1, 0.22], a PAPR is less than 1.95 dB; or when a filtering coefficient is [0.28, 1, 0.28], a PAPR is less than 1.50 dB. In addition, when a first maximum normalized power of a frequency domain sequence corresponding to $\{x_n\}$ is less than 4 dB, a first minimum normalized power is greater than −4 dB, and a cross-correlation coefficient between the sequences $\{x_n\}$ corresponding to these sequences and the equivalent sequences of these sequences is less than 0.85:

{1, 0, 0, 1, 1, 0, 1, 0, 1, 1, 1, 1}; {1, 0, 0, 1, 1, 1, 1, 0, 1, 0, 1}; {1, 0, 0, 0, 0, 1, 1, 0, 1, 1, 1, 0}; {1, 0, 0, 1, 1, 1, 1, 0, 1, 0, 0, 0}; {1, 1, 0, 0, 0, 1, 0, 1, 1, 1, 0, 1}; {1, 1, 0, 0, 0, 0, 0, 1, 1, 0, 1, 0}; {1, 1, 0, 1, 0, 0, 1, 1, 1, 0, 1, 1}; {1, 0, 0, 0, 0, 1, 0, 0, 1, 0, 1, 1}; {1, 0, 0, 0, 0, 1, 0, 1, 1, 0, 1}; {1, 0, 0, 0, 0, 1, 1, 1, 0, 1, 1, 0}; {1, 0, 0, 0, 0, 1, 1, 1, 0, 1, 0, 0}; {1, 0, 0, 1, 0, 0, 0, 1, 0, 0, 1, 1}; {1, 1, 0, 0, 0, 1, 0, 0, 0, 1, 1, 0}; {1, 0, 0, 0, 0, 0, 1, 0, 1, 0, 0, 0}; {1, 0, 0, 0, 0, 0, 1, 0, 0, 0, 1, 0}; {1, 0, 0, 0, 0, 1, 1, 0, 1, 0, 1, 1}; {1, 0, 0, 1, 1, 0, 1, 0, 0, 0, 0, 0}; {1, 0, 0, 1, 1, 1, 1, 0, 1, 0, 1, 1}; {1, 0, 0, 0, 0, 1, 1, 0, 0, 0, 1, 0}; {1, 0, 0, 0, 1, 1, 0, 0, 1, 0, 0, 1, 1, 0, 0, 1, 0, 0, 0, 0, 1, 0, 1, 0}; {1, 0, 0, 0, 0, 0, 0, 1, 1, 0, 0, 1, 0, 1, 0}; {1, 0, 0, 0, 0, 0, 1, 0, 1, 0, 1, 0, 1}; {1, 0, 0, 0, 1, 1, 1, 0, 1, 0, 1}; {1, 0, 0, 1, 0, 0, 0, 0, 0, 1, 1, 0}; {1, 0, 0, 1, 0, 1, 1, 1, 1, 0, 0, 1}; {1, 0, 0, 0, 0, 0, 0, 1, 1, 1, 0}; {1, 0, 0, 0, 0, 0, 0, 0, 1, 0, 1, 1}; {1, 1, 0, 1, 0, 1, 0, 1, 1, 0, 1, 1}.

The sequence 5 includes some or all of the following 30 sequences. When time domain filtering is performed on sequences $\{x_n\}$ corresponding to these sequences and equivalent sequences of these sequences obtained after π/2 BPSK modulation, and the filtering coefficient is [0.28, 1, 0.28], the PAPR is less than 1.50 dB. In addition, when a first maximum normalized power of a frequency domain sequence corresponding to $\{x_n\}$ is less than 4 dB, a first minimum normalized power is greater than −4 dB, and a cross-correlation coefficient between the sequences $\{x_n\}$ corresponding to these sequences is less than 0.84:

{1, 0, 0, 1, 1, 0, 1, 0, 1, 1, 1, 1}; {1, 0, 0, 1, 0, 1, 1, 1, 0, 1, 1, 1}; {1, 0, 0, 0, 0, 1, 0, 0, 0, 1, 0, 1}; {1, 0, 0, 0, 0, 0, 1, 0, 0, 1, 1, 1, 0}; {1, 0, 0, 0, 0, 0, 1, 0, 1, 1, 1, 0, 0}; {1, 0, 0, 0, 0, 0, 1, 1, 0, 1, 1, 0, 1, 1}; {1, 0, 0, 0, 0, 0, 1, 1, 0, 1, 1, 0}; {1, 0, 0, 1, 1, 1, 1, 0, 1, 0, 0, 0}; {1, 0, 0, 0, 0, 1, 0, 0, 1, 0, 1, 1}; {1, 0, 0, 0, 0, 1, 0, 1, 1, 0, 1, 1}; {1, 0, 0, 1, 0, 0, 0, 1, 0, 0, 1, 1}; {1, 1, 0, 0, 0, 1, 0, 0, 0, 1, 1, 0}; {1, 0, 0, 0, 0, 0, 1, 0, 1, 0, 0, 0}; {1, 0, 0, 0, 0, 0, 0, 1, 0}; {1, 0, 0, 0, 0, 1, 1, 0, 1, 0, 1, 1}; {1, 0, 0, 1, 1, 0, 1, 0, 0, 0, 0, 0}; {1, 0, 0, 1, 1, 1, 1, 1, 0, 1, 0, 1, 1}; {1, 0, 0, 0, 0, 1, 1, 0, 0, 0, 1, 0}; {1, 0, 0, 1, 1, 0, 0, 0, 0, 1, 0, 1}; {1, 0, 0, 0, 0, 0, 1, 1, 0, 1, 0}; {1, 0, 0, 1, 0, 0, 0, 0, 0, 1, 0, 1}; {1, 0, 0, 0, 0, 0, 1, 0, 1, 0, 1}; {1, 0, 0, 0, 1, 1, 1, 0, 1, 0, 1}; {1, 0, 0, 1, 0, 0, 0, 0, 0, 1, 1, 0}; {1, 0, 0, 1, 0, 1, 1, 0, 0, 0, 0, 0}; {1, 0, 0, 0, 0, 1, 0, 1, 1, 1}; {1, 0, 0, 0, 0, 0, 0, 1, 1, 1, 0}; {1, 0, 0, 0, 0, 0, 0, 0, 1, 0, 1, 1}; {1, 1, 0, 1, 0, 1, 0, 1, 1, 0, 1, 1}.

The sequence set 6 includes some or all of the following 30 sequences. When time domain filtering is performed on sequences $\{x_n\}$ corresponding to these sequences and equivalent sequences of these sequences obtained after π/2 BPSK modulation, and a filtering coefficient is [0.1, 1, 0.1], a PAPR is less than 3.17 dB; when a filtering coefficient is [0.16, 1, 0.16], a PAPR is less than 2.58 dB; when a filtering coefficient is [0.22, 1, 0.22], a PAPR is less than 1.94 dB; or when a filtering coefficient is [0.28, 1, 0.28], a PAPR is less than 1.39 dB. In addition, when a first maximum normalized power of a frequency domain sequence corresponding to $\{x_n\}$ is less than 1.5 dB, a first minimum normalized power is greater than −1.5 dB, in other words, frequency domain flatness of the corresponding sequence $\{x_n\}$ is relatively good, and a cross-correlation coefficient between the sequences $\{x_n\}$ corresponding to these sequences is less than 0.66:

{1, 0, 0, 1, 1, 1, 1, 1, 0, 1, 0, 0, 1, 1, 0, 0, 0, 0, 1, 0, 1, 0, 1}; {1, 0, 0, 1, 0, 0, 0, 0, 0, 1, 1, 1, 0, 1, 1, 0, 1, 0, 1, 1, 1, 0, 0, 0}; {1, 0, 0, 1, 1, 1, 1, 1, 0, 1, 1, 1, 1, 0, 0, 0, 1, 0, 0, 1, 1, 0, 1, 0}; {1, 1, 0, 0, 1, 0, 1, 0, 0, 0, 1, 0, 1, 1, 0, 1, 1, 1, 0, 0, 1, 1, 1, 1}; {1, 0, 0, 1, 0, 0, 0, 1, 0, 1, 0, 0, 0, 0, 1, 1, 0, 1, 1, 1, 1, 0, 0, 0}; {1, 1, 0, 0, 1, 0, 0, 0, 0, 0, 1, 0, 1, 1, 0, 0, 0, 0, 1, 0, 1, 1, 0, 1}; {1, 0, 0, 0, 0, 1, 0, 1, 0, 0, 0, 0, 1, 1, 1, 1, 0, 1, 0, 1}; {1, 0, 0, 0, 0, 0, 1, 1, 0, 0, 0, 0, 0, 1, 1, 1, 1, 1, 0, 1, 0, 1}; {1, 0, 0, 0, 0, 1, 0, 1, 0, 1, 1, 0, 0, 1, 0, 1, 1, 0, 1, 0, 0, 1, 0, 1, 1}; {1, 0, 0, 0, 0, 1, 1, 1, 0, 1, 0, 0, 1, 0, 1, 1}; {1, 0, 0, 0, 1, 1, 1, 1, 0, 1, 1, 0, 1, 1, 0, 1, 1, 1, 1, 0, 1, 1, 0}; {1, 0, 0, 1, 0, 1, 1, 0, 0, 1, 1, 1, 1, 1, 1, 1, 1, 1, 1, 1, 1, 1, 1, 1, 1, 1, 1, 1, 1, 0}.

0, 1, 0, 1, 0, 0, 0, 0, 1, 0, 1, 1, 1, 1, 1, 0, 0, 1, 1, 1, 0, 1}; {1, 0, 0, 1, 0, 1, 1, 0, 0, 0, 1, 0, 1, 1, 1, 0, 0, 0, 1, 0, 0, 0, 0, 0}; {1, 0, 0, 1, 1, 1, 0, 1, 0, 0, 0, 0, 1, 1, 0, 1, 0, 1, 1, 1, 1, 0, 1}; {1, 0, 0, 1, 0, 0, 0, 0, 1, 0, 1, 0, 0, 1, 1, 1, 1, 1, 0, 1, 0, 0, 0, 1}; {1, 0, 0, 1, 0, 1, 1, 1, 0, 1, 0, 1, 1, 0, 0, 0, 1, 1, 0, 1, 1, 1, 1, 1}; {1, 1, 0, 0, 1, 0, 0, 1, 1, 1, 1, 1, 0, 1, 1, 1, 1, 0, 0, 1, 0, 1, 0, 1}; {1, 1, 0, 0, 0, 0, 1, 0, 0, 0, 0, 0, 1, 1, 0}; {1, 1, 0, 0, 1, 0, 1, 0, 0, 0, 1, 0, 1, 1}; {1, 0, 0, 1, 0, 1, 0, 0, 0, 1, 0, 1, 1, 0, 0, 0, 0, 0, 1, 1, 0, 0, 0, 0, 1, 1}; {1, 0, 1, 1, 0, 1, 0, 0, 1, 1, 1, 0, 1}; {1, 0, 0, 1, 1, 1, 0, 1, 0, 0, 1, 1, 1, 1, 1, 0, 1, 1, 1, 0}; {1, 0, 0, 0, 0, 0, 0, 1, 0, 0, 0, 0}; {1, 1, 0, 0, 1, 0, 1, 1, 0, 1, 1, 1, 1, 1, 0, 1, 1, 1, 1}; {1, 0, 0, 0, 1, 0, 1, 1, 1, 1, 1, 1, 0, 0, 1, 1, 1, 1, 0, 0, 1, 1, 1, 1, 1, 0, 0, 0, 1, 0, 0, 0, 0, 0, 1, 1, 1, 1}; {1, 0, 0, 1, 1, 0, 1, 0, 0, 1, 1, 1, 1, 0, 0, 1, 1, 1, 1, 1, 1, 1, 0, 0, 0, 1, 0, 0, 1, 1, 1, 1, 1, 1, 1, 1, 1, 0, 0, 1, 1, 0, 0, 1, 1, 1, 1, 1, 1, 1, 1, 1, 0, 1, 0, 0, 0, 0, 1, 0, 1, 1, 1, 0, 0, 1, 0, 1, 1, 1, 1, 1, 0, 0, 1, 1, 1, 1, 1, 0, 0, 0, 1, 0, 1, 1, 1, 1, 1, 1, 1, 1, 0, 1, 1, 0, 1, 1, 0}.

The sequence 7 includes some or all of the following 30 sequences. When time domain filtering is performed on sequences $\{x_n\}$ corresponding to these sequences and equivalent sequences of these sequences obtained after π/2 BPSK modulation, and a filtering coefficient is [0.28, 1, 0.28], a PAPR is less than 1.39 dB. In addition, when a first maximum normalized power of a frequency domain sequence corresponding to $\{x_n\}$ is less than 1.5 dB, a first minimum normalized power is greater than −1.5 dB, in other words, frequency domain flatness of the corresponding sequence $\{x_n\}$ is relatively good, and a cross-correlation coefficient between the sequences $\{x_n\}$ corresponding to these sequences is less than 0.6:

{1, 0, 0, 1, 1, 1, 1, 1, 1, 0, 1, 0, 0, 1, 1, 0, 0, 0, 0, 1, 0, 1, 0, 1}; {1, 0, 0, 1, 0, 0, 0, 0, 0, 1, 1, 1, 0, 1, 1, 0, 1, 0, 1, 1, 1, 0, 0, 0}; {1, 0, 0, 1, 1, 1, 1, 1, 0, 1, 1, 1, 1, 0, 0, 0, 1, 0, 0, 1, 1, 0, 1, 0}; {1, 1, 0, 0, 1, 0, 1, 0, 0, 0, 1, 0, 1, 1, 0, 1, 1, 1, 0, 0, 1, 1, 1, 1}; {1, 0, 0, 1, 0, 0, 0, 1, 0, 1, 0, 0, 0, 0, 1, 1, 0, 1, 1, 1, 1, 0, 0, 0}; {1, 1, 0, 0, 1, 0, 0, 0, 0, 0, 1, 0, 1, 1, 0, 0, 0, 0, 1, 0, 1, 1, 0, 1}; {1, 0, 0, 0, 0, 1, 0, 1, 0, 0, 0, 0, 1, 1, 1, 1, 0, 1, 0, 1}; {1, 0, 0, 0, 0, 0, 1, 1, 0, 0, 0, 0, 0, 1, 1, 1, 1, 1, 0, 1, 0, 1}; {1, 0, 0, 0, 0, 1, 0, 1, 0, 1, 1, 0, 0, 1, 0, 1, 1, 0, 1, 0, 0, 1, 0, 1, 1}; {1, 0, 0, 0, 0, 1, 1, 1, 0, 1, 0, 0, 1, 0, 1, 1}; {1, 0, 0, 0, 1, 1, 1, 1, 0, 1, 1, 0, 1, 1, 0, 1, 1, 1, 1, 0, 1, 1, 0}; {1, 0, 0, 1, 0, 1, 0, 0, 0, 0, 1, 1, 1, 0, 1, 1, 0, 1, 1, 0, 0, 0, 1, 0, 0, 1, 1, 1, 1, 1, 1, 1, 1, 0, 0, 0, 1, 1, 1, 1, 1, 0, 0, 0, 0, 0, 0, 1, 0, 1, 1, 1, 0, 0, 1, 1, 1, 1, 1, 1, 0, 0, 0, 1, 0, 0, 0, 0, 0, 1, 1, 1, 1, 1, 0, 1, 1, 0, 1, 1, 0, 0, 1, 1, 1, 1, 1, 1, 1, 1, 1, 1, 1, 1, 0}.

1, 1, 1, 1, 0, 0, 0, 1, 0}; {1, 0, 0, 1, 0, 1, 0, 1, 1, 1, 1, 1, 1, 1, 0, 0, 0, 1, 1, 0, 1, 0, 1, 0, 0, 0, 1}.

The sequence set 11 includes some or all of the following 62 sequences. When time domain filtering is performed on sequences $\{x_n\}$ corresponding to these sequences and equivalent sequences of these sequences obtained after π/2 BPSK modulation, and a filtering coefficient is [0.1, 1, 0.1], a PAPR is less than 3.17 dB; when a filtering coefficient is [0.16, 1, 0.16], a PAPR is less than 2.58 dB; when a filtering coefficient is [0.22, 1, 0.22], a PAPR is less than 1.94 dB; or when a filtering coefficient is [0.28, 1, 0.28], a PAPR is less than 1.39 dB. In addition, when a first maximum normalized power of a frequency domain sequence corresponding to $\{x_n\}$ is less than 1.5 dB, a first minimum normalized power is greater than −1.5 dB, in other words, frequency domain flatness of the corresponding sequence $\{x_n\}$ is relatively good, and a cross-correlation coefficient between the sequences $\{x_n\}$ corresponding to these sequences is less than 0.69:

{1, 0, 0, 1, 1, 1, 1, 1, 1, 0, 1, 0, 0, 1, 1, 0, 0, 0, 0, 1, 0, 1, 0, 1}; {1, 0, 0, 1, 0, 0, 0, 1, 1, 1, 1, 1, 0, 1, 1, 0, 1, 1, 1, 0, 0, 0, 1, 0}; {1, 0, 0, 1, 0, 0, 0, 0, 0, 1, 1, 1, 1, 0, 1, 1, 0, 1, 0, 1, 1, 1, 0, 0, 0}; {1, 0, 0, 1, 0, 1, 0, 1, 1, 1, 1, 0, 0, 1, 1, 0, 1, 0, 0, 0, 0, 0, 1}; {1, 0, 0, 1, 1, 1, 1, 1, 1, 0, 1, 1, 1, 1, 0, 0, 1, 0, 1, 1, 0, 0, 0, 1, 1, 0, 1, 0}; {1, 0, 0, 1, 1, 0, 1, 1, 1, 1, 1, 1}; {1, 0, 0, 1, 1, 0, 1, 1, 1, 1, 1, 0, 0, 0, 1, 0, 0, 0, 0, 0, 1, 1, 0, 1, 0}; {1, 0, 0, 1, 1, 1, 1, 0, 1, 1, 0, 1, 0, 0, 0, 1, 0, 1, 0, 0, 1, 1, 1, 1}; {1, 0, 0, 1, 0, 0, 0, 1, 0, 1, 0, 0, 0, 0, 1, 1, 0, 1, 1, 1, 1, 0, 0, 0}; {1, 1, 0, 0, 0, 1, 0, 0, 0, 0, 0, 1, 0, 1, 1, 0, 0, 0, 1, 0, 1, 1, 0, 1}; {1, 1, 0, 0, 0, 1, 0, 0, 1, 0, 1, 1, 1, 0, 0, 1, 0, 1, 1, 1, 1, 1, 0, 1}; {1, 1, 0, 0, 0, 0, 0, 0, 1, 0, 1, 0, 1, 1, 0, 0, 1, 1, 0, 1, 0, 0, 1}; {1, 1, 0, 0, 1, 0, 1, 1, 0, 0, 1, 1, 1, 0, 1, 0, 1, 0, 0, 0, 0, 0, 0, 0, 1}; {1, 0, 0, 1, 0, 0, 1, 0, 1, 0, 1, 0, 0, 0, 0, 0, 0, 1, 1, 0, 0, 1, 1, 1}; {1, 0, 0, 0, 0, 1, 0, 1, 0, 0, 0, 1, 0, 0, 1, 0, 0, 0, 1, 1, 1, 1, 0, 1}; {1, 0, 0, 1, 0, 0, 1, 1, 1, 0, 0, 1, 1, 0, 0, 0, 0, 0, 0, 1, 0, 1, 0}; {1, 0, 0, 0, 0, 1, 0, 0, 1, 0, 0, 0, 1, 0, 1, 0, 0, 0, 1, 1, 1, 1, 0, 0}; {1, 0, 0, 1, 0, 0, 0, 1, 1, 0, 0, 0, 0, 1, 0, 1, 1, 1, 1, 0, 1, 0, 1}; {1, 0, 0, 1, 0, 1, 0, 0, 0, 0, 1, 0, 0, 0, 1, 1, 1, 1, 1, 0, 1, 0, 0, 1}; {1, 0, 0, 1, 0, 1, 1, 0, 1, 1, 1, 1, 1, 0, 0, 0, 1, 0, 1, 0, 0, 1}; {1, 0, 0, 1, 0, 1, 1, 0, 1, 1, 1, 1, 0, 0, 0, 1, 0, 1, 1, 1}; {1, 1, 0, 0, 0, 0, 1, 1, 1, 0, 1, 0, 1, 1, 1, 1, 0, 1, 1, 1, 1, 0}; {1, 0, 0, 1, 0, 1, 0, 0, 0, 0, 1, 0, 1, 1, 1, 1, 0, 0, 1, 1, 1, 0, 1}; {1, 0, 0, 0, 1, 1, 0, 0, 0, 1, 0, 1, 1, 1, 0, 0, 0, 1, 0, 0, 0, 0}; {1, 0, 0, 1, 1, 1, 0, 1, 0, 0, 0, 0, 0, 0, 1, 1, 0, 1, 0, 1, 1, 1, 1, 0, 1}; {1, 0, 0, 1, 0, 0, 0, 0, 0, 0, 0, 1, 1, 1, 1, 1, 0, 0, 0, 0, 1}; {1, 0, 0, 1, 0, 1, 1, 1, 0, 1, 0, 1, 1, 0, 0, 0, 1, 1, 0, 1, 1, 1, 1, 1}; {1, 0, 0, 0, 0, 1, 0, 1, 1, 1, 1, 1, 0, 1, 1, 1, 1}; {1, 1, 0, 0, 0, 1, 0, 1, 1, 1, 1, 0, 1, 1, 0, 0, 1, 1, 1, 1, 0, 1, 0}; {1, 0, 0, 1, 0, 0, 0, 1, 0, 0, 1, 1, 1, 0, 0, 0, 0, 1, 0, 0}; {1, 1, 0, 0, 1, 1, 0, 1, 1, 1, 1, 0, 1, 1, 0, 0, 1, 1, 1, 1, 0, 1, 0}; {1, 0, 0, 1, 0, 0, 0, 1, 0, 0, 1, 1, 1, 0, 0, 0, 0, 1, 0, 1, 1, 0, 0, 0, 0, 1}; {1, 1, 0, 0, 0, 0, 0, 0, 1, 0, 1, 1, 0, 0, 0, 1, 0, 0, 0, 1, 1}; {1, 1, 0, 0, 0, 1, 0, 1, 0, 0, 1, 1, 1, 1, 0, 0, 0, 1, 0, 1}; {1, 1, 1, 0, 0, 0, 0, 1, 0, 1, 0, 1, 0, 0, 0, 1, 1, 0, 1, 0, 0, 0, 1, 1, 0, 0, 0, 1, 0, 0, 1, 1, 0, 0, 1, 0}; {1, 0, 0, 1, 0, 0, 0, 0, 0, 0, 1, 0, 1, 0, 0, 1, 1, 0, 1, 0, 0, 0, 1, 1}; {1, 0, 0, 1, 0, 1, 0, 1, 1, 1, 1, 0, 1, 1, 1, 1, 1, 0, 0, 0, 0, 1, 1, 0, 1}; {1, 1, 0, 0, 0, 1, 0, 1, 0, 1, 1, 1, 1, 1, 1, 0, 0, 1, 1, 1, 1, 1, 0, 1, 1, 0}; {1, 0, 0, 1, 0, 1, 1, 0, 0, 0, 1, 1, 0, 0, 0, 0, 0, 1, 0, 1, 1, 1, 0}; {1, 0, 0, 1, 1, 0, 1, 0, 1, 1, 1, 1, 1, 1, 1, 0, 1, 1, 0, 0, 0, 1, 1, 1, 0, 1, 1, 0, 0, 0, 1, 1, 0}; {1, 0, 0, 1, 0, 0, 1, 1, 1, 1, 1, 0, 0, 0, 1, 0, 0, 0, 0}; {1, 0, 0, 1, 0, 1, 1, 0, 1, 0, 1, 0, 1, 1, 0, 0, 0, 1, 0, 1, 0, 0, 1}; {1, 0, 0, 1, 1, 0, 1, 0, 0, 0, 0, 0, 0, 1, 1, 0, 0, 0, 0, 1, 0, 1, 1, 1, 1, 0}; {1, 0, 0, 1, 0, 0, 0, 1, 1, 0, 1, 0, 1, 1, 1, 0, 1, 1, 1, 0}; {1, 0, 0, 0, 0, 1, 1, 1, 0, 0, 0, 0, 1, 0, 0, 1, 1, 0, 1, 0}; {1, 0, 0, 0, 0, 1, 1, 1, 1, 0, 1, 1, 0, 1, 1, 1}; {1, 1, 0, 1, 0, 0, 0, 0, 0, 0, 1, 1, 1, 0}; {1, 0, 0, 1, 0, 0, 0, 1, 0, 1, 1, 1, 0, 0, 0, 1, 0}; {1, 0, 0, 1, 1, 0, 1, 1, 1, 0, 0, 0, 0, 1, 1, 1, 1, 0, 1, 0, 1, 0}; {1, 0, 0, 0, 0, 0, 1, 1, 1, 0, 0, 0, 0, 1, 1, 0, 0, 1, 0, 0, 0, 1, 0, 1, 1, 0, 1, 0}; {1, 1, 0, 0, 0, 0, 0, 1, 0, 0, 1, 1, 1, 0, 1, 1, 0, 0, 0, 0, 0, 1, 1, 0, 1, 1, 0, 0, 0, 1, 0, 1, 1, 1, 1, 0, 0, 1, 0, 0, 0}.

The sequence 9 includes some or all of the following 56 sequences. When time domain filtering is performed on sequences $\{x_n\}$ corresponding to these sequences and equivalent sequences of these sequences obtained after π/2 BPSK modulation, and a filtering coefficient is [0.28, 1, 0.28], a PAPR is less than 1.49 dB. In addition, when a first maximum normalized power of a frequency domain sequence corresponding to $\{x_n\}$ is less than 1.5 dB, a first minimum normalized power is greater than −1.5 dB, in other words, frequency domain flatness of the corresponding sequence $\{x_n\}$ is relatively good, and a cross-correlation coefficient between the sequences $\{x_n\}$ corresponding to these sequences is less than 0.67:

{1, 0, 0, 1, 1, 1, 1, 1, 1, 0, 1, 0, 0, 1, 1, 0, 0, 0, 0, 1, 0, 1, 0, 1}; {1, 0, 0, 1, 0, 0, 0, 1, 1, 1, 1, 1, 0, 1, 1, 0, 1, 1, 1, 0, 0, 0, 1, 0}; {1, 0, 0, 1, 0, 0, 0, 0, 0, 1, 1, 1, 1, 0, 1, 1, 0, 1, 0, 1, 1, 1, 0, 0, 0}; {1, 0, 0, 1, 0, 1, 0, 1, 1, 1, 1, 0, 0, 1, 1, 0, 1, 0, 0, 0, 0, 0, 0, 1}; {1, 0, 0, 1, 1, 1, 1, 1, 1, 0, 1, 1, 1, 1, 0, 0, 1, 0, 0, 1, 1, 0, 1, 0}; {1, 0, 0, 1, 0, 1, 1, 1, 0, 0, 1, 1, 1, 1, 1, 0, 0, 1, 1, 1, 1}; {1, 0, 0, 1, 0, 1, 1, 1, 1, 0, 1, 1, 1, 0, 0, 0}; {1, 1, 0, 0, 0, 0, 0, 1, 1, 0, 0, 0, 0, 1, 0, 0, 1, 0, 1, 1, 1, 0}; {1, 0, 0, 1, 0, 0, 0, 1, 0, 1, 0, 0, 0, 0, 1, 1, 0, 1, 1, 1, 1, 0, 0, 0}; {1, 1, 0, 0, 0, 0, 0, 0, 1, 0, 1, 1, 0, 0, 0, 1, 0, 1, 1, 0, 1}; {1, 1, 0, 0, 0, 0, 0, 0, 1, 0, 1, 1, 0, 0, 0, 0, 1, 0, 1, 1, 0, 0, 1}; {1, 1, 0, 0, 0, 0, 0, 0, 0, 1, 0, 1, 0, 1, 1, 0, 0, 1, 1, 0, 1, 0, 0, 1}; {1, 0, 0, 1, 0, 1, 1, 0, 1, 0, 1, 0, 0, 0, 0, 0, 0, 0, 1}; {1, 0, 0, 1, 0, 0, 0, 1, 1, 1, 1, 0, 0, 0, 1, 0, 0, 1, 0, 1}; {1, 1, 0, 0, 1, 0, 0, 0, 1, 0, 0, 0, 0, 0, 0, 1, 1, 0, 0, 1, 1, 1}; {1, 1, 0, 0, 1, 0, 0, 0, 1, 0, 0, 0, 0, 0, 1, 1, 0, 0, 1, 1}; {1, 0, 0, 1, 0, 0, 0, 0, 0, 1, 1, 0, 1, 0, 0, 1, 1, 1}; {1, 1, 0, 0, 0, 0, 0, 1, 1, 0, 1, 0, 0, 1, 0, 1, 1}; {1, 1, 0, 0, 0, 0, 0, 1, 0, 1, 1, 1, 1, 0, 1, 1, 1, 1, 0}; {1, 0, 0, 1, 0, 0, 0, 1, 0, 1, 0, 0, 1}; {1, 0, 0, 0, 0, 0, 1, 1, 0, 0, 0, 0, 0, 1, 0, 1, 0, 0, 1}; {1, 1, 0, 0, 0, 0, 1, 1, 0, 1, 0, 1, 1, 1, 0, 1, 1, 0}; {1, 0, 0, 0, 0, 0, 1, 0, 1, 1, 1, 1, 0, 0, 1, 1, 1, 0, 1}; {1, 0, 0, 1, 0, 1, 1, 0, 0, 0, 1, 0, 1, 1, 1, 1, 0}; {1, 0, 0, 1, 0, 0, 0, 1, 0, 0, 0, 1}; {1, 0, 0, 1, 0, 1, 1, 0, 1, 1, 1, 1, 1, 0, 1, 1, 1, 0, 0, 0, 1, 0, 1}; {1, 1, 0, 0, 0, 0, 1, 1, 1, 0, 1, 0, 1, 1, 1, 0, 1, 1, 0, 1, 1, 1, 1, 0}; {1, 0, 0, 1, 0, 0, 0, 1, 0, 1, 1, 1, 1, 1, 0, 0, 1, 1, 1, 0, 1}; {1, 0, 0, 1, 0, 1, 1, 0, 0, 0, 1, 0, 1, 1, 0, 0, 0, 0, 0}; {1, 0, 0, 1, 1, 0, 1, 0, 0, 0, 0, 1, 0, 1, 0, 1, 1, 1, 1, 0, 1}; {1, 1, 0, 0, 1, 0, 0, 1, 0, 1, 0, 1, 1, 1, 0, 1, 1, 1, 1, 0, 0, 1, 1, 1}; {1, 0, 0, 1, 0, 0, 0, 0, 1, 0, 1, 0, 0, 1, 1, 1, 1, 1, 0, 0, 0, 1}; {1, 1, 0, 0, 0, 0, 1, 1, 0, 0, 0, 0, 1, 0, 1, 0, 0, 0}; {1, 0, 0, 1, 0, 1, 1, 0, 1, 0, 0, 0, 0, 0, 1, 0, 0, 0, 1}; {1, 0, 0, 1, 0, 1, 1, 1, 0, 1, 0, 1, 1, 0, 0, 0, 1, 1, 0, 1, 0}; {1, 1, 0, 0, 0, 1, 0, 1, 1, 1, 1, 1, 1}; {1, 1, 0, 0, 1, 0, 0, 1, 1, 1, 1, 1, 0, 1, 1, 1, 1, 0, 0, 1, 0, 1, 0, 1}; {1, 1, 0, 0, 0, 0, 1, 0, 0, 0, 0, 0, 1, 1, 0, 1, 1, 0, 0, 0, 1, 0, 1, 0}; {1, 0, 0, 1, 0, 1, 0, 0, 0, 1, 0, 1, 1, 0, 0, 0, 0, 0, 0, 1, 0, 0, 1, 1}; {1, 0, 0, 1, 0, 0, 0, 0, 0, 1, 0, 1, 0, 0, 0, 1, 1, 0, 0, 1, 0, 1, 1, 1, 1}; {1, 0, 0, 1, 1, 1, 0, 0, 0, 1, 0, 1, 1, 0, 0, 0, 0, 1, 0, 0, 0, 0}; {1, 0, 0, 1, 0, 1, 1, 1, 0, 1, 0, 0, 0, 1, 1, 0, 1, 1, 1, 1, 0, 1, 1, 1}; {1, 0, 0, 1, 1, 0, 0, 0, 1, 0, 1, 0, 0, 0, 0, 1, 0, 0, 1, 1, 1, 1, 0}; {1, 0, 0, 1, 0, 0, 0, 0, 1, 0, 0, 1, 1, 1, 1, 0, 0, 0, 0, 1, 0, 0, 0, 1, 0}; {1, 1, 0, 0, 0, 0, 1, 1, 0, 1, 1, 1, 0, 1, 1, 0, 1, 0, 1, 1, 1, 0, 1, 1}; {1, 1, 0, 0, 1, 0, 1, 0, 0, 0, 0, 0, 0, 1, 1, 1, 0, 1, 1, 1, 0, 0, 1, 0}; {1, 0, 0, 1, 0, 0, 0, 1, 0, 0, 0, 1, 0, 1, 0, 1, 1, 1, 1, 0, 1, 1, 0, 1, 1}; {1, 1, 0, 0, 0, 1, 0, 0, 0, 1, 0, 0, 0, 1, 0}; {1, 0, 0, 1, 0, 0, 0, 0, 1, 0, 1, 1, 1, 0, 0, 1, 1, 1, 1, 1, 0, 0, 1, 0}; {1, 0, 0, 1, 0, 1, 0, 1, 1, 1, 1, 1, 0, 0, 0, 0, 1, 1, 0, 1, 0}; {1, 1, 0, 0, 0, 1, 0, 1, 1, 1, 1, 0, 0, 1, 1, 1, 1, 0, 1, 1, 0}; {1, 0, 0, 1, 0, 1, 0, 1, 1, 1, 1, 0, 0, 0, 0, 1, 1, 0, 1}; {1, 1, 0, 0, 0, 1, 0, 0, 1, 0, 1, 1, 1, 1, 1, 0, 1, 0, 1, 1, 0, 1, 1, 0}; {1, 0, 0, 1, 0, 1, 0, 0, 0, 1, 1, 0, 0, 0, 0, 0, 0, 1, 0, 1, 1, 1, 1, 0}; {1, 1, 0, 0, 1, 1, 1, 1, 0, 1, 0, 1, 0, 0, 0, 1, 1, 0, 1, 1, 0, 1, 1}; {1, 0, 0, 1, 0, 0, 0, 0, 0, 0, 1, 1, 1, 0, 0, 1, 1, 0, 1, 0, 0, 0, 1, 0}; {1, 0, 0, 1, 0, 0, 0, 0, 0, 1, 1, 1, 0, 1, 0, 1, 1, 0, 1, 0, 0, 0, 0, 1}; {1, 0, 0, 1, 0, 1, 0, 0, 0, 1, 0, 1, 1, 0, 0, 1, 1, 1, 0, 0, 0, 0, 0, 0}; {1, 0, 0, 1, 0, 1, 0, 0, 0, 1, 1, 1, 1, 1, 0, 1, 1, 0, 0, 1, 1, 1, 1, 0}; {1, 0, 0, 1, 0, 1, 1, 1, 0, 1, 0, 0, 0, 0, 0, 0, 1, 1, 0, 0, 0, 1, 1, 0}; {1, 0, 0, 0, 0, 1, 0, 0, 0, 0, 1, 0, 0, 0, 1, 0}; {1, 0, 0, 1, 0, 1, 1, 1, 0, 1, 0, 0, 1, 1, 1, 0, 0, 1, 1}; {1, 0, 0, 1, 0, 1, 0, 0, 1, 1, 1, 0, 0, 1, 1, 0, 0, 0, 1, 1, 1, 1, 1, 0, 0, 1}; {1, 0, 0, 1, 0, 1, 1, 1, 1, 1, 1, 1, 0, 0, 0, 1, 1, 0, 1, 0, 1, 0, 0, 1}.

The sequence set 10 includes some or all of the following 30 sequences. When time domain filtering is performed on sequences {x$_n$} corresponding to these sequences and equivalent sequences of these sequences obtained after π/2 BPSK modulation, and a filtering coefficient is [0.1, 1, 0.1], a PAPR is less than 3.19 dB; when a filtering coefficient is [0.16, 1, 0.16], a PAPR is less than 2.59 dB; when a filtering coefficient is [0.22, 1, 0.22], a PAPR is less than 1.95 dB; or when a filtering coefficient is [0.28, 1, 0.28], a PAPR is less than 1.40 dB. In addition, when a first maximum normalized power of a frequency domain sequence corresponding to {x$_n$} is less than 1 dB, a first minimum normalized power is greater than −1 dB, in other words, frequency domain flatness of the corresponding sequence {x$_n$} is relatively good, and a cross-correlation coefficient between the sequences {x$_n$} corresponding to these sequences is less than 0.57:

{0, 0, 0, 0, 0, 0, 1, 1, 0, 1, 0, 1, 1, 1, 1, 1, 0, 0, 1, 1, 0, 1, 0, 1, 1, 0, 0, 0, 1, 0, 0, 0, 1, 0, 1, 1}; {0, 0, 0, 0, 0, 1, 0, 1, 0, 1, 1, 0, 1, 1, 1, 1, 0, 0, 1, 0, 1, 1, 1, 0, 0, 1, 1, 1, 1, 0, 1, 1, 1, 1, 0, 0, 0, 1, 0, 0, 1, 1}; {0, 1, 0, 1, 0, 0, 1, 1, 0, 0, 0, 1, 0, 0, 1, 0, 1, 1, 1, 0, 1, 1, 1, 1, 0, 0, 1, 0, 1, 1, 1, 0, 0, 0, 0, 0}; {0, 1, 0, 1, 0, 0, 0, 0, 0, 1, 1, 0, 1, 0, 1, 0, 0, 0, 1, 1, 1, 1, 0, 0, 1, 1, 1, 0, 1, 1, 0, 0, 0, 0, 0, 1, 1, 0}; {0, 1, 0, 0, 0, 0, 0, 1, 0, 1, 1, 1, 0, 1, 0, 0, 1, 1, 1, 1, 1, 0, 1, 1, 0, 0, 1, 1, 0, 1, 1, 0, 0}; {0, 0, 0, 1, 0, 1, 1, 1, 0, 1, 1, 1, 0, 0, 1, 0, 1, 1, 1, 1, 1, 1, 0, 0, 0, 1, 0, 0, 0, 0, 0}; {0, 0, 0, 0, 1, 1, 0, 1, 1, 1, 1, 1, 0, 0, 0, 0, 1, 0, 1, 0, 0, 0, 1, 0, 1, 0}; {0, 0, 0, 1, 0, 0, 0, 1, 0, 1, 0, 1, 1, 0, 0, 1, 1, 0, 0, 0, 0, 1, 1, 1, 1, 1, 0, 0, 1, 0, 0}; {0, 0, 0, 0, 1, 1, 1, 1, 1, 0, 0, 1, 0, 0, 1, 1, 0, 1, 1, 1, 0, 0, 0, 1, 0, 0, 0, 0, 1, 1, 0, 1}; {0, 0, 0, 0, 0, 0, 0, 1, 1, 1, 0, 1, 1, 1, 1, 0, 1, 1, 0, 0, 0, 1, 1, 0, 1, 0, 1, 0, 0, 1, 0, 0, 1, 0, 1, 1, 0, 1, 0, 0, 0, 1, 1, 1, 0, 0, 0, 1, 0, 1, 1, 0, 1, 0, 1, 0, 0, 0, 0, 1, 0, 0, 0, 0, 1, 0, 0, 0, 0, 0, 1, 0, 0, 0}; {0, 0, 0, 1, 0, 1, 1, 1, 1, 0, 1, 0, 0, 0, 0, 1, 1, 1, 0, 1, 0, 0, 0, 0, 1, 0, 0, 1, 1, 1, 0, 1, 1, 1, 1, 1, 1, 0, 1, 1, 1, 1, 0, 0, 1, 1}; {0, 0, 0, 0, 0, 1, 1, 1, 1, 1, 0, 0, 0, 0, 1, 0, 1, 1, 0, 1, 1, 0, 0, 0, 1, 0, 0, 1, 1, 1, 0, 0, 0, 1, 0, 1, 1, 1, 1, 1, 0, 1, 1, 0, 1, 0, 1, 1, 0, 0, 0, 1, 0, 0, 1, 0, 1, 1, 1, 0, 1, 1, 0, 0, 0, 0, 0, 1, 0, 0, 1, 1, 1, 1, 0, 0}; {0, 0, 0, 0, 1, 1, 0, 0, 0, 1, 1, 0, 0, 1, 0, 1, 1, 0, 1, 1, 1, 1, 0, 1, 0, 1, 1, 1, 1, 1, 1, 0, 0, 0, 1, 0, 0, 0, 1, 1, 0, 1, 1, 0, 0, 1, 0, 1, 1, 0, 1, 0, 1, 1, 0, 0, 0, 0, 1, 1, 0, 0, 1, 1, 1, 1, 0, 0, 1, 0, 0, 1, 1, 0, 0, 1, 0, 1, 1, 0, 1, 0, 0, 1, 0}; {0, 0, 0, 0, 1, 1, 1, 1, 0, 0, 1, 1, 1, 1, 1, 0, 1, 1, 0, 1, 1}.

The sequence 11 includes some or all of the following 30 sequences. When time domain filtering is performed on sequences {x$_n$} corresponding to these sequences and equivalent sequences of these sequences obtained after π/2 BPSK modulation, and a filtering coefficient is [0.28, 1, 0.28], a PAPR is less than 1.40 dB. In addition, when a first maximum normalized power of a frequency domain sequence corresponding to {x$_n$} is less than 1 dB, a first minimum normalized power is greater than −1 dB, in other words, frequency domain flatness of the corresponding sequence {x$_n$} is relatively good, and a cross-correlation coefficient between the sequences {x$_n$} corresponding to these sequences is less than 0.557:

{0, 0, 0, 0, 0, 0, 1, 1, 0, 1, 0, 1, 1, 1, 1, 1, 0, 0, 1, 1, 0, 1, 0, 1, 1, 0, 0, 0, 1, 0, 0, 0, 1, 0, 1, 1}; {0, 0, 0, 0, 0, 1, 0, 1, 0, 1, 1, 0, 1, 1, 1, 1, 0, 0, 1, 0, 1, 1, 1, 0, 0, 1, 1, 1, 1, 0, 1, 1, 0, 0, 0, 0, 1, 0, 0, 1, 1}; {0, 1, 0, 1, 0, 0, 1, 1, 0, 0, 0, 1, 0, 0, 0, 1, 0, 1, 1, 1, 0, 1, 1, 1, 1, 0, 0, 0, 0, 0}; {0, 1, 0, 1, 0, 0, 0, 0, 0, 1, 1, 0, 1, 0, 0, 0, 0, 1, 1, 1, 1, 0, 1, 1, 1, 0}; {0, 1, 0, 0, 0, 0, 0, 1, 1, 1, 0, 0, 0, 1, 1, 0, 1, 0, 0, 0, 0, 1, 0, 1, 1, 1, 0, 1, 1, 1, 0, 0, 0, 0, 0, 0}; {0, 0, 0, 1, 0, 1, 1, 1, 1, 0, 0, 0, 0, 1, 0, 1, 0, 0, 0, 1, 1, 1, 1, 0, 0, 0, 0, 0, 0, 1, 0, 0, 0, 0, 1}; {0, 0, 0, 1, 0, 1, 1, 1, 0, 1, 1, 0, 0, 0, 0, 1, 1, 0, 1, 0, 1, 0, 1, 1, 1, 1, 1, 1, 0, 0, 1, 0, 1, 0, 0, 0}; {0, 0, 0, 1, 0, 1, 1, 1, 0, 1, 1, 0, 0, 0, 0, 1, 1, 0, 0, 1, 0, 1, 0, 0, 0, 0, 0, 0, 1, 0, 1, 1, 0, 0, 1, 1, 1, 1}; {0, 0, 0, 0, 0, 0, 1, 1, 1, 1, 1, 0, 0, 1, 1, 0, 1, 0, 0, 0, 1, 0, 0, 1, 0, 1, 0, 1, 0, 1, 0, 1, 0, 0, 0, 0, 1, 1, 0, 0, 0, 1}; {0, 0, 0, 1, 0, 1, 0, 1, 0, 0, 0, 1, 1, 0, 0, 0, 1, 1, 1, 1, 0, 1, 1, 0, 0, 0, 1}; {0, 1, 0, 1, 0, 1, 1, 0, 1, 0, 1, 1, 0, 0, 0, 1, 1, 1, 1, 1, 1, 0, 1}; {0, 1, 0, 1, 0, 1, 1, 0, 1, 0, 1, 1, 0, 0, 0, 1, 1, 1, 1, 0, 0, 0, 1, 1, 1, 1, 1, 1, 0, 1, 1, 0, 0, 1, 0, 0}; {0, 0, 0, 0, 1, 1, 0, 0, 1, 0, 1, 0, 1, 0, 1, 0, 1, 0, 0, 0, 0, 1, 1, 1, 0, 1, 1, 1, 1, 1, 1, 1}; {0, 0, 0, 0, 0, 0, 1, 0, 0, 0, 1, 1, 1, 0, 1, 0, 1, 0, 0, 1, 0, 1, 0, 0, 0, 1, 0, 1, 1, 0, 0, 0, 1, 1, 1, 1}; {0, 0, 0, 0, 1, 0, 1, 1, 1, 0, 0, 1, 1, 0, 1, 1, 1, 0, 0, 1, 1, 1, 1, 0, 1, 0, 0, 1, 0, 0, 1, 1, 1, 0, 0, 1, 0, 1, 1, 1, 1, 1, 1, 1, 0, 1, 1, 1, 1, 1, 0, 1, 0, 1, 1, 1, 0, 1, 0, 1, 1, 0, 1, 0, 0, 1, 1, 1, 1, 1, 0, 0, 1, 0, 1, 0, 1, 0, 0, 1, 1, 0, 1, 1, 1, 1, 0, 1, 1, 0, 0, 1, 1, 1, 1, 1, 0, 1, 1, 0, 0, 1, 1, 1, 1, 1, 0, 1, 0, 0, 1, 0, 1, 1, 1}.

1, 1, 1, 0, 1, 1, 1, 1, 0, 0, 1, 0, 1, 1, 1, 0, 1, 1, 0, 1, 1, 1}; {0, 0, 0, 0, 1, 1, 1, 1, 0, 0, 1, 1, 0, 1, 0, 1, 1, 1, 0, 1, 1, 0, 0, 1, 1, 1, 1, 1, 1, 0, 1, 0, 1, 0, 0, 1}; {0, 1, 0, 1, 0, 1, 1, 1, 1, 1, 1, 0, 0, 0, 1, 0, 1, 1, 0, 1, 0, 0, 1, 1, 0, 0, 0, 0, 0, 1, 0, 0, 0, 1, 1, 0}; {0, 0, 0, 1, 0, 1, 0, 0, 1, 1, 0, 1, 1, 0, 1, 1, 1, 1, 1, 0, 1, 0, 0, 0, 1, 1, 1, 1, 1, 0, 0, 1, 1, 1, 0, 0, 0, 1}; {0, 0, 0, 0, 0, 1, 1, 1, 0, 0, 0, 1, 0, 1, 0, 1, 1, 1, 1, 0, 1, 0, 1, 0, 0, 0, 1, 1, 0, 1, 1, 0, 0, 0, 0, 1}; {0, 0, 0, 1, 0, 0, 1, 1, 1, 0, 0, 1, 1, 1, 1, 0, 0, 0, 1, 0, 1, 1, 1, 1, 1, 1, 0, 1, 1, 0, 1, 1, 0, 1, 0, 1}; {0, 0, 0, 0, 0, 0, 1, 0, 0, 0, 1, 1, 0, 1, 1, 0, 0, 1, 0, 1, 1, 0, 1, 1, 1, 1, 0, 1, 0, 1, 0, 0, 0, 0, 1, 1, 1}; {0, 0, 0, 0, 1, 0, 0, 0, 1, 1, 1, 1, 1, 0, 1, 1, 0, 1, 0, 1, 1, 0, 1, 1, 1, 0, 1, 1, 1, 0, 1, 0, 0, 0, 0, 1, 1, 1}; {0, 1, 0, 1, 0, 0, 0, 1, 1, 1, 1, 1, 0, 0, 0, 1, 0, 0, 0, 0, 1, 0, 0, 0, 0, 1, 0, 0, 1, 0, 0, 1, 0, 1, 1, 1, 1, 0}; {0, 1, 0, 0, 0, 0, 0, 1, 1, 0, 0, 1, 1, 1, 1, 0, 1, 0, 0, 0, 0, 0, 1, 1, 0, 1, 1, 0, 0, 1, 0, 1, 0, 1, 0, 0, 0, 0}; {0, 0, 0, 0, 0, 0, 1, 1, 0, 0, 0, 0, 1, 0, 1, 1, 1, 0, 1, 1, 1, 0, 0, 0, 0, 1, 0, 0, 0, 1, 1, 0, 1, 0, 0, 1, 0, 1}; {0, 0, 0, 1, 0, 0, 0, 1, 0, 1, 1, 1, 0, 0, 1, 1, 1, 1, 1, 1, 1, 0, 1, 0, 1, 1, 0, 1, 0, 0, 1, 1, 0, 1, 1, 1, 1}; {0, 0, 0, 1, 0, 0, 0, 1, 1, 1, 1, 1, 1, 0, 1, 1, 0, 1, 0, 1, 1, 1, 1, 0, 0, 0, 1, 1, 0, 1, 1, 0, 0, 1, 0, 1}.

The sequence set 12 includes some or all of the following 59 sequences. When time domain filtering is performed on sequences $\{x_n\}$ corresponding to these sequences and equivalent sequences of these sequences obtained after π/2 BPSK modulation, and a filtering coefficient is [0.1, 1, 0.1], a PAPR is less than 3.19 dB; when a filtering coefficient is [0.16, 1, 0.16], a PAPR is less than 2.59 dB; when a filtering coefficient is [0.22, 1, 0.22], a PAPR is less than 1.95 dB; or when a filtering coefficient is [0.28, 1, 0.28], a PAPR is less than 1.40 dB. In addition, when a first maximum normalized power of a frequency domain sequence corresponding to $\{x_n\}$ is less than 1 dB, a first minimum normalized power is greater than −1 dB, in other words, frequency domain flatness of the corresponding sequence $\{x_n\}$ is relatively good, and a cross-correlation coefficient between the sequences $\{x_n\}$ corresponding to these sequences is less than 0.7:

{0, 0, 0, 0, 0, 0, 1, 0, 1, 0, 1, 1, 1, 1, 1, 0, 0, 1, 1, 0, 1, 0, 1, 1, 0, 0, 0, 1, 0, 0, 0, 1, 0, 1, 1}; {0, 0, 0, 0, 0, 1, 0, 1, 0, 1, 1, 0, 1, 1, 1, 1, 0, 0, 1, 0, 1, 1, 1, 0, 1, 1, 1, 1, 0, 0, 0, 1, 0, 0, 1, 1}; {0, 1, 0, 1, 0, 0, 0, 0, 0, 1, 1, 1, 0, 1, 0, 0, 1, 1, 1, 1, 0, 1, 1, 1, 0, 1, 0, 0, 1, 0, 0, 0, 1, 1, 0}; {0, 1, 0, 1, 0, 0, 1, 1, 0, 0, 0, 1, 0, 0, 1, 0, 1, 1, 1, 0, 1, 1, 1, 1, 0, 0, 1, 0, 1, 1, 1, 0, 0, 0, 0, 0}; {0, 0, 0, 0, 1, 0, 0, 0, 0, 1, 0, 1, 1, 1, 1, 0, 0, 0, 0, 1, 0, 0, 1, 0, 1}; {0, 1, 0, 0, 0, 0, 1, 0, 1, 1, 0, 1, 0, 1, 0, 1, 0, 0, 1, 1, 1, 1, 0, 1, 0, 1, 0, 1, 1, 0, 0, 0, 0, 0, 1, 0, 1, 1, 0, 0}; {0, 0, 0, 0, 0, 1, 0, 1, 1, 1, 1, 0, 1, 1, 1, 1, 0, 0, 1, 0, 1, 0, 0, 0, 1}; {0, 0, 0, 1, 0, 1, 1, 1, 1, 0, 1, 1, 1, 1, 0, 0, 1, 0, 1, 1, 1, 1, 0, 0, 1, 0, 1, 0, 0, 0, 1, 1, 0, 0, 1}; {0, 1, 0, 1, 0, 0, 0, 1, 0, 1, 1, 0, 1, 1, 0, 1, 1, 0, 1, 1, 0, 0, 0, 0, 1, 0, 0, 1}; {0, 0, 0, 0, 0, 0, 1, 1, 1, 0, 0, 1, 0, 1, 0, 0, 0, 1, 1, 0, 0, 1, 1, 0, 1}; {0, 0, 0, 0, 0, 1, 1, 1, 0, 0, 1, 0, 1, 0, 0, 1, 1, 0, 0, 1, 1, 1, 0, 0, 0, 1, 0, 0, 0, 1, 0, 0, 0, 1}; {0, 1, 0, 1, 1, 1, 1, 0, 0, 0, 0, 0, 1, 0, 0, 0, 1, 1, 0, 1, 0, 1, 0, 1, 1, 1, 0, 1, 1, 1, 0}; {0, 1, 0, 1, 0, 1, 0, 1, 0, 1, 1, 1, 1, 1, 1, 1, 1, 1, 1, 1, 0, 0, 0, 0, 1, 0}.

1, 0, 1, 0, 1, 1, 1, 1, 1, 0, 0, 0, 1, 0, 1, 1, 0, 1, 0, 0, 1, 1, 0, 0, 0, 0, 0, 1, 0, 0, 0, 1, 1, 0}; {0, 0, 0, 0, 1, 0, 0, 0, 1, 0, 1, 0, 1, 1, 1, 1, 1, 1, 0, 0, 1, 1, 0, 1, 1, 1, 0, 1, 0, 1, 1, 0, 0, 1, 1, 1, 1}; {0, 1, 0, 1, 0, 1, 1, 0, 0, 1, 1, 1, 0, 1, 1, 1, 1, 1, 0, 0, 0, 1, 1, 1, 0, 0, 1, 0, 1, 1, 1, 0, 0, 0, 0, 0}; {0, 0, 0, 0, 0, 0, 0, 1, 0, 1, 1, 0, 0, 0, 0, 1, 1, 0, 1, 0, 1, 0, 1, 0, 1, 1, 1, 0, 1, 0, 0, 1, 1, 0, 1}; {0, 0, 0, 1, 1, 1, 0, 1, 0, 0, 1, 1, 1, 1, 1, 1, 1, 1, 0, 1}; {0, 1, 0, 0, 0, 0, 1, 0, 1, 0, 1, 0, 1, 1, 1, 1, 0, 0, 0, 0, 1, 0}; {0, 0, 0, 0, 1, 0, 0, 1, 0, 1, 1, 0, 1, 1, 1, 0, 0, 0, 1, 0, 1, 1, 1, 0, 0}; {0, 0, 0, 0, 1, 1, 0, 0, 0, 1, 0, 1, 1, 0, 1, 0, 0, 0, 1, 1, 0, 1}; {0, 0, 0, 0, 1, 0, 1, 0, 0, 1, 0, 1, 1, 1, 1, 1, 1, 1, 0, 1, 0, 1, 1, 0, 0, 0, 0, 1, 0, 0, 0, 1, 1}; {0, 0, 0, 0, 0, 1, 1, 1, 1, 0, 1, 1, 1, 1, 0, 0, 1, 1, 0, 0, 0, 1, 0, 1, 0, 0, 1, 1, 1}; {0, 0, 0, 0, 1, 1, 1, 1, 1, 0, 1, 1, 0, 0, 0, 1, 0, 1, 1, 1, 0}.

The sequence 13 includes some or all of the following 60 sequences. When time domain filtering is performed on sequences {$x_n$} corresponding to these sequences and equivalent sequences of these sequences obtained after π/2 BPSK modulation, and a filtering coefficient is [0.28, 1, 0.28], a PAPR is less than 1.40 dB. In addition, when a first maximum normalized power of a frequency domain sequence corresponding to {$x_n$} is less than 1 dB, a first minimum normalized power is greater than −1 dB, in other words, frequency domain flatness of the corresponding sequence {$x_n$} is relatively good, and a cross-correlation coefficient between the sequences {$x_n$} corresponding to these sequences is less than 0.65:

{0, 0, 0, 0, 0, 0, 1, 1, 0, 1, 0, 1, 1, 1, 1, 1, 0, 0, 1, 1, 0, 1, 0, 1, 1, 0, 0, 0, 1, 0, 0, 0, 1, 0, 1, 1}; {0, 0, 0, 0, 0, 1, 0, 1, 0, 1, 1, 0, 1, 1, 1, 1, 0, 0, 1, 0, 1, 1, 1, 0, 1, 1, 1, 1, 0, 0, 0, 1, 0, 0, 1, 1}; {0, 1, 0, 1, 0, 0, 1, 1, 0, 0, 0, 1, 0, 0, 1, 0, 1, 1, 1, 0, 1, 1, 1, 1, 0, 0, 1, 0, 1, 1, 1, 0, 0, 0, 0, 0}; {0, 1, 0, 1, 0, 0, 0, 0, 0, 1, 1, 0, 1, 0, 1, 0, 0, 1, 1, 1, 1, 0, 1, 1, 1, 0, 1, 1, 0, 0, 0, 0, 0, 1, 1, 0}; {0, 1, 0, 0, 0, 0, 1, 0, 1, 1, 1, 0, 1, 0, 0, 1, 1, 1, 1, 0, 1, 0, 0, 1, 0, 0, 1, 0, 0, 1, 0, 0, 0, 0}; {0, 0, 0, 0, 0, 1, 0, 1, 1, 1, 0, 0, 0, 1, 1, 1, 0, 1, 1, 0, 1, 1, 0, 0, 0, 1, 0, 0, 1, 0, 1, 0, 0, 0, 1}; {0, 0, 0, 1, 0, 1, 1, 1, 1, 0, 1, 1, 1, 1, 0, 0, 1, 0, 1, 1, 1, 1, 1, 1, 0, 0, 1, 0, 1, 0, 0, 0, 1, 1, 0, 0, 1}; {0, 0, 0, 1, 1, 1, 0, 0, 1, 1, 1, 0, 0, 0, 1, 0, 0, 0, 1}; {0, 0, 0, 1, 0, 0, 0, 1, 0, 0, 0, 1, 0, 0, 1, 1, 1, 0, 0, 0, 1, 0, 0, 0, 1, 0, 1, 0, 0, 1, 0, 1, 1, 1, 1}; {0, 0, 0, 0, 1, 0, 1, 1, 0, 1, 0, 1, 1, 1, 0, 1, 1, 1, 1, 1}; {0, 0, 0, 0, 0, 1, 0, 0, 0, 1, 0, 1, 0, 1, 1, 0, 1, 1, 0, 0, 0, 0, 1, 1, 0, 0, 1, 0, 1, 0, 0, 1, 1, 1}; {0, 0, 0, 0, 0, 1, 1, 0, 0, 1, 0, 1, 0, 0, 1, 1, 1, 0, 0, 1, 1, 0, 0, 0, 0, 1, 1, 0, 1, 1, 0, 1, 0, 0, 0, 0, 1}; {0, 0, 0, 0, 1, 0, 1, 1, 0, 1, 0, 1, 0, 0, 0, 1, 0, 0, 1, 1, 1, 1, 0, 0, 1}; {0, 0, 0, 0, 1, 1, 0, 1, 1, 1, 0, 1, 1, 1, 1, 1, 0, 0, 0, 1, 0, 1, 0, 1}; {0, 0, 0, 0, 1, 1, 0, 1, 1, 1, 1, 0, 0, 1, 0, 0, 0, 1, 1, 1, 0}; {0, 1, 0, 1, 1, 1, 1, 0, 0, 0, 0, 0, 1, 0, 0, 0, 1, 1, 0, 1, 0, 0, 1, 1, 0, 1, 0, 0, 1, 1, 0, 1, 0, 0, 0, 1}; {0, 1, 0, 1, 1, 0, 1, 0, 0, 1, 1, 0, 1, 0, 0, 1, 1, 0, 1, 0, 1, 1, 1, 1, 1, 0, 0, 0, 0, 1, 0, 1, 1, 0, 0, 0, 0}; {0, 0, 0, 0, 0, 0, 0, 1, 1, 0, 0, 1, 0, 1, 1, 1, 0, 1, 1, 1, 1, 0, 0, 1, 0, 0, 1, 0, 1, 0, 1, 0, 0, 1, 1}; {0, 0, 0, 0, 0, 0, 1, 0, 1, 1, 1, 0, 0, 1, 1, 1, 0, 1, 1, 1, 0, 1, 1, 1, 0, 0, 0, 0, 1, 0, 1, 1, 0, 0, 1, 0}; {0, 0, 0, 0, 1, 0, 1, 1, 1, 1, 1, 0, 0, 1, 1, 1, 0, 1, 1, 1, 0}; {0, 0, 0, 0, 0, 1, 0, 0, 0, 1, 0, 1, 1, 0, 0, 1, 0, 1, 1, 1, 0, 0, 0, 1, 0, 0, 1, 1, 1, 0, 0, 1, 1, 1, 0}; {0, 0, 0, 0, 0, 1, 0, 0, 0, 1, 1, 1, 0, 1, 1, 1, 0, 1, 1, 0, 0, 0, 1}; {0, 1, 0, 1, 1, 1, 0, 0, 0, 0, 0, 1, 0, 0, 0, 1, 1, 1, 0, 1, 0, 1, 0, 1, 1, 1, 1, 1, 0, 1, 0, 0, 0, 1, 0, 1, 1}; {0, 0, 0, 0, 0, 0, 0, 1, 1, 1, 0, 1, 1, 0, 0, 1, 0, 1, 1, 1, 0, 1, 1, 1, 1, 0, 1, 1, 1, 0, 0, 0, 1, 0, 1, 1, 0}; {0, 0, 0, 0, 0, 1, 0, 0, 0, 1, 0, 1, 1, 0, 0, 1, 1, 0, 0, 1, 1, 0, 1, 0, 0, 1, 1, 0, 0, 0, 1, 0, 1, 0, 0, 1, 0, 1, 1, 0, 1, 0, 1, 1, 0, 1, 1, 1, 1, 0, 1, 0, 0, 0, 0, 1, 1, 1, 1}; {0, 0, 0, 0, 0, 1, 0, 0, 0, 0, 1, 0, 1, 1, 1, 1, 1, 0, 0, 1, 1, 1, 0, 0, 1, 1, 1, 0}; {0, 0, 0, 0, 1, 0, 0, 1, 1, 1, 0, 1, 0, 0, 0, 0, 1, 1, 0, 0, 1, 0, 1, 1, 1, 1, 0, 0, 1, 0, 1, 0, 0, 0, 1}; {0, 0, 0, 1, 0, 1, 1, 1, 0, 1, 0, 1, 0, 0, 0, 1, 1, 1, 1, 1, 1, 1}; {0, 0, 0, 0, 0, 0, 0, 1, 1, 0, 1, 0, 0, 0, 0, 0, 1, 0, 0, 0, 0, 1, 0, 0, 0, 0, 1, 0, 1, 0};

1, 0, 1, 1, 0, 1, 1, 0, 0, 1, 1, 1}; {0, 1, 0, 0, 0, 0, 0, 1, 1, 0, 0, 1, 1, 1, 1, 0, 1, 0, 0, 0, 0, 0, 1, 1, 0, 1, 1, 0, 0, 1, 0, 1, 0, 1, 0, 0, 0}; {0, 0, 0, 0, 0, 0, 0, 0, 1, 0, 1, 1, 1, 0, 0, 0, 0, 1, 0, 1, 1, 0, 0, 0, 1, 1, 0, 1, 0, 1, 1, 1, 0, 0, 1, 1, 0, 1}; {0, 0, 0, 0, 0, 0, 1, 1, 1, 1, 1, 0, 0, 1, 1, 0, 1, 0, 0, 1, 0, 0, 1, 0, 0, 1, 0, 1, 0, 0, 1, 0, 0, 0, 1}; {0, 0, 0, 1, 0, 0, 0, 1, 1, 0, 0, 0, 1, 1, 0, 0, 0, 1, 0, 1, 1, 1, 1, 1, 0, 1, 0, 0, 1, 1, 1, 1, 1, 1, 0, 1}; {0, 1, 0, 1, 0, 1, 1, 0, 1, 0, 1, 1, 0, 0, 0, 1, 1, 1, 1, 0, 0, 0, 1, 1, 1, 1, 0, 0, 0, 1, 1, 1}; {0, 1, 0, 1, 0, 1, 0, 1, 1, 1, 1, 0, 1, 1, 0, 1, 1, 1, 1, 0, 0, 1, 0, 0, 1, 1, 1, 1, 1, 0, 0, 1, 1, 0, 0, 0, 0}; {0, 0, 0, 0, 1, 1, 0, 1, 0, 0, 1, 1, 1, 0, 1, 1, 0, 1, 1, 1, 1, 1, 1, 1, 0, 1, 0, 0, 0, 1, 1, 1, 0, 1, 1}; {0, 0, 0, 0, 0, 0, 1, 0, 0, 1, 0, 0, 0, 1, 1, 1, 0, 1, 0, 0, 0, 1, 1, 1, 1, 0, 0, 1, 0, 0}; {0, 0, 1, 0, 0, 0, 1, 0, 1, 1, 1, 0, 0, 0, 1, 0, 1, 1, 0, 0, 1, 1, 1, 1, 0, 1, 0, 1, 1, 1, 1}; {0, 1, 0, 0, 0, 1, 0, 0, 0, 0, 0, 1, 1, 1, 1, 0, 1, 0, 0, 1, 1, 0, 1, 1, 0, 0, 1, 0, 0, 0, 0, 0, 1, 1, 0, 1, 1}; {0, 1, 0, 1, 1, 0, 1, 0, 0, 0, 1, 1, 0, 0, 0, 0, 1, 1, 1, 0, 1, 0, 1, 0, 0, 0, 1, 1, 0, 0, 0, 0, 0, 0}; {0, 0, 0, 0, 1, 1, 1, 1, 0, 1, 1, 0, 0, 1, 0, 1, 1, 0, 1, 1, 1, 1, 1, 1, 0, 0, 0, 1, 1, 0, 0, 0, 1, 0, 1, 0, 1}; {0, 0, 0, 1, 0, 0, 0, 1, 1, 1, 1, 1, 1, 1, 0, 1, 1, 1, 0, 1, 0, 1, 1, 1, 1, 0}; {0, 0, 1, 1, 0, 1, 1, 0, 0, 1, 0, 1, 0, 1, 0, 0, 0, 1, 0, 1}; {0, 1, 0, 0, 0, 1, 0, 0, 0, 1, 0, 0, 0, 0, 0, 1, 0, 1, 1, 0, 1, 1, 0, 0, 0, 0, 1, 1, 1, 0, 1, 0, 1, 0}; {0, 0, 0, 1, 0, 1, 0, 0, 0, 1, 0, 1, 1, 0, 1, 0, 1, 0, 1, 0, 0, 0, 0, 0, 1, 0, 1, 0, 1, 1, 1, 0, 0, 0, 1, 1, 1, 0, 1, 1, 0, 0, 1, 0, 1, 0, 0, 0, 1, 0, 1, 1, 0, 0, 0, 1, 1, 0, 1}; {0, 0, 0, 1, 1, 1, 0, 1, 1, 1, 0, 1, 1, 0, 0, 0, 1, 0, 1, 0, 1, 0, 1, 1, 1, 1, 1, 1, 1, 1, 0, 0, 0, 0, 1}; {0, 1, 0, 0, 0, 1, 1, 1, 1, 0, 0, 1, 0, 1, 0, 1, 0, 0, 1}; {0, 1, 0, 0, 0, 1, 1, 0, 1, 0, 0, 0, 1, 0, 0, 0, 1, 1, 0, 0}; {0, 0, 0, 0, 1, 1, 1, 0, 1, 1, 1, 0, 1, 0, 1, 0, 0, 0, 0, 1, 1, 0, 0, 1, 1, 0, 1, 1, 1, 0, 1, 0, 0, 0, 0}; {0, 0, 0, 0, 0, 1, 0, 1, 1, 1, 0, 1, 1, 0, 1, 1, 0, 1, 1, 0, 1, 0, 1, 1, 1, 0, 1, 1, 1, 0, 0, 0, 0, 1, 1, 1, 1, 0, 1, 0}; {0, 0, 0, 0, 0, 0, 1, 1, 1, 1, 0, 0, 1, 0, 0, 0, 0, 1, 0, 1, 0, 1, 1, 0, 1, 1}; {0, 0, 0, 0, 0, 1, 1, 0, 0, 0, 1, 1, 1, 0, 1, 1, 0, 1, 0, 1, 1, 0, 1, 0, 1, 1, 0, 1, 1, 1, 0, 1, 1, 1, 0, 0, 0, 1, 1, 1}; {0, 0, 0, 0, 0, 1, 1, 1, 1, 0, 0, 0, 1, 0, 0, 0, 0, 1, 1, 0, 1, 1, 0, 1, 1, 1, 0, 1, 1, 0, 1, 0, 1, 0, 1, 1, 0, 1, 1, 1}; {0, 0, 0, 0, 0, 0, 1, 1, 1, 1, 0, 0, 1, 1, 0, 1}; and/or when N=18, the fourth sequence set is a sequence set 18.

The sequence set 18 includes some or all of the following 30 sequences. When time domain filtering is performed on sequences {$x_n$} corresponding to these sequences and equivalent sequences of these sequences obtained after π/2 BPSK modulation, and a filtering coefficient is [0.1, 1, 0.1], a PAPR is less than 2.89 dB; when a filtering coefficient is [0.16, 1, 0.16], a PAPR is less than 2.35 dB; when a filtering coefficient is [0.22, 1, 0.22], a PAPR is less than 1.76 dB; or when a filtering coefficient is [0.28, 1, 0.28], a PAPR is less than 1.27 dB. In addition, when a second maximum normalized power of a frequency domain sequence corresponding to {$x_n$} is less than 0.5 dB, a second minimum normalized power is greater than −0.5 dB, and a cross-correlation coefficient between the sequences {$x_n$} corresponding to these sequences is less than 0.672:

{1, 0, 0, 0, 0, 0, 0, 0, 1, 1, 0, 1, 1, 0, 0, 1, 0, 1}; {1, 0, 0, 1, 1, 0, 1, 1, 0, 0, 0, 0, 0, 0, 1, 0, 1};

{1, 1, 0, 0, 1, 1, 1, 1, 0, 0, 0, 1, 0, 1, 0, 0, 1, 0}; {1, 0, 0, 1, 1, 1, 0, 1, 1, 1, 0, 1, 0, 1, 1, 1, 0, 0, 0, 0};

{1, 0, 0, 0, 0, 1, 1, 0, 1, 0, 1, 0, 0, 0, 1, 0, 0, 0}; {1, 0, 0, 0, 1, 0, 1, 0, 1, 1, 0, 0, 0, 0, 0, 1, 1, 1, 1};

{1, 0, 1, 1, 0, 1, 1, 1, 1, 0, 1, 0, 0, 0, 0, 0, 1, 0}; {1, 0, 1, 1, 1, 1, 1, 0, 1, 0, 0, 0, 0, 0, 1, 0, 0, 1, 0};

{1, 1, 0, 0, 0, 0, 0, 0, 0, 1, 1, 0, 1, 0, 1, 0, 0, 1}; {1, 0, 0, 0, 1, 1, 0, 1, 0, 1, 0, 0, 1, 1, 1, 0, 0, 0};

{1, 0, 0, 1, 1, 0, 0, 0, 1, 0, 1, 0, 0, 1, 0, 0, 0, 0}; {1, 0, 0, 0, 0, 0, 1, 0, 1, 0, 0, 0, 1, 1, 1, 0, 1, 0};

{1, 0, 0, 0, 0, 1, 0, 1, 0, 0, 0, 0, 0, 1, 0, 1, 1, 0}; {1, 1, 0, 1, 0, 1, 1, 1, 1, 0, 0, 1, 1, 1, 0, 1, 0, 0, 0};

{1, 0, 0, 1, 0, 1, 1, 1, 0, 1, 1, 1, 1, 1, 0, 1, 1, 0}; {1, 1, 0, 1, 0, 0, 1, 1, 0, 0, 1, 0, 0, 0, 0, 0, 1, 0};

{1, 0, 0, 0, 1, 0, 1, 0, 0, 1, 1, 1, 1, 1, 0, 1, 1, 0}; {1, 0, 1, 1, 1, 0, 0, 1, 1, 0, 1, 1, 1, 1, 1, 0, 0, 1};

{1, 0, 0, 0, 0, 1, 1, 1, 0, 0, 1, 0, 1, 1, 0, 1, 1, 1}; {1, 0, 0, 0, 0, 0, 0, 0, 1, 0, 1, 1, 1, 1, 0, 1, 0, 0, 0};

{1, 1, 0, 0, 0, 1, 0, 1, 1, 1, 1, 1, 0, 1, 0, 0, 0, 0}; {1, 0, 1, 1, 0, 1, 0, 1, 1, 1, 1, 0, 0, 1, 0, 0, 0, 0};

{1, 0, 0, 0, 0, 0, 1, 0, 1, 1, 1, 0, 1, 0, 1, 1, 1, 0}; {1, 1, 0, 0, 1, 1, 1, 0, 1, 0, 1, 1, 1, 0, 1, 0, 0, 0};

{1, 0, 0, 1, 0, 1, 0, 0, 0, 0, 0, 0, 1, 1, 1, 0, 1, 0}; {1, 0, 0, 0, 0, 1, 1, 1, 1, 1, 1, 0, 1, 0, 1, 1, 0, 0, 1};

{1, 1, 1, 0, 0, 1, 1, 1, 1, 0, 1, 0, 1, 1, 0, 1, 0, 0}; {1, 0, 0, 0, 1, 0, 1, 1, 0, 1, 0, 0, 0, 0, 1, 0, 0, 0, 0};

{1, 1, 1, 0, 1, 0, 1, 0, 0, 1, 0, 0, 0, 0, 1, 1, 1, 1}; {1, 0, 0, 0, 0, 0, 1, 1, 1, 1, 0, 1, 1, 1, 0, 1, 0, 0, 0}.

Generally, a sequence with a relatively small PAPR also has a relatively small CM value. It is verified that the foregoing sequences all have very small CM values.

Based on the sequence-based signal processing method disclosed in this embodiment of this application, an equivalent sequence of the sequence $\{s_n\}$ in each sequence set described above may be expressed as $\{q_n\}$. An element $q_n$ in the equivalent sequence $\{q_n\}$ satisfies: $q_n = s_{(n+M) \bmod N}$, where $M \in \{0, 1, 2, \ldots, N-1\}$, and N is a sequence length.

Figure 7A:
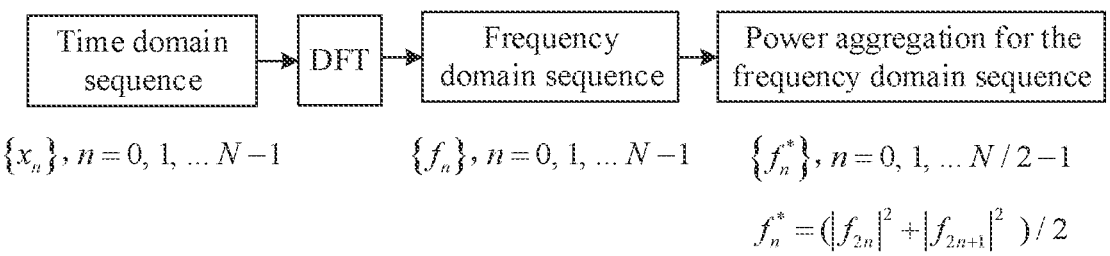
FIG. 7a and FIG. 7b are schematic flowcharts of determining whether a frequency domain of a time domain sequence is flat according to an embodiment of this application.
Figure 7B:
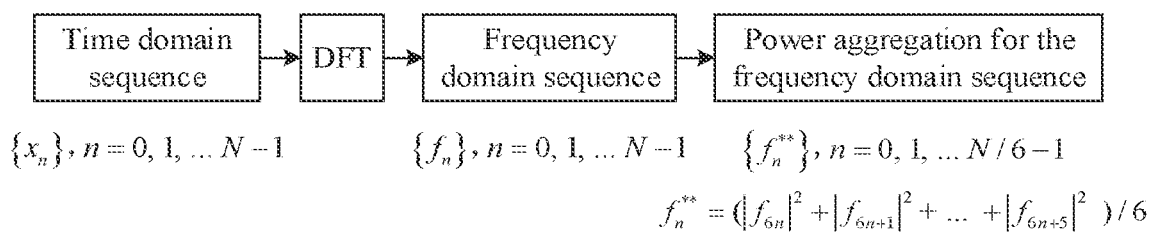

An equivalent sequence of the sequence $\{s_n\}$ herein is $\{q_n\}$. Therefore, a difference between the sequence $\{u \cdot (1-2 \cdot s_n)\}$ and the sequence $\{u \cdot (1-2 \cdot q_n)\}$ is a constant, or a constant and a cyclic shift transform. Whether a frequency domain of a time domain sequence is flat may be determined by using a procedure shown in FIG. 7a or FIG. 7b. As shown in FIG. 7a, a first maximum normalized power of a frequency domain sequence corresponding to the foregoing time domain sequence $\{x_n\}$ is defined as a maximum value after normalization of a sequence $\{f_n^*\}$, and a first minimum normalized power of the frequency domain sequence corresponding to the time domain sequence $\{x_n\}$ is defined as a minimum value after normalization of the sequence $\{f_n^*\}$. As shown in FIG. 7b, a second maximum normalized power of the frequency domain sequence corresponding to the foregoing time domain sequence $\{x_n\}$ is defined as a maximum value after normalization of a sequence $\{f_n^{}\}$, and a second minimum normalized power of the frequency domain sequence corresponding to the time domain sequence $\{x_n\}$ is defined as a minimum value after normalization of the sequence $\{f_n^{}\}$.

According to the sequence-based signal processing method disclosed in this embodiment of this application, a sequence used to send a signal on a PUSCH is determined. The sequence is a sequence $\{x_n\}$ including N elements, $x_n$ is an element in the sequence $\{x_n\}$, and the determined sequence $\{x_n\}$ is a sequence satisfying the preset condition. Then, the first signal is generated and sent. By using the determined sequence, when a signal is sent on the PUSCH, relatively good sequence frequency domain flatness can be maintained, and a relatively low PAPR value and a relatively low cross-correlation between sequences can be maintained, thereby satisfying a communications application environment in which a signal is sent on the PUSCH, especially an NR system scenario or an NR similar scenario.

According to the sequence-based signal processing method disclosed in the embodiments of this application, the embodiments of this application further disclose a sequence-based signal processing apparatus and a communications system.

Figure 8:
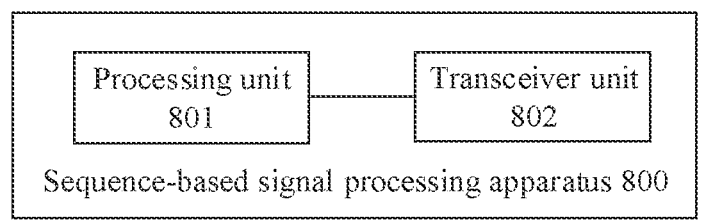
FIG. 8 is a schematic structural diagram of a terminal device according to an embodiment of this application.

FIG. 8 is a schematic structural diagram of a sequence-based signal processing apparatus 800 according to an embodiment of this application. The signal processing apparatus 800 may be a communications device, or may be a chip in a communications device. The signal processing apparatus 800 includes a processing unit 801 and a transceiver unit 802.

The processing unit 801 is configured to determine a sequence $\{x_n\}$ including N elements, where N is a positive integer greater than 1, $x_n$ is an element in the sequence $\{x_n\}$, and the sequence $\{x_n\}$ is a sequence satisfying a preset condition.

For the preset condition used in the processing unit 801, refer to the preset condition disclosed in the foregoing sequence-based signal processing method disclosed in the embodiments of this application. The preset conditions are consistent, and details are not described herein again.

The processing unit 801 is further configured to: perform DFT processing on the N elements in the sequence $\{x_n\}$, to obtain a sequence $\{f_n\}$; and map the sequence $\{f_n\}$ to N subcarriers, to generate a first signal.

The transceiver unit 802 is configured to send the first signal.

For a corresponding operation performed by the signal processing apparatus 800 disclosed in this embodiment of this application, refer to a corresponding operation performed in the foregoing sequence-based signal processing method disclosed in the embodiments of this application, and details are not described herein again.

With reference to the sequence-based signal processing method disclosed in the embodiments of this application, the signal processing apparatus disclosed in this embodiment of this application may also be directly implemented by hardware, a memory executed by a processor, or a combination thereof.

Figure 9:
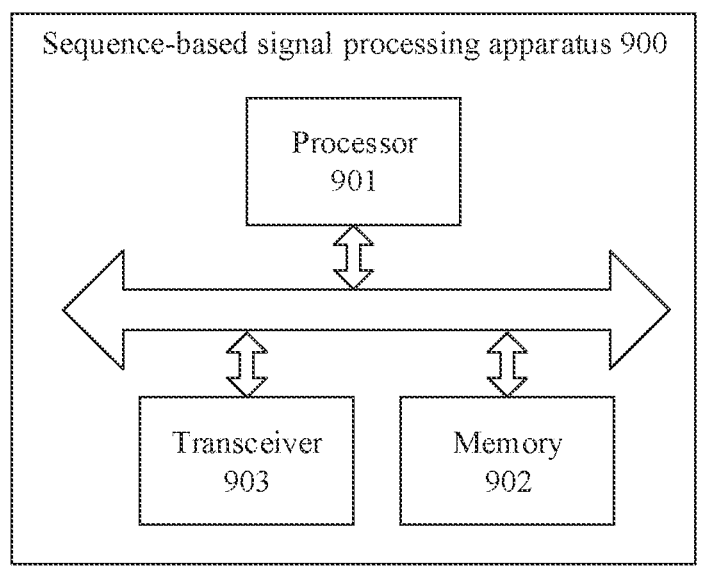
FIG. 9 is a schematic structural diagram of another terminal device according to an embodiment of this application.

As shown in FIG. 9, a signal processing apparatus 900 includes a processor 901 and a transceiver 903. Optionally, the signal processing apparatus 900 further includes a memory 902.

The processor 901 is coupled to the memory 902 by using a bus. The processor 901 is coupled to the transceiver 903 by using the bus.

The processor 901 may be specifically a central processing unit (central processing unit, CPU), a network processor (network processor, NP), an application-specific integrated circuit (application-specific integrated circuit, ASIC), or a programmable logic device (programmable logic device, PLD). The foregoing PLD may be a complex programmable logic device (complex programmable logic device, CPLD), a field-programmable gate array (field-programmable gate array, FPGA), or a generic array logic (generic array logic, GAL).

The memory 802 may be specifically a content-addressable memory (content-addressable memory, CAM) or a random-access memory (random-access memory, RAM). The CAM may be a ternary content addressable memory (ternary cam, TCAM).

When the signal processing apparatus 900 is a communications device, the transceiver 903 may be a radio frequency circuit. When the signal processing apparatus 900 is a chip in a terminal device, the transceiver 903 may be an input/output interface, a pin, a circuit, or the like on the chip.

Alternatively, the memory 902 may be integrated into the processor 901. If the memory 902 and the processor 901 are mutually independent components, the memory 902 is connected to the processor 901. For example, the memory 902 and the processor 901 may communicate with each other by using a bus. The transceiver 903 and the processor 901 may communicate with each other by using the bus, or the transceiver 903 may be directly connected to the processor 901.

The memory 902 is configured to store an operation program, code, or an instruction for sequence-based signal processing. Optionally, the memory 902 includes an operating system and an application program, and is configured to store an operation program, code, or an instruction for sequence-based signal processing.

When needing to perform an operation related to sequence-based signal processing, the processor 901 or a hardware device may invoke and execute the operation program, the code, or the instruction stored in the memory 902, to complete a sequence-based signal processing process performed by the terminal device in FIG. 1 to FIG. 6. For a specific process, refer to the foregoing corresponding part of the embodiments of this application. Details are not described herein again.

It may be understood that FIG. 9 shows merely a simplified design of the signal processing apparatus 900. In actual application, the signal processing apparatus 900 may include any quantity of transceivers, processors, memories, and the like, and all signal processing apparatuses 900 that can implement the embodiments of this application fall within the protection scope of the embodiments of this application.

Figure 10:
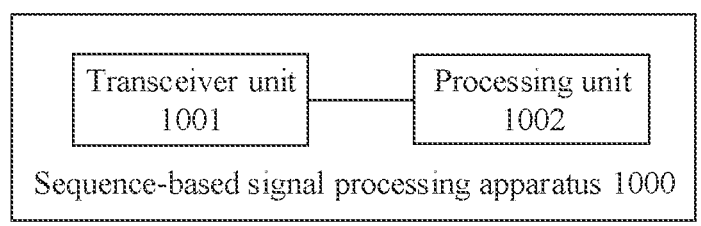
FIG. 10 is a schematic structural diagram of a network device according to an embodiment of this application.

FIG. 10 is a schematic structural diagram of a sequence-based signal processing apparatus 1000 according to an embodiment of this application. The signal processing apparatus 1000 may be a communications device, or may be a chip in a communications device. The signal processing apparatus 1000 includes a transceiver unit 1001 and a processing unit 1002.

The transceiver unit is configured to receive a first signal carried on N subcarriers.

The processing unit 1002 is configured to: obtain N elements in a sequence $\{f_n\}$, and perform IDFT processing on the sequence $\{f_n\}$ to obtain N elements in a sequence $\{x_n\}$, where $x_n$ is an element in the sequence $\{x_n\}$, and the sequence $\{x_n\}$ is a sequence satisfying a preset condition.

For the preset condition used in the processing unit 1002, refer to the preset condition disclosed in the foregoing sequence-based signal processing method disclosed in the embodiments of this application. The preset conditions are consistent, and details are not described herein again.

The processing unit 1002 is further configured to process the first signal based on the N elements in the sequence $\{x_n\}$.

For a corresponding operation performed by the signal processing apparatus 1000 disclosed in this embodiment of this application, refer to a corresponding operation performed in the foregoing sequence-based signal processing method disclosed in the embodiments of this application, and details are not described herein again.

With reference to the sequence-based signal processing method disclosed in the embodiments of this application, the signal processing apparatus disclosed in this embodiment of this application may also be directly implemented by hardware, a memory executed by a processor, or a combination thereof.

Figure 11:
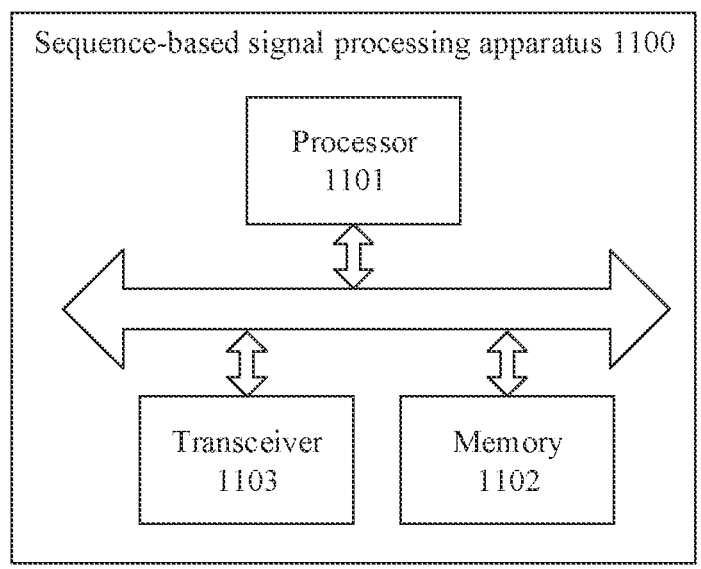
FIG. 11 is a schematic structural diagram of another network device according to an embodiment of this application.

As shown in FIG. 11, a signal processing apparatus 1100 includes a processor 1101 and a transceiver 1103. Optionally, the signal processing apparatus 1100 further includes a memory 1102.

The processor 1101 is coupled to the memory 1102 by using a bus. The processor 1101 is coupled to the transceiver 1103 by using the bus.

The processor 1101 may be specifically a CPU, an NP, an ASIC, or a PLD. The PLD may be a CPLD, an FPGA, or a GAL.

The memory 1102 may be specifically a CAM or a RAM. The CAM may be a TCAM.

When the signal processing apparatus 1100 is a communications device, the transceiver 1103 may be a radio frequency circuit. When the signal processing apparatus 1100 is a chip in a terminal device, the transceiver 1103 may be an input/output interface, a pin, a circuit, or the like on the chip.

Alternatively, the memory 1102 may be integrated into the processor 1101. If the memory 1102 and the processor 1101 are mutually independent components, the memory 1102 is connected to the processor 1101. For example, the memory 1102 and the processor 1101 may communicate with each other by using a bus. The transceiver 1103 and the processor 1101 may communicate with each other by using the bus, or the transceiver 1103 may be directly connected to the processor 1101.

The memory 1102 is configured to store an operation program, code, or an instruction for sequence-based signal processing. Optionally, the memory 1102 includes an operating system and an application program, and is configured to store an operation program, code, or an instruction for sequence-based signal processing.

When needing to perform an operation related to sequence-based signal processing, the processor 1101 or a hardware device may invoke and execute the operation program, the code, or the instruction stored in the memory 1102, to complete a sequence-based signal processing process performed by the network device in FIG. 1 to FIG. 7. For a specific process, refer to the foregoing corresponding part of the embodiments of this application. Details are not described herein again.

It may be understood that FIG. 11 shows merely a simplified design of the signal processing apparatus 1100. In actual application, the signal processing apparatus 1100 may include any quantities of interfaces, processors, memories, and the like, and all signal processing apparatuses 1100 that can implement the embodiments of this application fall within the protection scope of the embodiments of this application.

Figure 12:
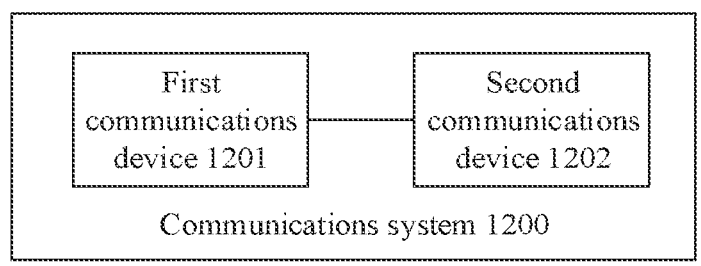
FIG. 12 is a schematic structural diagram of a communications system according to an embodiment of this application.

FIG. 12 shows a communications system 1200 according to an embodiment of this application. The communications system 1200 includes a first communications device 1201 and a second communications device 1202. The first communications device 1201 is a device on a transmitter side, and the second communications device 1202 is a device on a terminal side.

The first communications device 1201 is configured to: determine a sequence $\{x_n\}$ including N elements; perform DFT on the N elements in the sequence $\{x_n\}$, to obtain a sequence $\{f_n\}$; map the sequence $\{f_n\}$ to N subcarriers, to generate a first signal; and send the first signal to the second communications device 1202.

The second communications device 1202 is configured to: receive the first signal on the N subcarriers that is sent by the first communications device 1201; obtain N elements in the sequence $\{f_n\}$; perform IDFT processing on the sequence $\{f_n\}$, to obtain the N elements in the sequence $\{x_n\}$; and process the first signal based on the N elements in the sequence $\{x_n\}$.

In the communications system disclosed in this embodiment of this application, a quantity of first communications devices 1201 and a quantity of second communications devices 1202 are not limited. The first communications device 1201 may be specifically the communications device disclosed in FIG. 9 and FIG. 10. Optionally, the first communications device 1201 may be configured to perform a corresponding operation performed by the terminal device in FIG. 1 to FIG. 7 in the embodiments of this application. The second communications device 1202 may be specifically the communications device disclosed in FIG. 10 and FIG. 11. Optionally, the second communications device 1202 may be configured to perform a corresponding operation performed by the network device in FIG. 1 to FIG. 7 in the embodiments of this application. For a specific process and an execution principle, refer to the foregoing descriptions. Details are not described herein again.

Persons skilled in the art should be aware that in the foregoing one or more examples, functions described in this application may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The embodiments in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly; for related parts, refer to partial descriptions in the method embodiment.

Finally, it should be noted that the foregoing embodiments are merely intended for exemplarily describing the technical solutions of this application other than limiting this application. Although this application and benefits of this application are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of this application.

What is claimed is:

1. A method for signal processing, comprising:
    determining, a sequence $\{x_n\}$ comprising N elements, $x_n$ is an element of $\{x_n\}$, wherein N=18, n=0, ..., N−1, and $x_n$ satisfies $x_n = A \times b_n \times j^n$, where A is a non-zero complex number, $j=\sqrt{-1}$, $b_n$ is an element of $\{b_n\}$, and $\{b_n\}$ is a sequence of unmodulated bits;
    generating, a signal based on the sequence $\{x_n\}$; and
    sending, the signal to a network device.

2. The method according to claim 1, wherein $b_n$ satisfies $b_n = u(1 - 2 \times S_n)$, where u is a non-zero complex number, $S_n$ is an element of a sequence $\{S_n\}$ associated with a sequence $\{q_n\}$, where $\{q_n\}$ satisfies $q_n = S_{(n+M) \bmod N}$, $M \in \{0, 1, 2, ..., N-1\}$, and the sequence $\{q_n\}$ comprises one or more of the following sequences:
    {1, 0, 0, 0, 0, 0, 1, 0, 1, 1, 1, 1, 0, 0, 1, 1, 0, 1};
    {1, 1, 1, 0, 1, 0, 0, 0, 1, 0, 0, 0, 1, 1, 0, 1, 0, 0}; or
    {1, 0, 1, 1, 1, 0, 0, 1, 1, 0, 1, 1, 1, 1, 1, 0, 0, 1}.

3. The method according to claim 1, wherein generating the signal comprises:
    performing, discrete Fourier transform processing on the N elements in the sequence $\{x_n\}$, to obtain a sequence $\{f_n\}$;
    mapping, N elements in the sequence $\{f_n\}$ to N continuous subcarriers or N equally spaced subcarriers, to obtain a frequency domain signal comprising N elements; and
    generating, the signal based on the frequency domain signal.

4. The method according to claim 1, wherein the signal is a reference signal.

5. The method of claim 4, wherein the reference signal is a demodulation reference signal.

6. The method according to claim 1, further comprising: filtering the sequence $\{x_n\}$.

7. A method for signal processing, comprising:
    receiving, a signal transmitted on N subcarriers from a terminal device;
    obtaining, a sequence $\{x_n\}$ comprising N elements, $x_n$ is an element of $\{x_n\}$; and
    processing, the signal according to the sequence $\{x_n\}$, wherein N=18, n=0, ..., N−1, and $x_n$ satisfies $x_n = A \times b_n \times j^n$, where A is a non-zero complex number, $j=\sqrt{-1}$, $b_n$ is an element of $\{b_n\}$, and $\{b_n\}$ is a sequence of unmodulated bits.

8. The method according to claim 7, wherein $b_n$ satisfies $b_n = u(1 - 2 \times S_n)$, where u is a non-zero complex number, $S_n$ is an element of a sequence $\{S_n\}$ associated with a sequence $\{q_n\}$, where $\{q_n\}$ satisfies $q_n = S_{(n+M) \bmod N}$, $M \in \{0, 1, 2, ..., N-1\}$, and the sequence $\{q_n\}$ comprises one or more of the following sequences:
    {1, 0, 0, 0, 0, 0, 1, 0, 1, 1, 1, 1, 0, 0, 1, 1, 0, 1};
    {1, 1, 1, 0, 1, 0, 0, 0, 1, 0, 0, 0, 1, 1, 0, 1, 0, 0}; or
    {1, 0, 1, 1, 1, 0, 0, 1, 1, 0, 1, 1, 1, 1, 1, 0, 0, 1}.

9. The method according to claim 7, wherein the N subcarriers are continuous subcarriers or equally spaced, and processing the signal comprises:
    obtaining a sequence $\{f_n\}$ comprising N elements, wherein the signal is generated by mapping the sequence $\{f_n\}$ to the N subcarriers; and
    performing inverse discrete Fourier transform on the sequence $\{f_n\}$ to obtain the sequence $\{x_n\}$.

10. The method according to claim 7, wherein the signal is a reference signal.

11. The method of claim 10, wherein the reference signal is a demodulation reference signal.

12. An apparatus, comprising:
    at least one processor; and
    a memory coupled to the at least one processor and storing programming instructions for execution by the at least one processor, the programming instructions instruct the at least one processor to perform operations comprising:
    determining a sequence $\{x_n\}$ comprising N elements, $x_n$ is an element of $\{x_n\}$, wherein N=18, n=0, ..., N−1, and $x_n$ satisfies $x_n = A \times b_n \times j^n$, where A is a non-zero complex number, $j=\sqrt{-1}$, $b_n$ is an element of $\{b_n\}$, and $\{b_n\}$ is a sequence of unmodulated bits;
    generating a signal based on the sequence $\{x_n\}$; and causing a transmitter to send the signal to a network device.

13. The apparatus according to claim 12, wherein $b_n$ satisfies $b_n = u(1-2 \times S_n)$, where u is a non-zero complex number, $S_n$ is an element of a sequence $\{S_n\}$ associated with a sequence $\{q_n\}$, where $\{q_n\}$ satisfies $q_n = S_{(n+M) \bmod N}$, $M \in \{0, 1, 2, \ldots, N-1\}$, and the sequence $\{q_n\}$ comprises one or more of the following sequences:
$\{1, 0, 0, 0, 0, 0, 1, 0, 1, 1, 1, 1, 0, 0, 1, 1, 0, 1\}$;
$\{1, 1, 1, 0, 1, 0, 0, 0, 1, 0, 0, 0, 1, 1, 0, 1, 0, 0\}$; or
$\{1, 0, 1, 1, 1, 0, 0, 1, 1, 0, 1, 1, 1, 1, 0, 0, 1\}$.

14. The apparatus according to claim 12, wherein generating the signal comprises:
performing discrete Fourier transform processing on the N elements in the sequence $\{x_n\}$, to obtain a sequence $\{f_n\}$;
mapping N elements in the sequence $\{f_n\}$ to N continuous subcarriers or N equally spaced subcarriers, to obtain a frequency domain signal comprising N elements; and
generating the signal based on the frequency domain signal.

15. The apparatus according to claim 12, wherein the signal is a reference signal.

16. The apparatus of claim 15, wherein the reference signal is a demodulation reference signal.

17. The apparatus according to claim 12, further comprising:
filtering the sequence $\{x_n\}$.

18. The apparatus according to claim 12, wherein the apparatus is a terminal device.

19. An apparatus, comprising:
at least one processor; and
a memory coupled to the at least one processor and storing programming instructions for execution by the at least one processor, the programming instructions instruct the at least one processor to perform operations comprising:
receiving a signal transmitted on N subcarriers from a terminal device;
obtaining a sequence $\{x_n\}$ comprising N elements, $x_n$ is an element of $\{x_n\}$; and
processing the signal according to the sequence $\{x_n\}$, wherein N=18, n=0, ..., N-1, and $x_n$ satisfies $x_n = A \times b_n \times j^n$, where A is a non-zero complex number, $j = \sqrt{-1}$, $b_n$ is an element of $\{b_n\}$, and $\{b_n\}$ is a sequence of unmodulated bits.

20. The apparatus according to claim 19, wherein $b_n$ satisfies $b_n = u(1-2 \times S_n)$, where u is a non-zero complex number, $S_n$ is an element of a sequence $\{S_n\}$ associated with a sequence $\{q_n\}$, where $\{q_n\}$ satisfies $q_n = S_{(n+M) \bmod N}$, $M \in \{0, 1, 2, \ldots, N-1\}$, and the sequence $\{q_n\}$ comprises one or more of the following sequences:
$\{1, 0, 0, 0, 0, 0, 1, 0, 1, 1, 1, 1, 0, 0, 1, 1, 0, 1\}$;
$\{1, 1, 1, 0, 1, 0, 0, 0, 1, 0, 0, 0, 1, 1, 0, 1, 0, 0\}$; or
$\{1, 0, 1, 1, 1, 0, 0, 1, 1, 0, 1, 1, 1, 1, 0, 0, 1\}$.

21. The apparatus according to claim 19, wherein the N subcarriers are continuous subcarriers or equally spaced, and wherein processing the signal comprises:
obtaining a sequence $\{f_n\}$ comprising N elements, wherein the signal is generated by mapping the sequence $\{f_n\}$ to the N subcarriers; and
performing inverse discrete Fourier transform on the sequence $\{f_n\}$ to obtain the sequence $\{x_n\}$.

22. The apparatus according to claim 19, wherein the signal is a reference signal.

23. The apparatus of claim 22, wherein the reference signal is a demodulation reference signal.

24. The apparatus according to claim 19, wherein the apparatus is a network device.

25. A non-transitory computer-readable medium storing one or more instructions executable by a terminal device to perform operations comprising:
determining a sequence $\{x_n\}$ comprising N elements, $x_n$ is an element of $\{x_n\}$, wherein N=18, n=0, ..., N-1, and $x_n$ satisfies $x_n = A \times b_n \times j^n$, where A is a non-zero complex number, $j = \sqrt{-1}$, $b_n$ is an element of $\{b_n\}$, and $\{b_n\}$ is a sequence of unmodulated bits;
generating a signal based on the sequence $\{x_n\}$; and
sending the signal to a network device.

26. The non-transitory computer-readable medium according to claim 25, wherein $b_n$ satisfies $b_n = u(1-2 \times S_n)$, where u is a non-zero complex number, $S_n$ is an element of a sequence $\{S_n\}$ associated with a sequence $\{q_n\}$, where $\{q_n\}$ satisfies $q_n = S_{(n+M) \bmod N}$, $M \in \{0, 1, 2, \ldots, N-1\}$, and the sequence $\{q_n\}$ comprises one or more of the following sequences:
$\{1, 0, 0, 0, 0, 0, 1, 0, 1, 1, 1, 1, 0, 0, 1, 1, 0, 1\}$;
$\{1, 1, 1, 0, 1, 0, 0, 0, 1, 0, 0, 0, 1, 1, 0, 1, 0, 0\}$; or
$\{1, 0, 1, 1, 1, 0, 0, 1, 1, 0, 1, 1, 1, 1, 0, 0, 1\}$.

27. The non-transitory computer-readable medium according to claim 25, wherein generating the signal comprises:
performing discrete Fourier transform processing on the N elements in the sequence $\{x_n\}$, to obtain a sequence $\{f_n\}$;
mapping N elements in the sequence $\{f_n\}$ to N continuous subcarriers or N equally spaced subcarriers, to obtain a frequency domain signal comprising N elements; and
generating the signal based on the frequency domain signal.

28. The non-transitory computer-readable medium according to claim 25, wherein the signal is a reference signal.

29. The non-transitory computer-readable medium of claim 28, wherein the reference signal is a demodulation reference signal.

30. The non-transitory, computer-readable medium according to claim 25, further comprising:
filtering the sequence $\{x_n\}$.

31. A non-transitory computer-readable medium storing one or more instructions executable by a network device to perform operations comprising:
receiving a signal transmitted on N subcarriers from a terminal device;
obtaining a sequence $\{x_n\}$ comprising N elements, $x_n$ is an element of $\{x_n\}$; and
processing the signal according to the sequence $\{x_n\}$, wherein N=18, n=0, ..., N-1, and $x_n$ satisfies $x_n = A \times b_n \times j^n$, where A is a non-zero complex number, $j = \sqrt{-1}$, $b_n$ is an element of $\{b_n\}$, and $\{b_n\}$ is a sequence of unmodulated bits.

32. The non-transitory computer-readable medium according to claim 31, wherein $b_n$ satisfies $b_n = u(1-2 \times S_n)$, where u is a non-zero complex number, $S_n$ is an element of a sequence $\{S_n\}$ associated with a sequence $\{q_n\}$, where $\{q_n\}$ satisfies $q_n = S_{(n+M) \bmod N}$, $M \in \{0, 1, 2, \ldots, N-1\}$, and the sequence $\{q_n\}$ comprises one or more of the following sequences:
$\{1, 0, 0, 0, 0, 0, 1, 0, 1, 1, 1, 1, 0, 0, 1, 1, 0, 1\}$;
$\{1, 1, 1, 0, 1, 0, 0, 0, 1, 0, 0, 0, 1, 1, 0, 1, 0, 0\}$; or
$\{1, 0, 1, 1, 1, 0, 0, 1, 1, 0, 1, 1, 1, 1, 0, 0, 1\}$.

33. The non-transitory computer-readable medium according to claim 31, wherein the N subcarriers are continuous subcarriers or equally spaced, and the processing the signal comprises:
- obtaining a sequence $\{f_n\}$ comprising N elements, wherein the signal is generated by mapping the sequence $\{f_n\}$ to the N subcarriers; and
- performing inverse discrete Fourier transform on the sequence $\{f_n\}$ to obtain the sequence $\{x_n\}$.

34. The non-transitory computer-readable medium according to claim 31, wherein the signal is a reference signal.

35. The non-transitory computer-readable medium of claim 34, wherein the reference signal is a demodulation reference signal.

* * * * *

UNITED STATES PATENT AND TRADEMARK OFFICE
CERTIFICATE OF CORRECTION

| | | |
|---|---|---|
| PATENT NO. | : 11,606,238 B2 | Page 1 of 1 |
| APPLICATION NO. | : 17/484833 | |
| DATED | : March 14, 2023 | |
| INVENTOR(S) | : Bingyu Qu, Mingxin Gong and Jianqin Liu | |

It is certified that error appears in the above-identified patent and that said Letters Patent is hereby corrected as shown below:

In the Claims

In Column 48, In Line 27, In Claim 7, delete "sequence{$x_n$}" and insert -- sequence {$x_n$} --.

In Column 49, In Line 40, In Claim 19, delete "sequence{$x_n$}" and insert -- sequence {$x_n$} --.

In Column 49, In Line 63, In Claim 21, delete "the-sequence" and insert -- the sequence --.

In Column 50, In Line 42, In Claim 30, delete "non-transitory," and insert -- non-transitory --.

In Column 50, In Line 50, In Claim 31, delete "sequence{$x_n$}" and insert -- sequence {$x_n$} --.

Signed and Sealed this
Tenth Day of October, 2023

Katherine Kelly Vidal
*Director of the United States Patent and Trademark Office*